(12) United States Patent
Carter et al.

(10) Patent No.: US 10,094,453 B2
(45) Date of Patent: Oct. 9, 2018

(54) INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

(71) Applicant: Fallbrook Intellectual Property Company LLC, Cedar Park, TX (US)

(72) Inventors: Jeremy Carter, Austin, TX (US); Charles Lohr, Austin, TX (US); Brad Pohl, Leander, TX (US); Daniel J. Dawe, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 299 days.

(21) Appl. No.: 14/997,312

(22) Filed: Jan. 15, 2016

(65) Prior Publication Data
US 2016/0131231 A1 May 12, 2016

Related U.S. Application Data

(60) Continuation of application No. 14/082,017, filed on Nov. 15, 2013, now Pat. No. 9,239,099, which is a
(Continued)

(51) Int. Cl.
*F16H 15/52* (2006.01)
*F16H 61/664* (2006.01)
(Continued)

(52) U.S. Cl.
CPC ........... *F16H 15/52* (2013.01); *F16H 15/503* (2013.01); *F16H 37/084* (2013.01);
(Continued)

(58) Field of Classification Search
CPC ...... F16H 15/503; F16H 15/52; F16H 37/084; F16H 2037/0866
See application file for complete search history.

(56) References Cited

U.S. PATENT DOCUMENTS

| 719,595 A | 2/1903 | Huss |
|---|---|---|
| 1,121,210 A | 12/1914 | Techel |

(Continued)

FOREIGN PATENT DOCUMENTS

| CH | 118064 | 12/1926 |
|---|---|---|
| CN | 1054340 | 9/1991 |

(Continued)

OTHER PUBLICATIONS

Office Action dated Mar. 28, 2013 for U.S. Appl. No. 13/679,702.
(Continued)

*Primary Examiner* — Edwin Young
(74) *Attorney, Agent, or Firm* — Knobbe Martens Olson & Bear LLP

(57) ABSTRACT

Inventive embodiments are directed to components, subassemblies, systems, and/or methods for infinitely variable transmissions (IVT) having a variator provided with a plurality of tilting spherical planets. In one embodiment, a variator is provided with multiple planet arrays. In another embodiment, a hydraulic system is configured to control the transmission ratio of the IVT. Various inventive idler assemblies and planet-pivot arm assemblies can be used to facilitate adjusting the transmission speed ratio of an IVT. Embodiments of a transmission housing and bell housing are adapted to house components of an IVT and, in some embodiments, to cooperate with other components of the IVT to support operation and/or functionality of the IVT. Various related devices include embodiments of, for example, a control feedback mechanism, axial force generation and management mechanisms, a control valve inte-
(Continued)

gral with an input shaft, and a rotatable carrier configured to support planet-pivot arm assemblies.

14 Claims, 67 Drawing Sheets

Related U.S. Application Data division of application No. 13/679,702, filed on Nov. 16, 2012, now Pat. No. 8,585,528, which is a continuation of application No. 12/527,400, filed as application No. PCT/US2008/053951 on Feb. 14, 2008, now Pat. No. 8,313,404.

(60) Provisional application No. 60/890,438, filed on Feb. 16, 2007.

(51) Int. Cl.
 *F16H 63/06* (2006.01)
 *F16H 15/50* (2006.01)
 *F16H 37/08* (2006.01)
 *F16H 57/033* (2012.01)

(52) U.S. Cl.
 CPC ....... *F16H 61/6649* (2013.01); *F16H 63/067* (2013.01); *F16H 57/033* (2013.01); *F16H 2037/0866* (2013.01); *Y10T 74/20024* (2015.01)

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,131,159 A | 9/1938 | Almen |
| 2,132,751 A | 10/1938 | Murden |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,959,973 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |

(56) References Cited

U.S. PATENT DOCUMENTS

| | | |
|---|---|---|
| 4,382,186 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |

(56) References Cited

U.S. PATENT DOCUMENTS

| | | | |
|---|---|---|---|
| 6,499,373 B2 | 12/2002 | Van Cor | |
| 6,514,175 B2 | 2/2003 | Taniguchi et al. | |
| 6,527,662 B2 | 3/2003 | Miyata et al. | |
| 6,532,890 B2 | 3/2003 | Chen | |
| 6,551,210 B2 | 4/2003 | Miller | |
| 6,558,285 B1 * | 5/2003 | Sieber | F16H 15/52 475/193 |
| 6,575,047 B2 | 6/2003 | Reik et al. | |
| 6,659,901 B2 | 12/2003 | Sakai et al. | |
| 6,672,418 B1 | 1/2004 | Makino | |
| 6,676,559 B2 | 1/2004 | Miller | |
| 6,679,109 B2 | 1/2004 | Gierling et al. | |
| 6,682,432 B1 | 1/2004 | Shinozuka | |
| 6,689,012 B2 | 2/2004 | Miller | |
| 6,721,637 B2 | 4/2004 | Abe et al. | |
| 6,723,014 B2 | 4/2004 | Shinso et al. | |
| 6,723,016 B2 | 4/2004 | Sumi | |
| 6,805,654 B2 | 10/2004 | Nishii | |
| 6,808,053 B2 | 10/2004 | Kirkwood et al. | |
| 6,839,617 B2 | 1/2005 | Mensler et al. | |
| 6,849,020 B2 | 2/2005 | Sumi | |
| 6,859,709 B2 | 2/2005 | Joe et al. | |
| 6,868,949 B2 | 3/2005 | Braford | |
| 6,931,316 B2 | 8/2005 | Joe et al. | |
| 6,932,739 B2 | 8/2005 | Miyata et al. | |
| 6,942,593 B2 | 9/2005 | Nishii et al. | |
| 6,945,903 B2 | 9/2005 | Miller | |
| 6,949,049 B2 | 9/2005 | Miller | |
| 6,958,029 B2 | 10/2005 | Inoue | |
| 6,991,575 B2 | 1/2006 | Inoue | |
| 6,991,579 B2 | 1/2006 | Kobayashi et al. | |
| 7,011,600 B2 | 3/2006 | Miller et al. | |
| 7,011,601 B2 | 3/2006 | Miller | |
| 7,014,591 B2 | 3/2006 | Miller | |
| 7,029,418 B2 | 4/2006 | Taketsuna et al. | |
| 7,032,914 B2 | 4/2006 | Miller | |
| 7,036,620 B2 | 5/2006 | Miller et al. | |
| 7,044,884 B2 | 5/2006 | Miller | |
| 7,063,195 B2 | 6/2006 | Berhan | |
| 7,063,640 B2 | 6/2006 | Miller | |
| 7,074,007 B2 | 7/2006 | Miller | |
| 7,074,154 B2 | 7/2006 | Miller | |
| 7,074,155 B2 | 7/2006 | Miller | |
| 7,077,777 B2 | 7/2006 | Miyata et al. | |
| 7,086,979 B2 | 8/2006 | Frenken | |
| 7,086,981 B2 | 8/2006 | Ali et al. | |
| 7,094,171 B2 | 8/2006 | Inoue | |
| 7,111,860 B1 | 9/2006 | Grimaldos | |
| 7,112,158 B2 | 9/2006 | Miller | |
| 7,112,159 B2 | 9/2006 | Miller et al. | |
| 7,125,297 B2 | 10/2006 | Miller et al. | |
| 7,131,930 B2 | 11/2006 | Miller et al. | |
| 7,140,999 B2 | 11/2006 | Miller | |
| 7,147,586 B2 | 12/2006 | Miller et al. | |
| 7,153,233 B2 | 12/2006 | Miller et al. | |
| 7,156,770 B2 | 1/2007 | Miller | |
| 7,160,220 B2 | 1/2007 | Shinojima et al. | |
| 7,160,222 B2 | 1/2007 | Miller | |
| 7,163,485 B2 | 1/2007 | Miller | |
| 7,163,486 B2 | 1/2007 | Miller et al. | |
| 7,166,052 B2 | 1/2007 | Miller et al. | |
| 7,166,056 B2 | 1/2007 | Miller et al. | |
| 7,166,057 B2 | 1/2007 | Miller et al. | |
| 7,166,058 B2 | 1/2007 | Miller et al. | |
| 7,169,076 B2 | 1/2007 | Miller et al. | |
| 7,172,529 B2 | 2/2007 | Miller et al. | |
| 7,175,564 B2 | 2/2007 | Miller | |
| 7,175,565 B2 | 2/2007 | Miller et al. | |
| 7,175,566 B2 | 2/2007 | Miller et al. | |
| 7,192,381 B2 | 3/2007 | Miller et al. | |
| 7,197,915 B2 | 4/2007 | Luh et al. | |
| 7,198,582 B2 | 4/2007 | Miller et al. | |
| 7,198,583 B2 | 4/2007 | Miller et al. | |
| 7,198,584 B2 | 4/2007 | Miller et al. | |
| 7,198,585 B2 | 4/2007 | Miller et al. | |
| 7,201,693 B2 | 4/2007 | Miller et al. | |
| 7,201,694 B2 | 4/2007 | Miller et al. | |
| 7,201,695 B2 | 4/2007 | Miller et al. | |
| 7,204,777 B2 | 4/2007 | Miller et al. | |
| 7,214,159 B2 | 5/2007 | Miller et al. | |
| 7,217,215 B2 | 5/2007 | Miller et al. | |
| 7,217,216 B2 | 5/2007 | Inoue | |
| 7,217,219 B2 | 5/2007 | Miller | |
| 7,217,220 B2 | 5/2007 | Careau et al. | |
| 7,232,395 B2 | 6/2007 | Miller et al. | |
| 7,234,873 B2 | 6/2007 | Kato et al. | |
| 7,235,031 B2 | 6/2007 | Miller et al. | |
| 7,238,136 B2 | 7/2007 | Miller et al. | |
| 7,238,137 B2 | 7/2007 | Miller et al. | |
| 7,238,138 B2 | 7/2007 | Miller et al. | |
| 7,238,139 B2 | 7/2007 | Roethler et al. | |
| 7,246,672 B2 | 7/2007 | Shirai et al. | |
| 7,250,018 B2 | 7/2007 | Miller et al. | |
| 7,261,663 B2 | 8/2007 | Miller et al. | |
| 7,275,610 B2 | 10/2007 | Kuang et al. | |
| 7,285,068 B2 | 10/2007 | Hosoi | |
| 7,288,042 B2 | 10/2007 | Miller et al. | |
| 7,288,043 B2 | 10/2007 | Shioiri et al. | |
| 7,320,660 B2 | 1/2008 | Miller | |
| 7,322,901 B2 | 1/2008 | Miller et al. | |
| 7,343,236 B2 | 3/2008 | Wilson | |
| 7,347,801 B2 | 3/2008 | Guenter et al. | |
| 7,383,748 B2 | 6/2008 | Rankin | |
| 7,383,749 B2 | 6/2008 | Rankin | |
| 7,384,370 B2 | 6/2008 | Miller | |
| 7,393,300 B2 | 7/2008 | Miller et al. | |
| 7,393,302 B2 | 7/2008 | Miller | |
| 7,393,303 B2 | 7/2008 | Miller | |
| 7,395,731 B2 | 7/2008 | Miller et al. | |
| 7,396,209 B2 | 7/2008 | Miller et al. | |
| 7,402,122 B2 | 7/2008 | Miller | |
| 7,410,443 B2 | 8/2008 | Miller | |
| 7,419,451 B2 | 9/2008 | Miller | |
| 7,422,541 B2 | 9/2008 | Miller | |
| 7,422,546 B2 | 9/2008 | Miller et al. | |
| 7,427,253 B2 | 9/2008 | Miller | |
| 7,431,677 B2 | 10/2008 | Miller et al. | |
| 7,452,297 B2 | 11/2008 | Miller et al. | |
| 7,455,611 B2 | 11/2008 | Miller et al. | |
| 7,455,617 B2 | 11/2008 | Miller et al. | |
| 7,462,123 B2 | 12/2008 | Miller et al. | |
| 7,462,127 B2 | 12/2008 | Miller et al. | |
| 7,470,210 B2 | 12/2008 | Miller et al. | |
| 7,478,885 B2 | 1/2009 | Urabe | |
| 7,481,736 B2 | 1/2009 | Miller et al. | |
| 7,510,499 B2 | 3/2009 | Miller et al. | |
| 7,540,818 B2 | 6/2009 | Miller et al. | |
| 7,547,264 B2 | 6/2009 | Usoro | |
| 7,574,935 B2 | 8/2009 | Rohs et al. | |
| 7,591,755 B2 | 9/2009 | Petrzik et al. | |
| 7,632,203 B2 | 12/2009 | Miller | |
| 7,651,437 B2 | 1/2010 | Miller et al. | |
| 7,654,928 B2 | 2/2010 | Miller et al. | |
| 7,670,243 B2 | 3/2010 | Miller | |
| 7,686,729 B2 | 3/2010 | Miller et al. | |
| 7,727,101 B2 | 6/2010 | Miller | |
| 7,727,106 B2 | 6/2010 | Maheu et al. | |
| 7,727,107 B2 | 6/2010 | Miller | |
| 7,727,108 B2 | 6/2010 | Miller et al. | |
| 7,727,110 B2 | 6/2010 | Miller et al. | |
| 7,727,115 B2 | 6/2010 | Serkh | |
| 7,731,615 B2 | 6/2010 | Miller et al. | |
| 7,762,919 B2 | 7/2010 | Smithson et al. | |
| 7,762,920 B2 | 7/2010 | Smithson et al. | |
| 7,770,674 B2 | 8/2010 | Miles et al. | |
| 7,785,228 B2 | 8/2010 | Smithson et al. | |
| 7,828,685 B2 | 11/2010 | Miller | |
| 7,837,592 B2 | 11/2010 | Miller | |
| 7,871,353 B2 | 1/2011 | Nichols et al. | |
| 7,882,762 B2 | 2/2011 | Armstrong et al. | |
| 7,883,442 B2 | 2/2011 | Miller et al. | |
| 7,885,747 B2 | 2/2011 | Miller et al. | |
| 7,887,032 B2 | 2/2011 | Malone | |
| 7,909,723 B2 | 3/2011 | Triller et al. | |

(56) References Cited

U.S. PATENT DOCUMENTS

| | | |
|---|---|---|
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,528,561 B2 | 12/2016 | Nichols et al. |
| 9,656,672 B2 | 5/2017 | Schieffelin |
| 9,878,719 B2 | 1/2018 | Carter et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0161503 A1 | 10/2002 | Joe et al. |
| 2002/0169051 A1 | 11/2002 | Oshidari |
| 2002/0179348 A1 | 12/2002 | Tamai et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0081728 A1 | 4/2008 | Faulring et al. |
| 2008/0139363 A1 | 6/2008 | Williams |

(56) References Cited

U.S. PATENT DOCUMENTS

| | | |
|---|---|---|
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0145573 A1 | 6/2010 | Vasilescu |
| 2010/0181130 A1 | 7/2010 | Chou |
| 2011/0127096 A1 | 6/2011 | Schneidewind |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0190123 A1 | 7/2013 | Pohl et al. |
| 2013/0288848 A1 | 10/2013 | Carter et al. |
| 2013/0337971 A1 | 12/2013 | Kostrup |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0274536 A1 | 9/2014 | Versteyhe |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0031526 A1 | 2/2016 | Watarai |
| 2016/0040763 A1 | 2/2016 | Nichols et al. |
| 2016/0061301 A1 | 3/2016 | Bazyn et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-000448 | 1/1972 |
| JP | 47-000449 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-12742 | 3/1974 |
| JP | 49-012742 | 3/1974 |
| JP | 49-013823 | 4/1974 |
| JP | 49-041536 | 11/1974 |
| JP | 50-114581 | 9/1975 |

(56) References Cited

FOREIGN PATENT DOCUMENTS

| | | |
|---|---|---|
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003 194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-133896 | 6/2008 |
| JP | 2010-069005 | 4/2010 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 05/121602 | 12/2005 |
| WO | WO 06/091503 | 8/2006 |
| WO | WO 07/077502 | 7/2007 |
| WO | WO 08/078047 | 7/2008 |
| WO | WO 08/100792 | 8/2008 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

Chinese Office Action dated Feb. 5, 2013 for Chinese Patent Application No. 20088012412.X.
First Office Action dated Mar. 26, 2015 in Chinese Patent Application No. 201310347988.4.

(56) References Cited

OTHER PUBLICATIONS

Japanese Office Action dated Sep. 4, 2012 for Japanese Patent Application No. 2009-549718.
Office Action dated Jun. 17, 2014 in Japanese Patent Application No. 2013-170342.
Decision to Grant of Patent dated Mar. 3, 2015 for Japanese Patent Application No. 2013-170342.
Preliminary Notice of First Office Action dated Jan. 14, 2014 in Taiwan patent application No. 097105172.
International Search Report and Written Opinion dated Sep. 29, 2009 for PCT Application No. PCT/US2008/053951.
Thomassy: An Engineering Approach to Simulating Traction EHL. CVT-Hybrid International Conference Mecc/Maastricht/The Netherlands, Nov. 17-19, 2010, p. 97.
Office Action dated May 19, 2015 in U.S. Appl. No. 14/082,017.
Second Office Action dated Dec. 16, 2015 in Chinese Patent Application No. 201310347988.4.
Office Action dated Mar. 8, 2016 in Japanese Patent Application No. 2015-072623.
Extended European Search Report dated Oct. 9, 2017 in EP Patent Application No. 13193655.1.
First Examination Report dated Aug. 8, 2017 in Indian Patent Application No. 3285/KOLNP/2009.
Office Action dated Dec. 5, 2017 in Japanese Patent Application No. 2016-235078.

\* cited by examiner

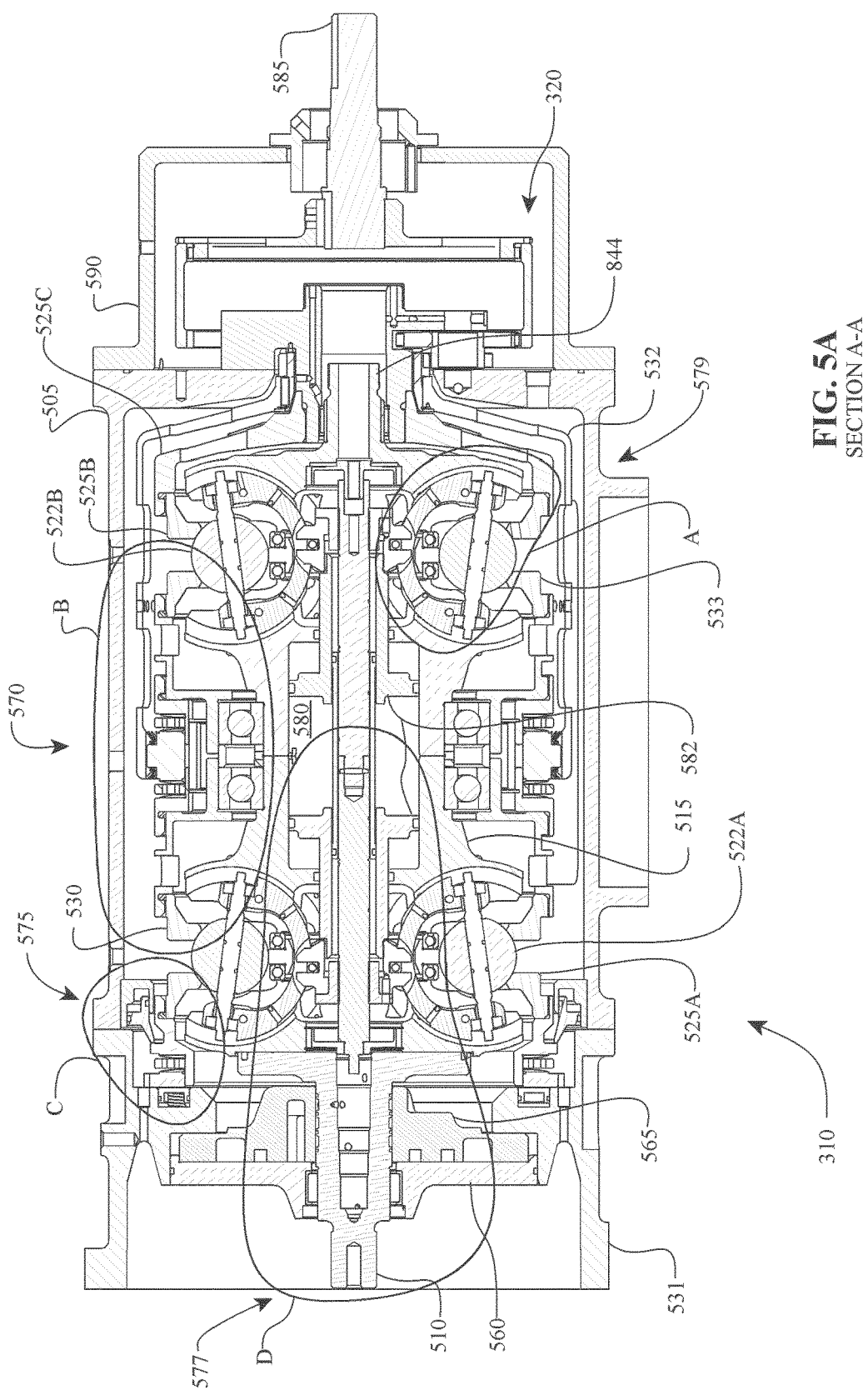

DETAIL A

DETAIL B

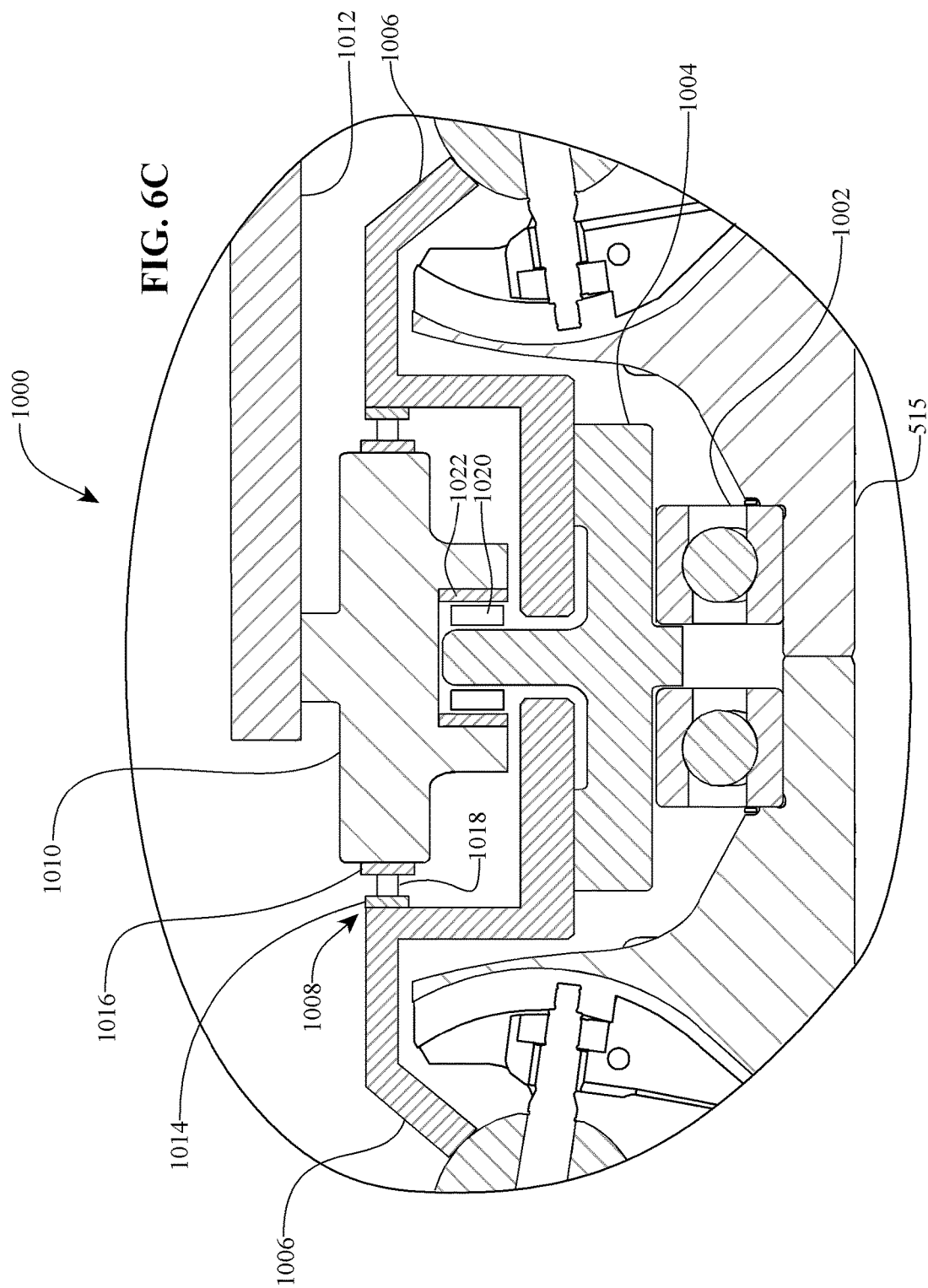

DETAIL C

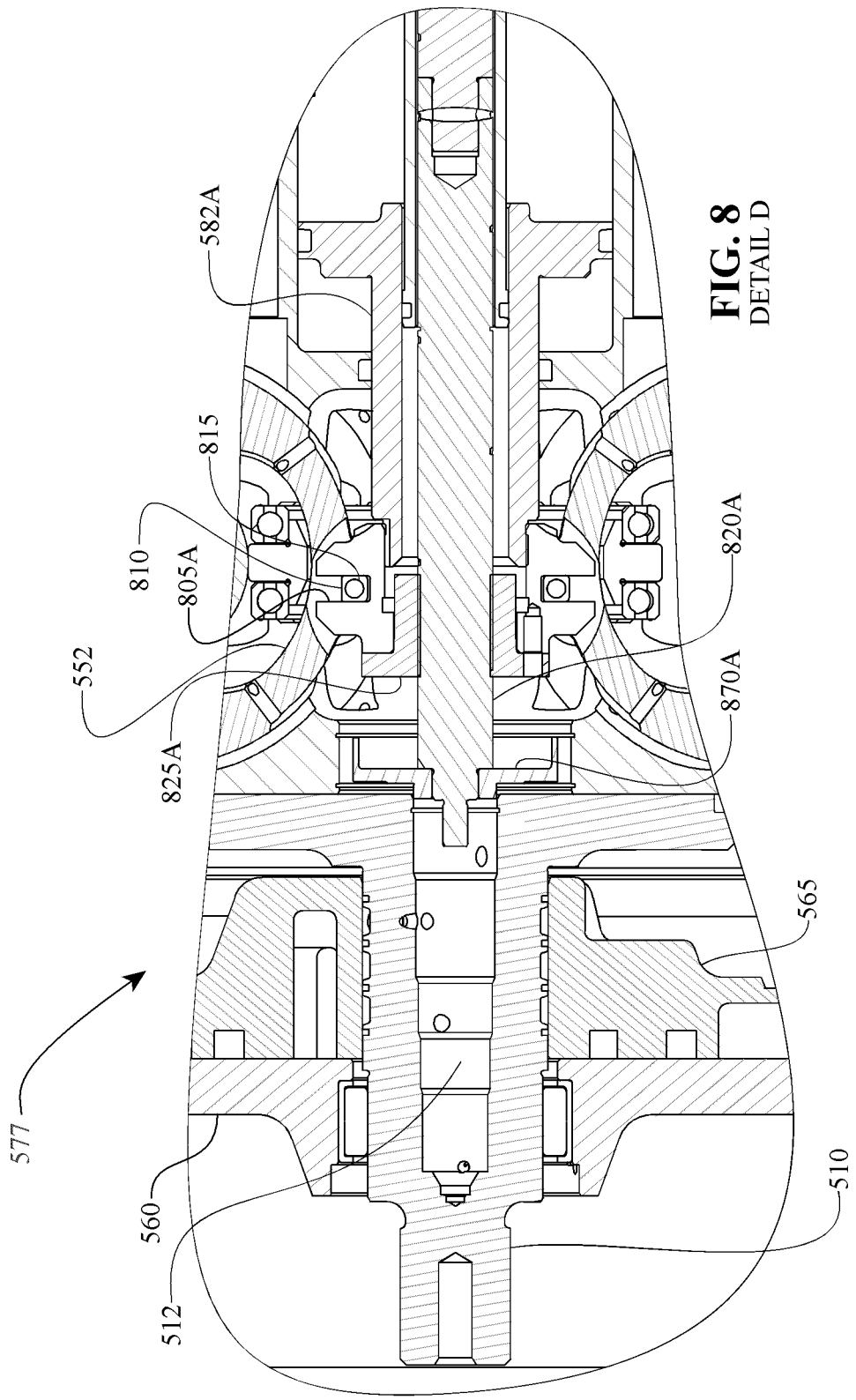

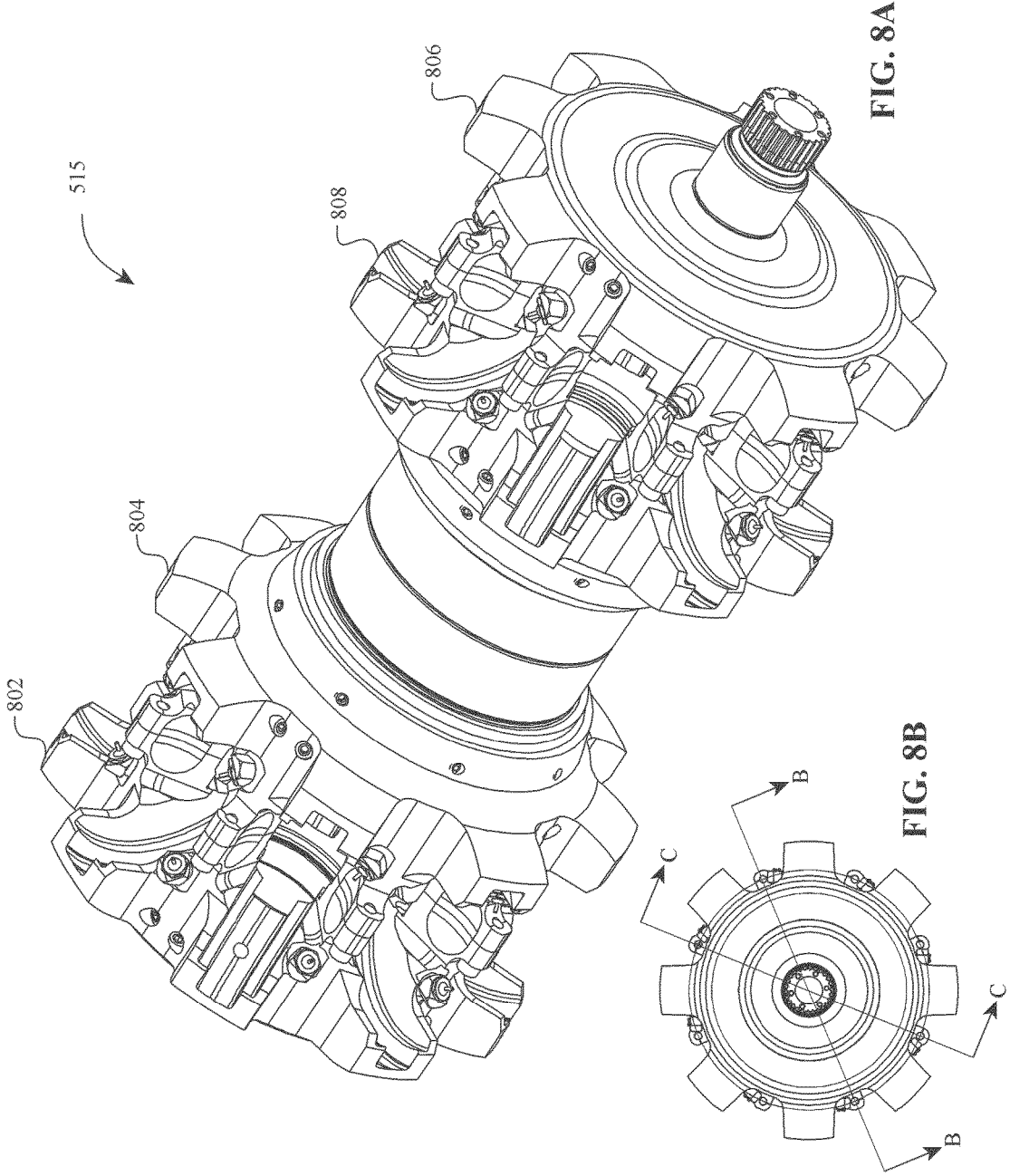

SECTION B-B

SECTION C-C

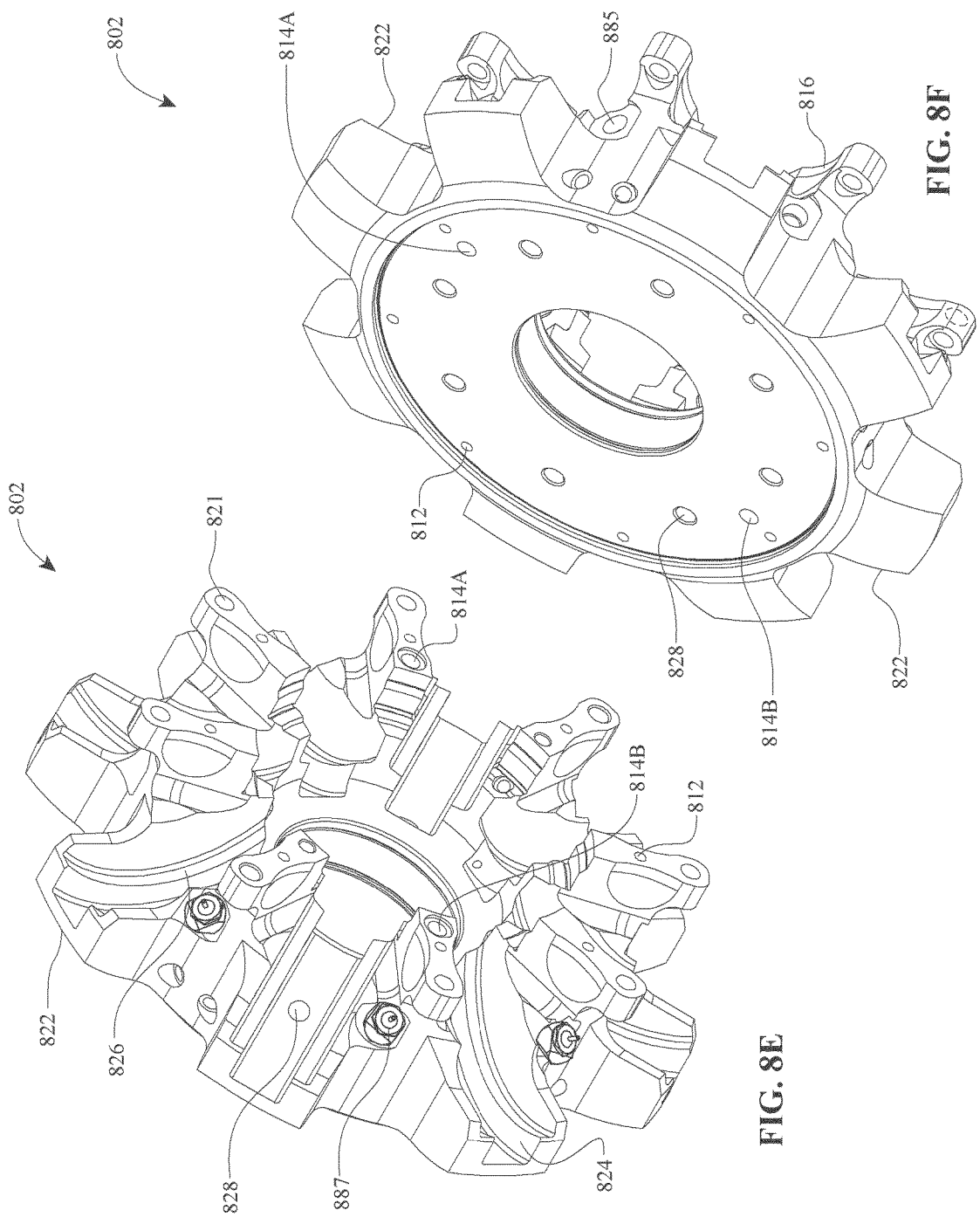

FIG. 8H SECTION A1-A1

FIG. 8I SECTION B1-B1

FIG. 8J SECTION C1-C1

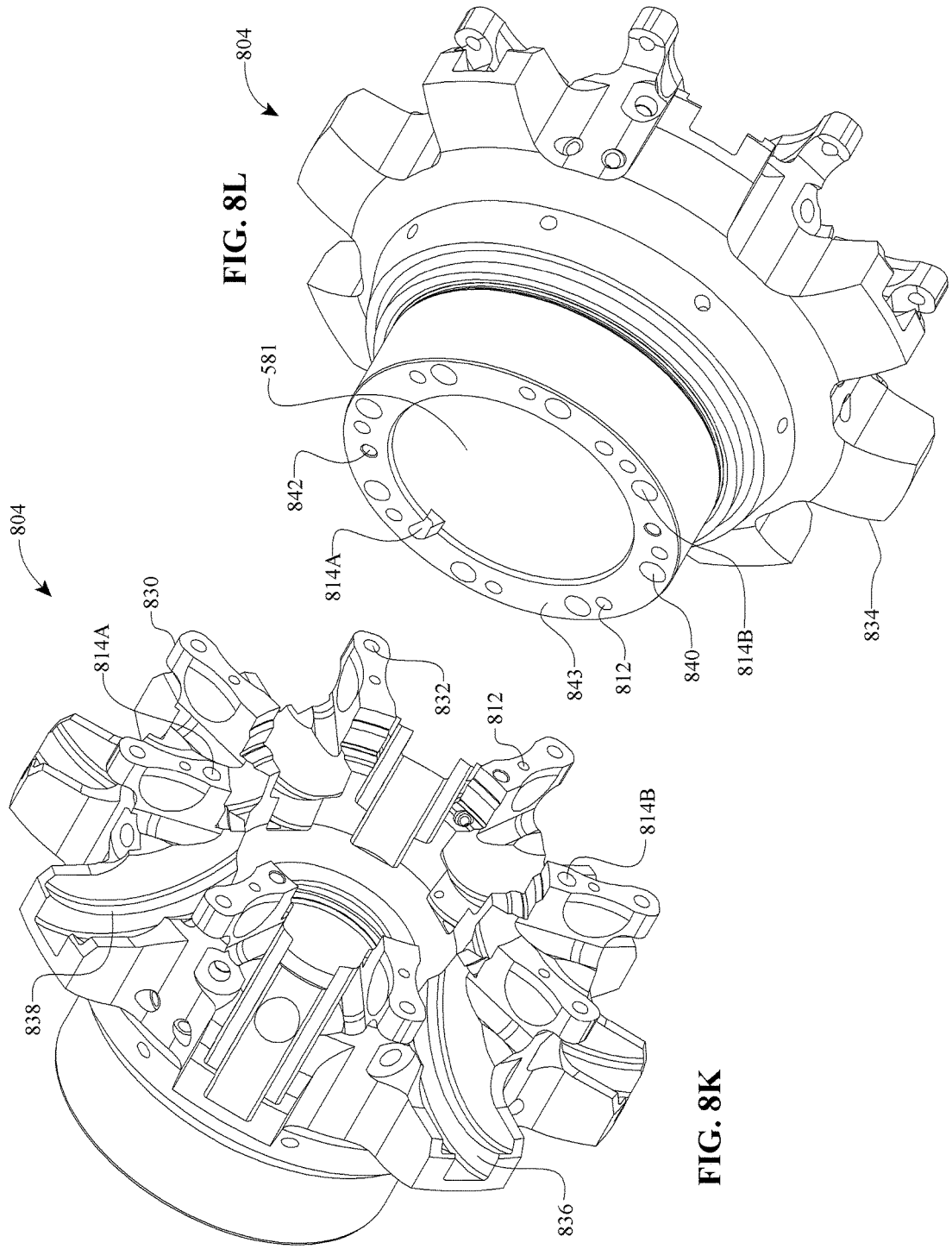

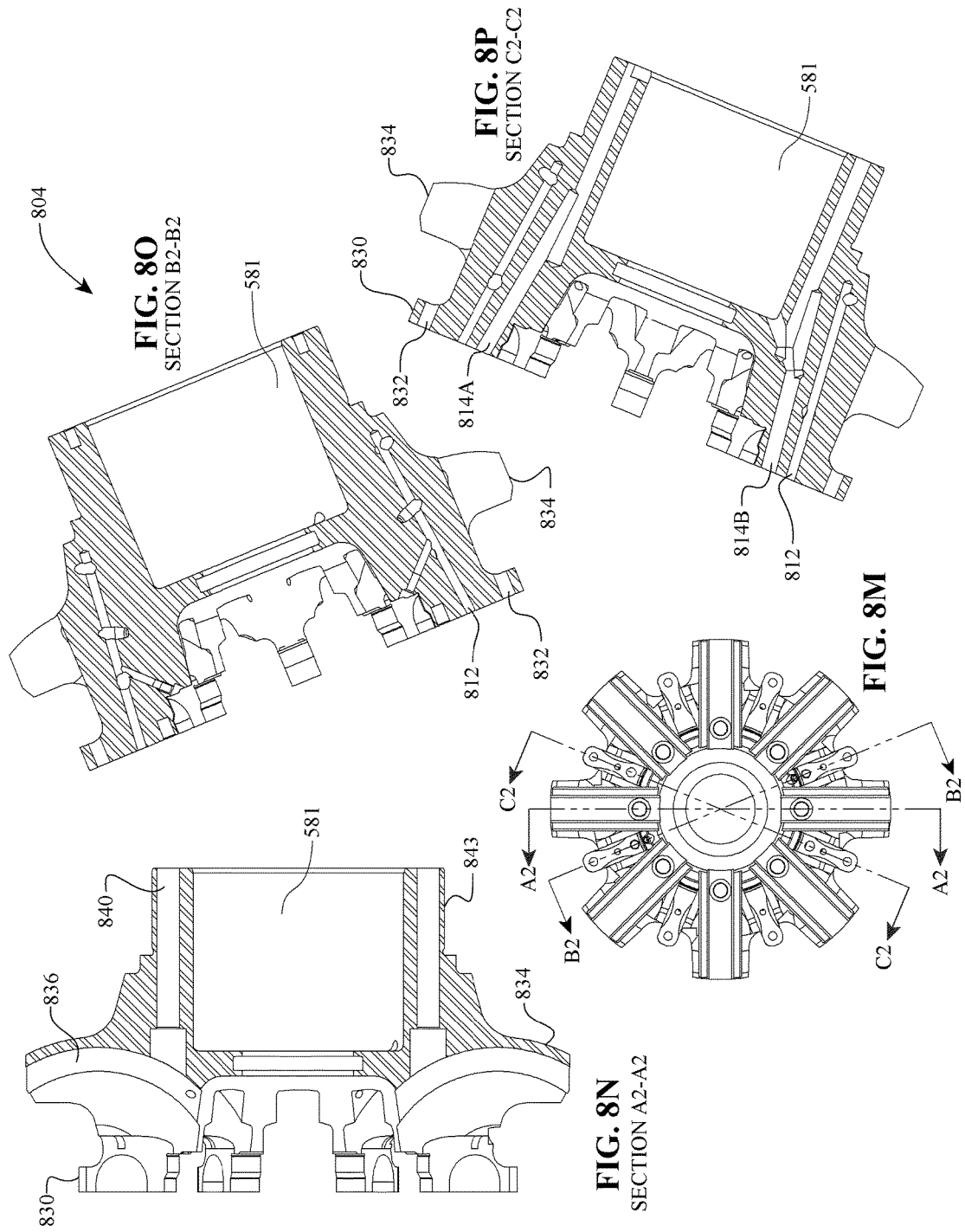

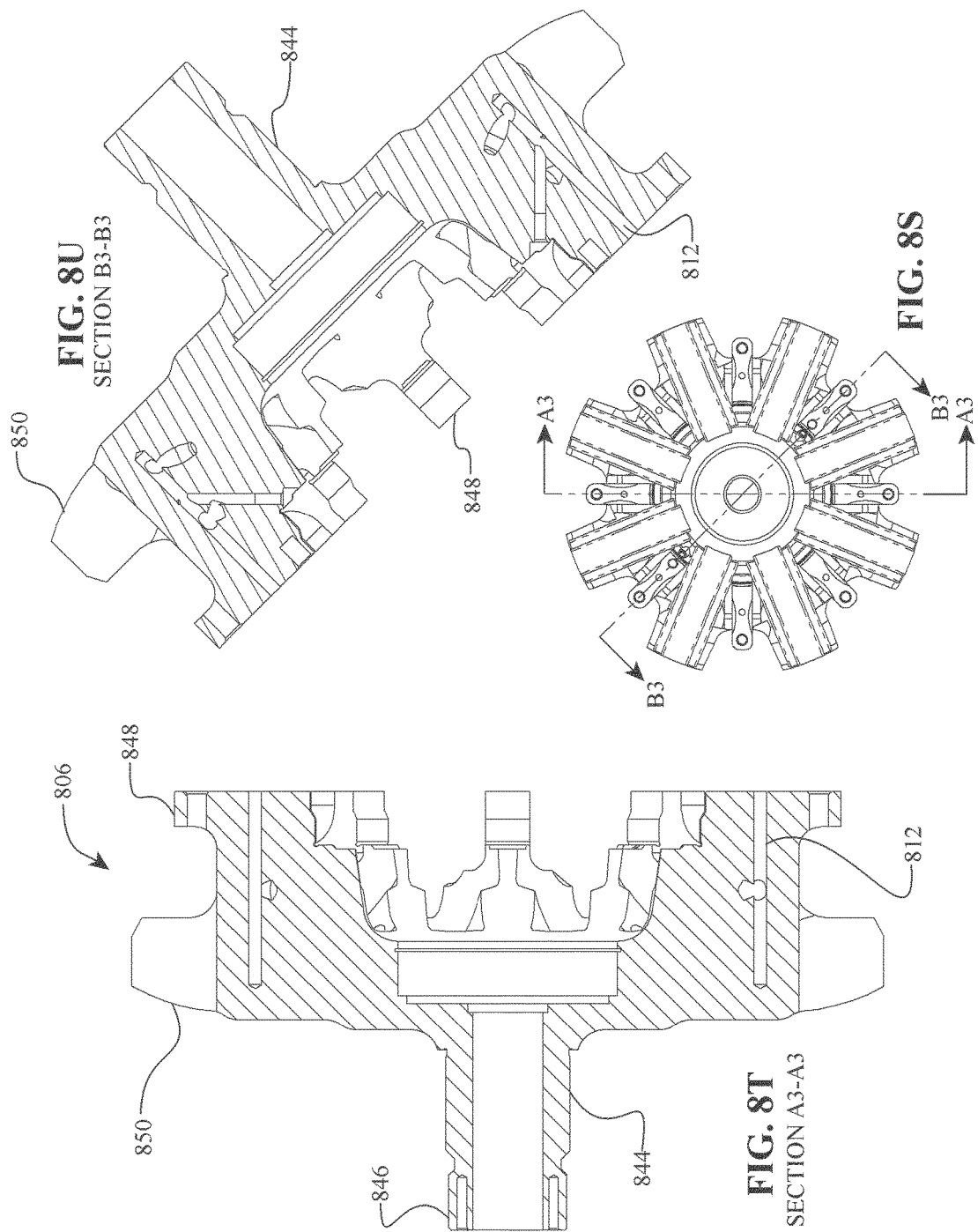

SECTION D-D

DETAIL E

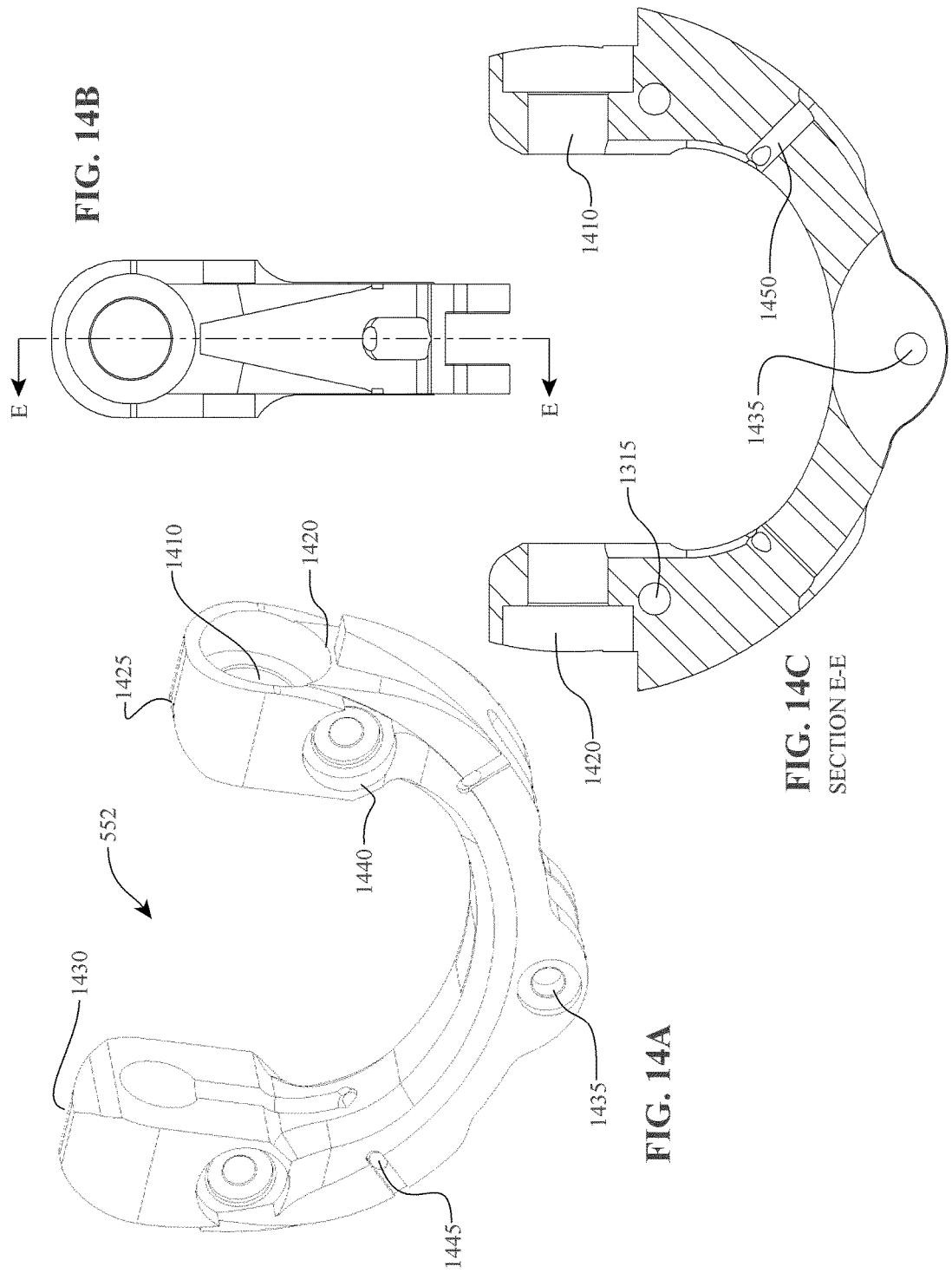

SECTION F-F

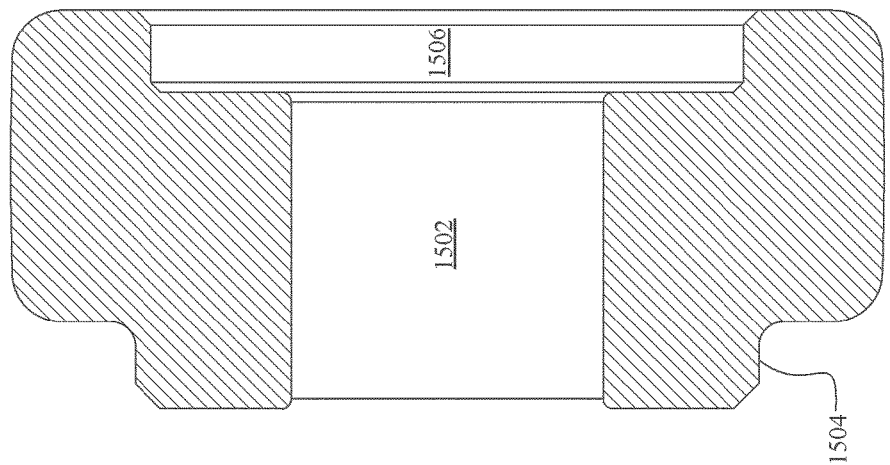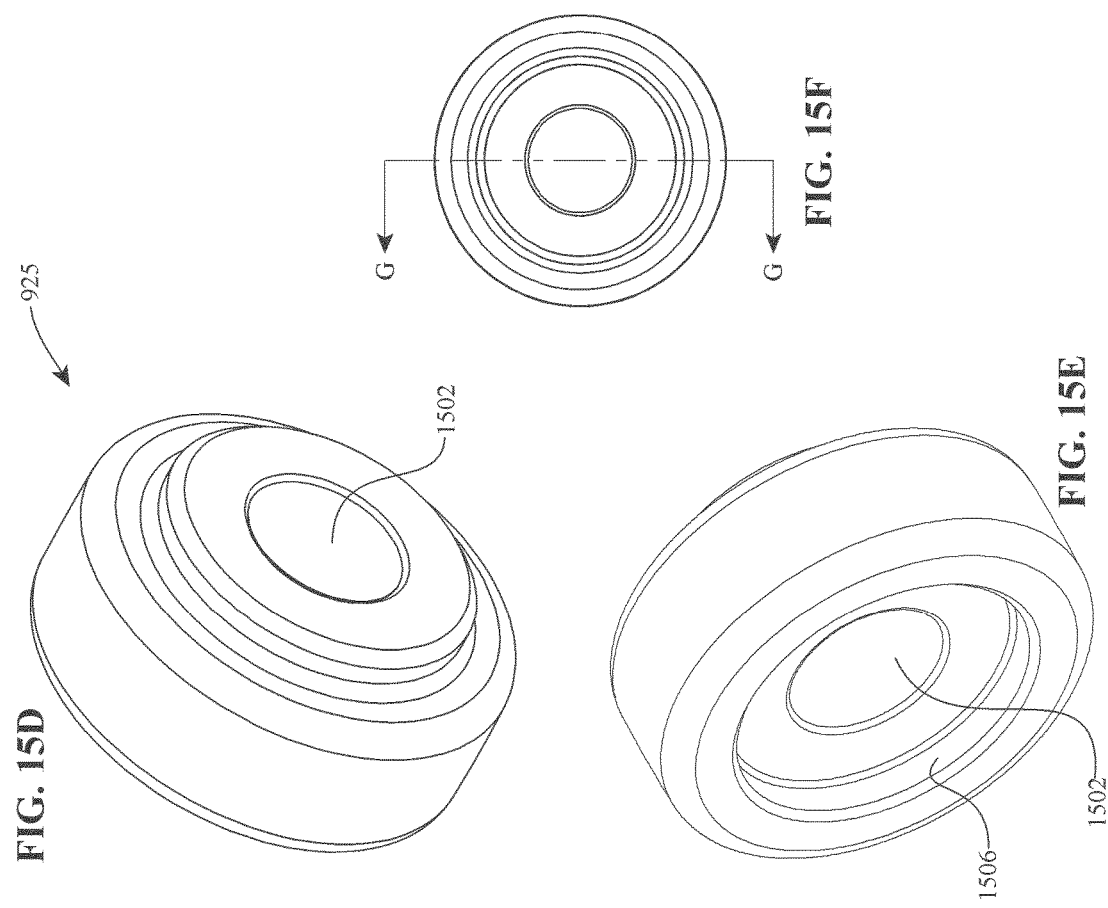

SECTION H-H

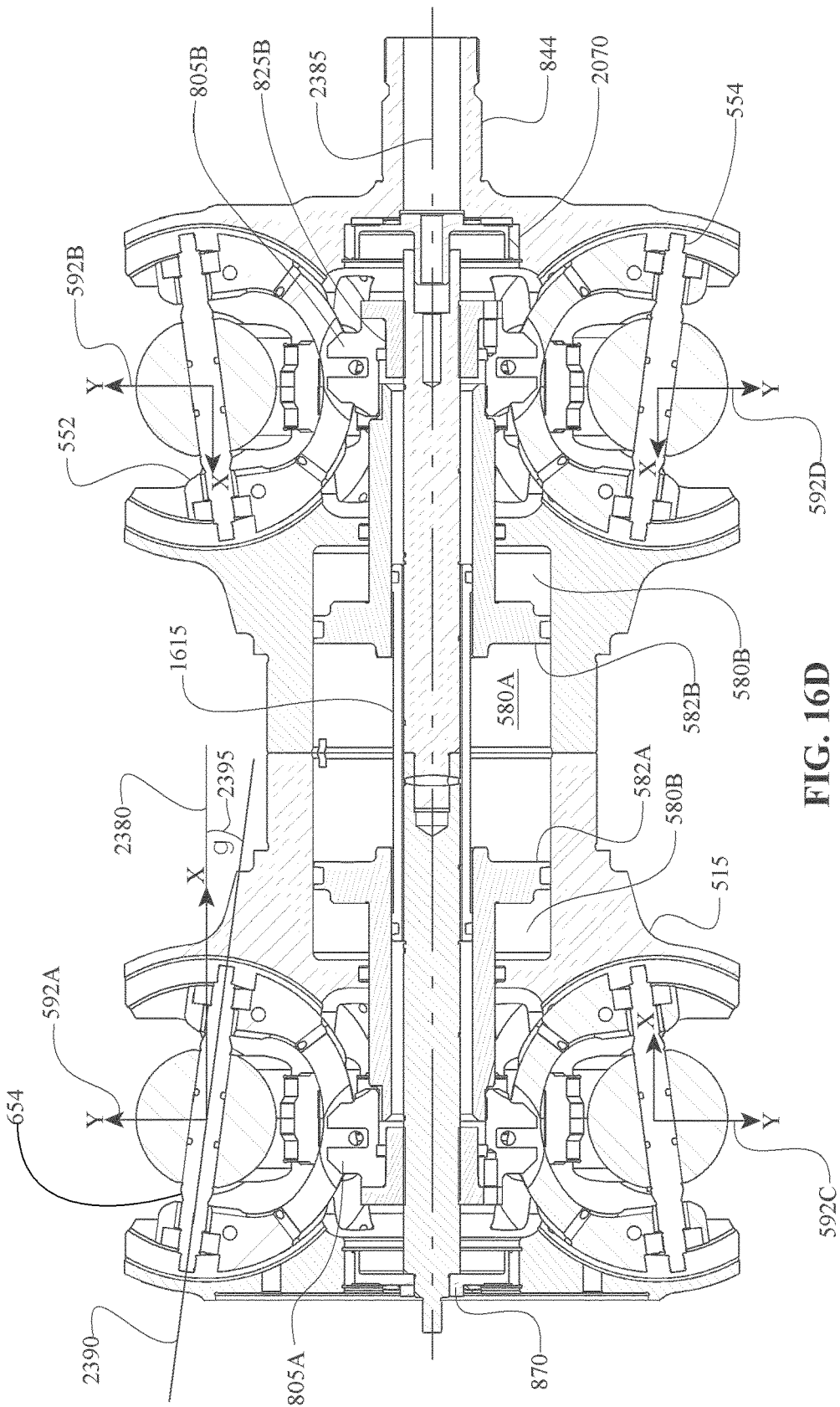
FIG. 16D SECTION I-I

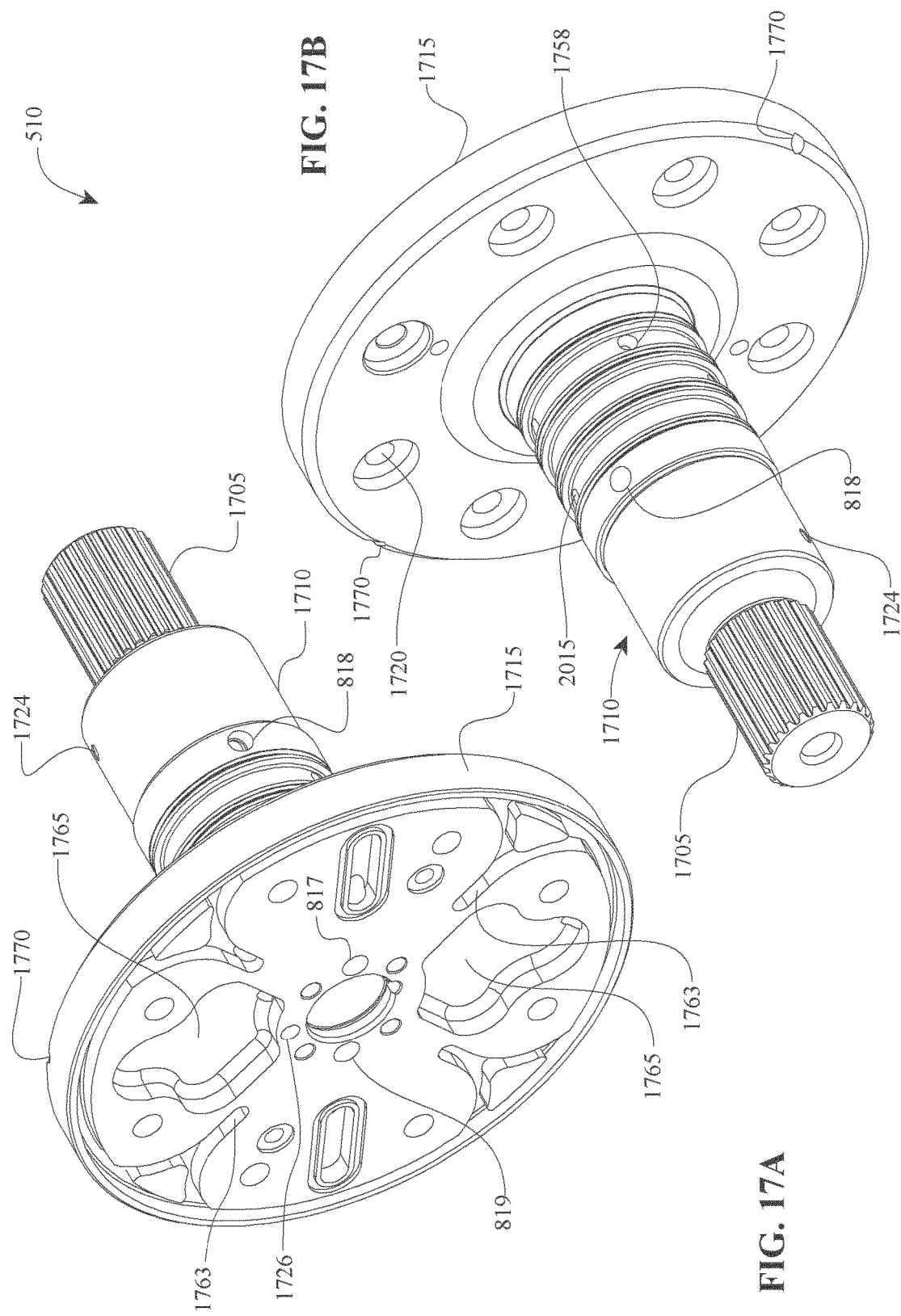

SECTION J-J

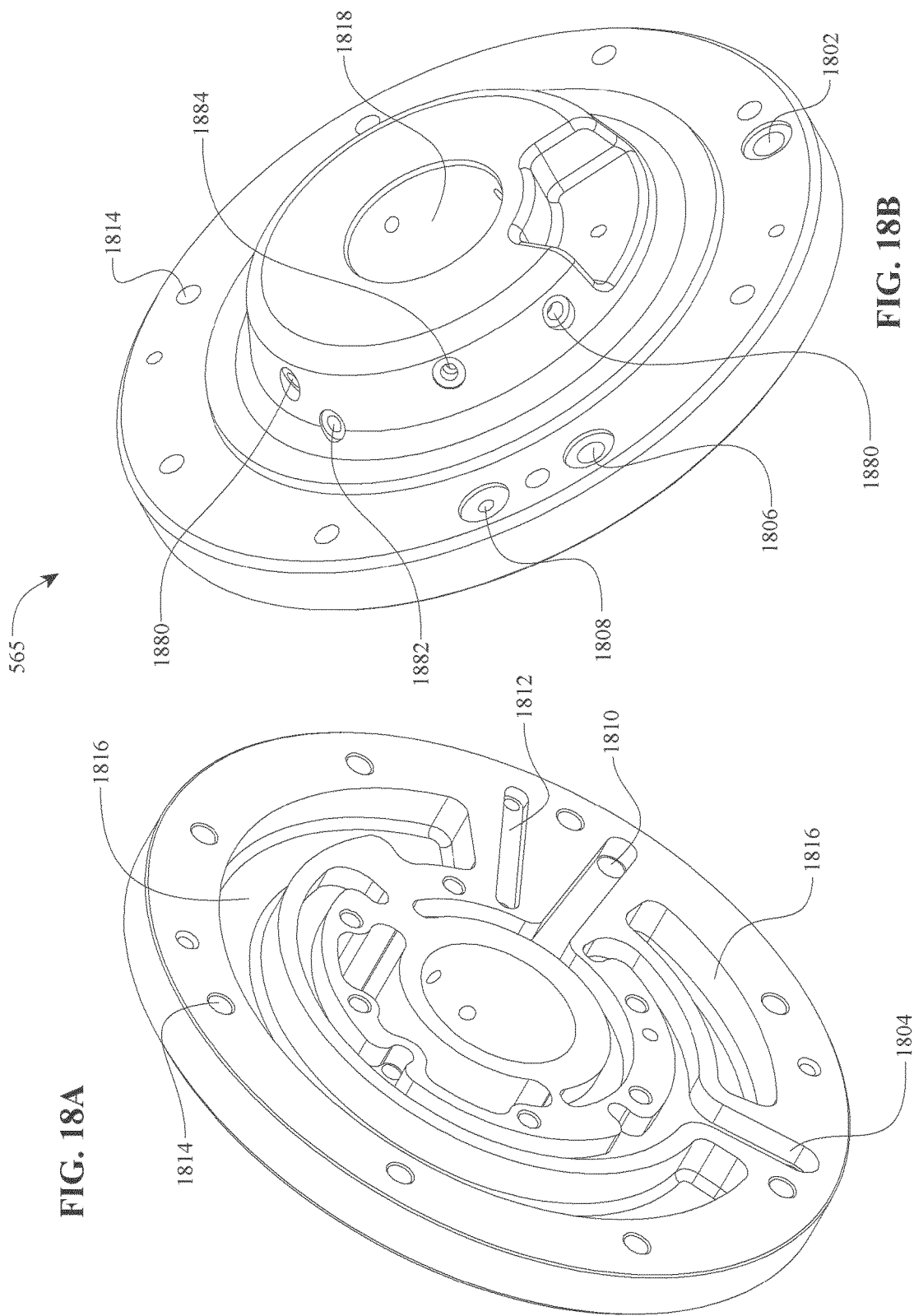

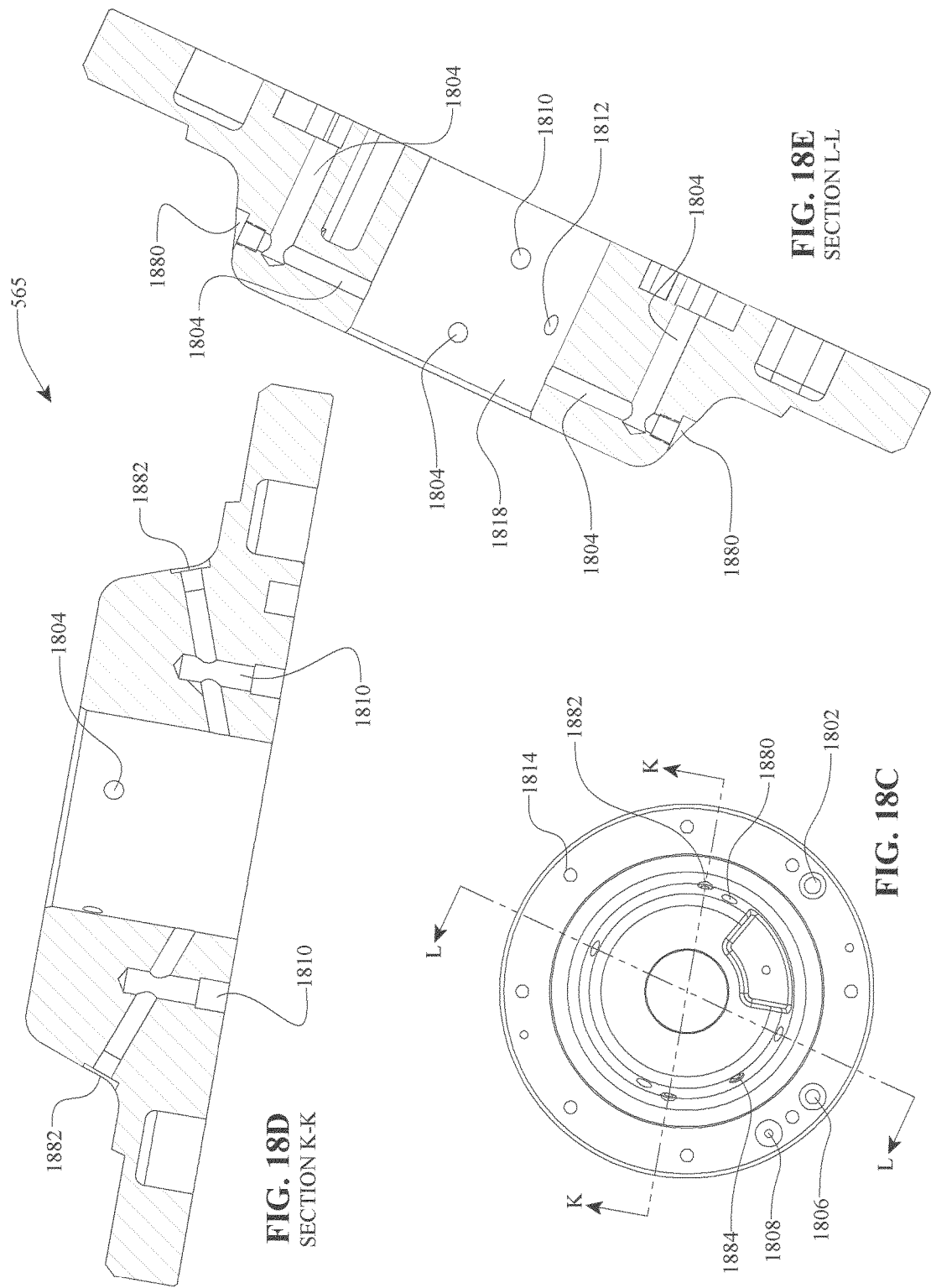

SECTION A4-A4

DETAIL E

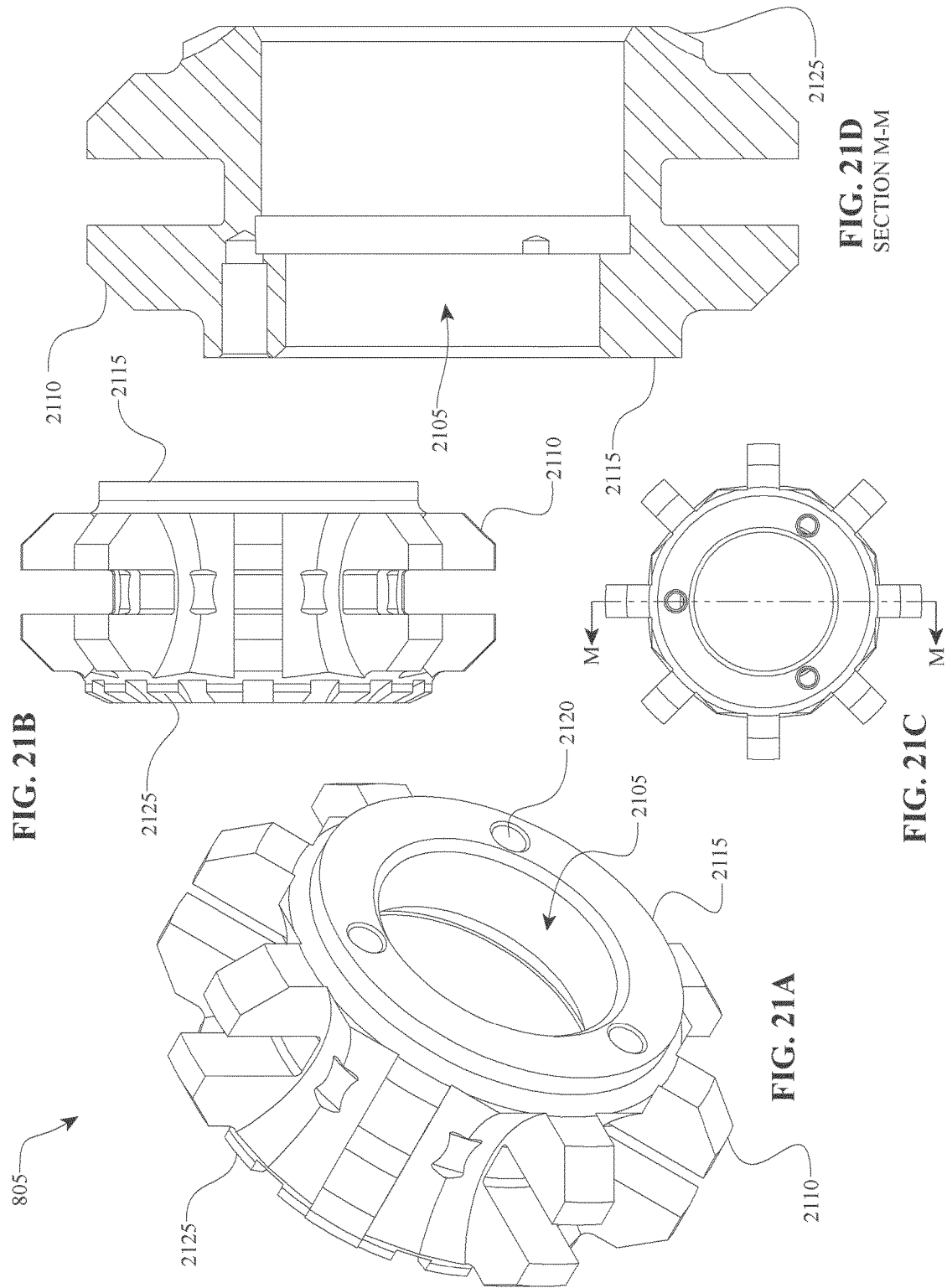

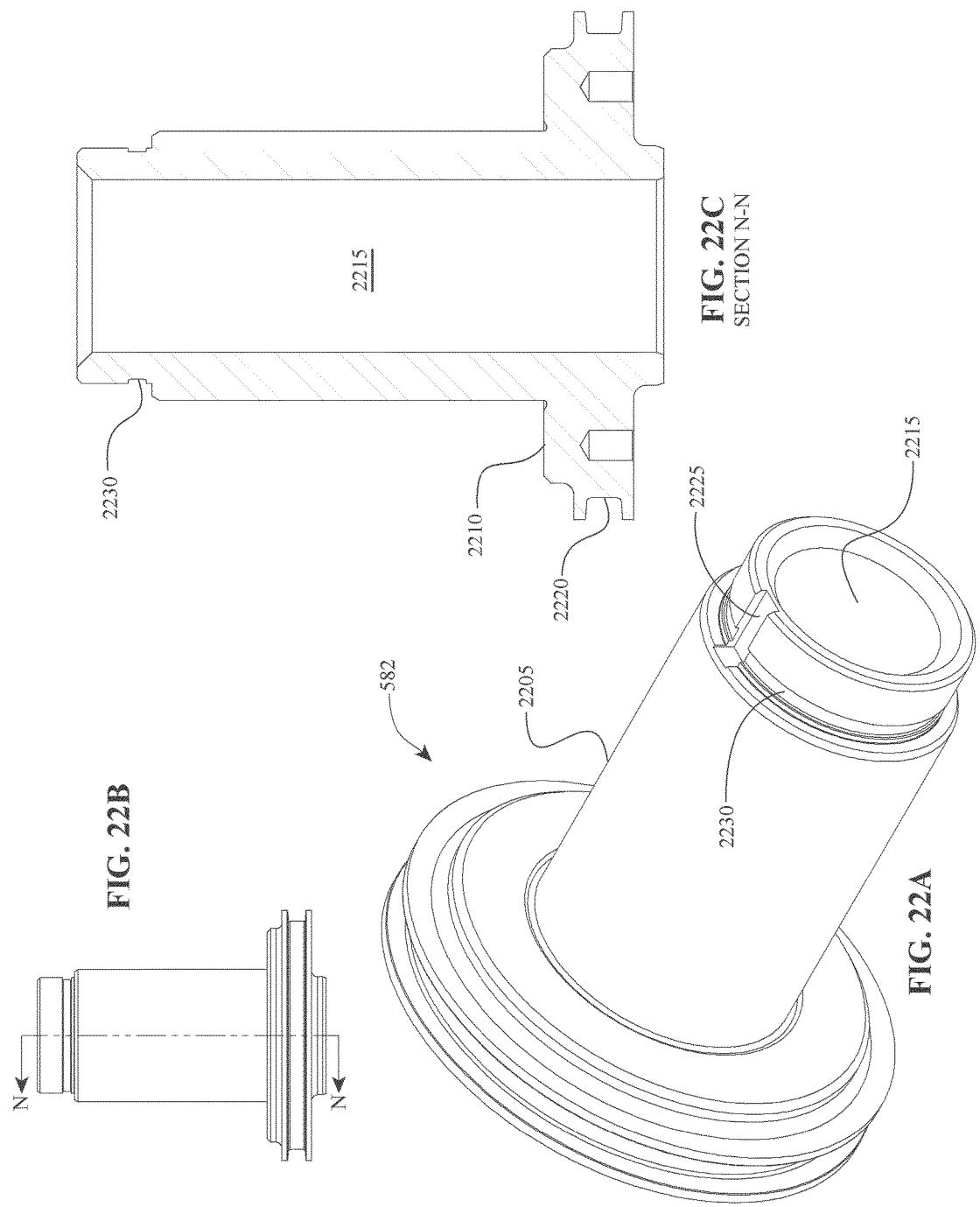

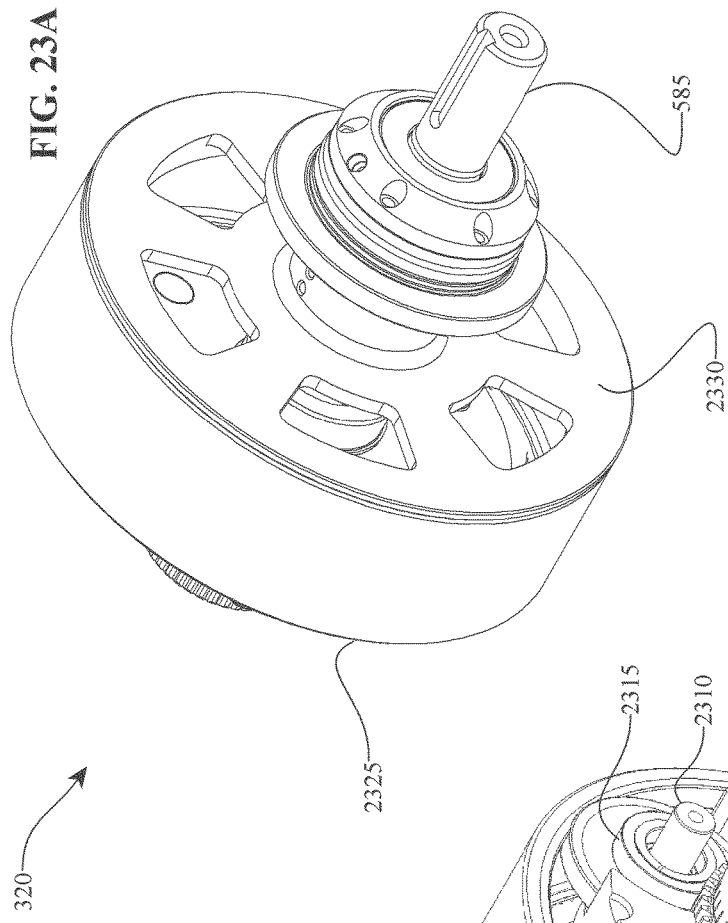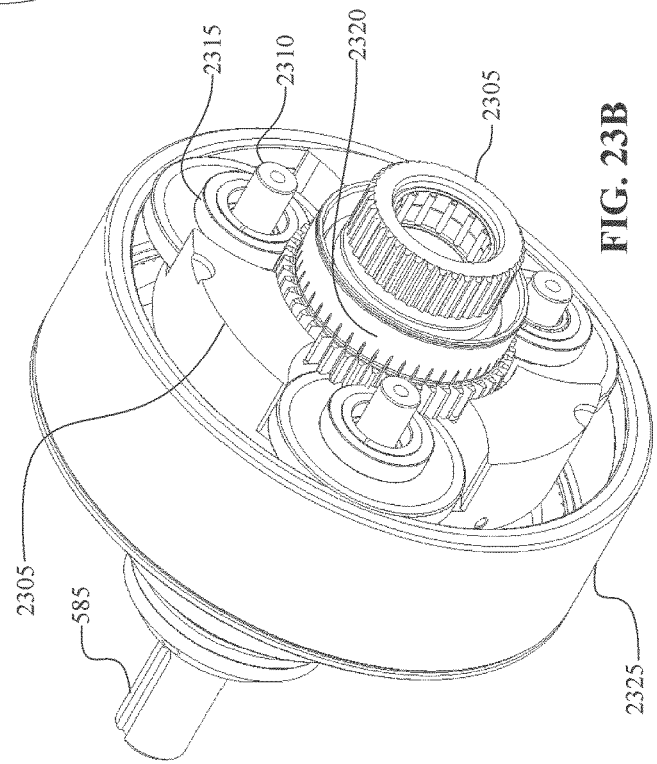

SECTION A5-A5

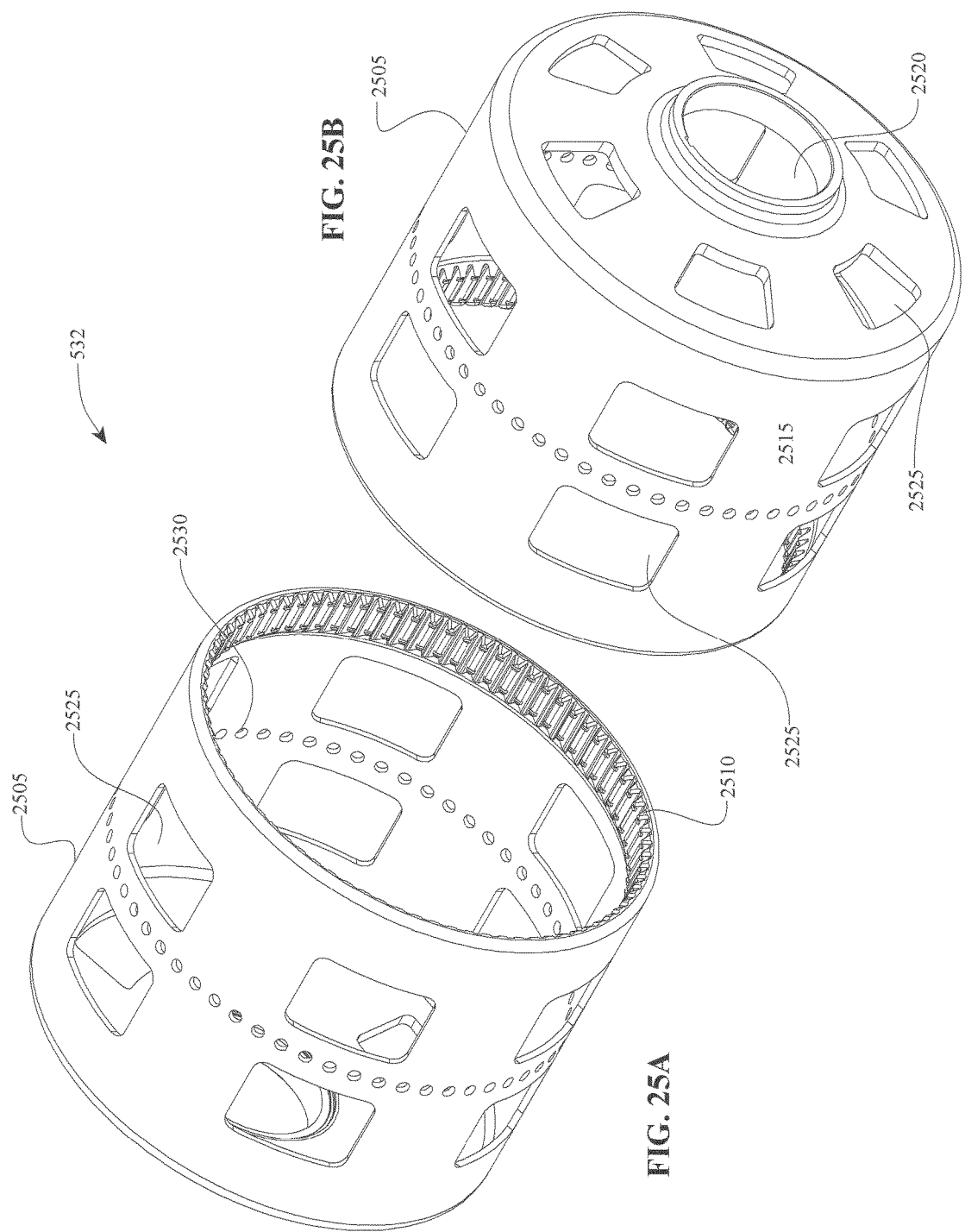

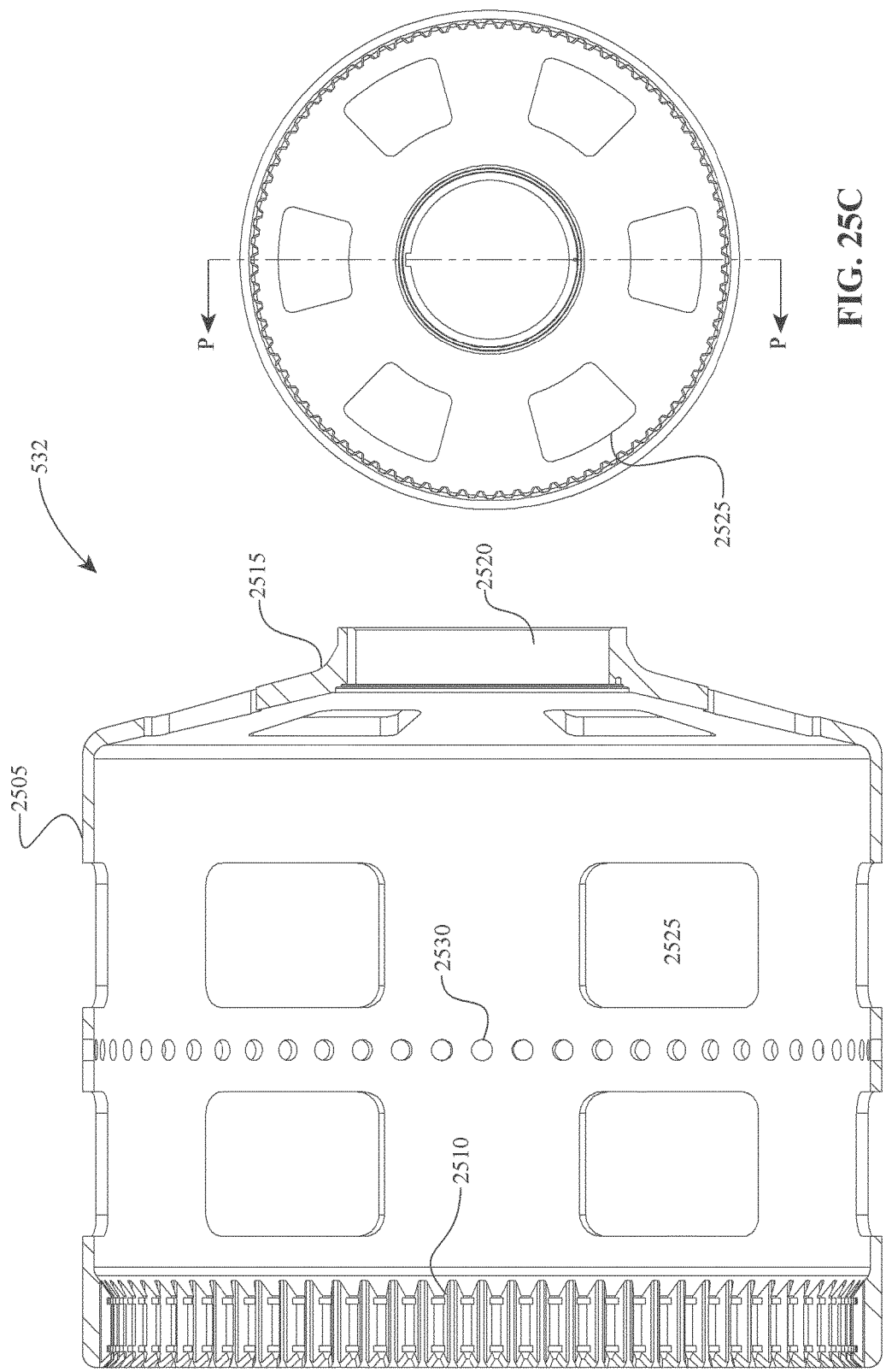

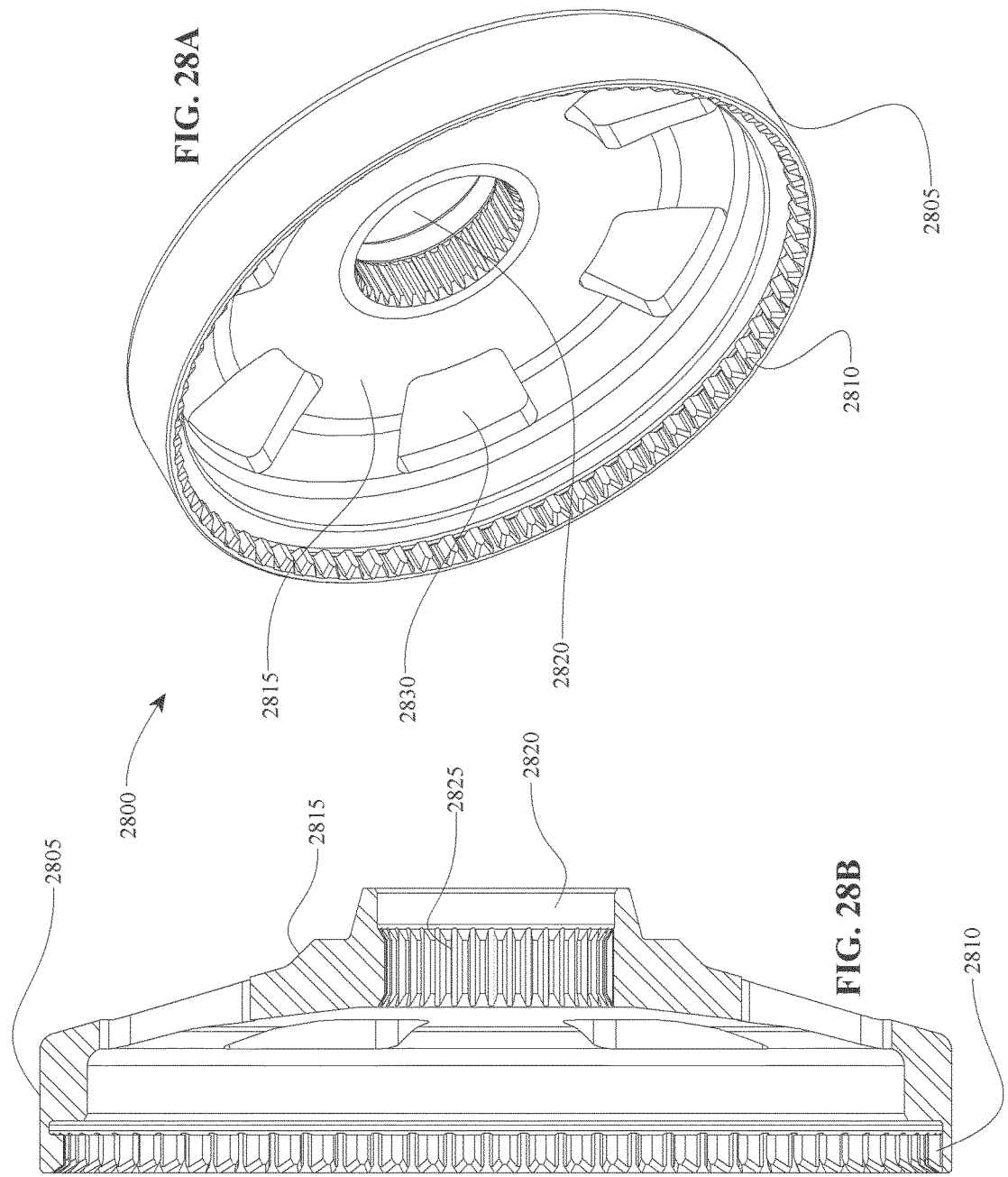

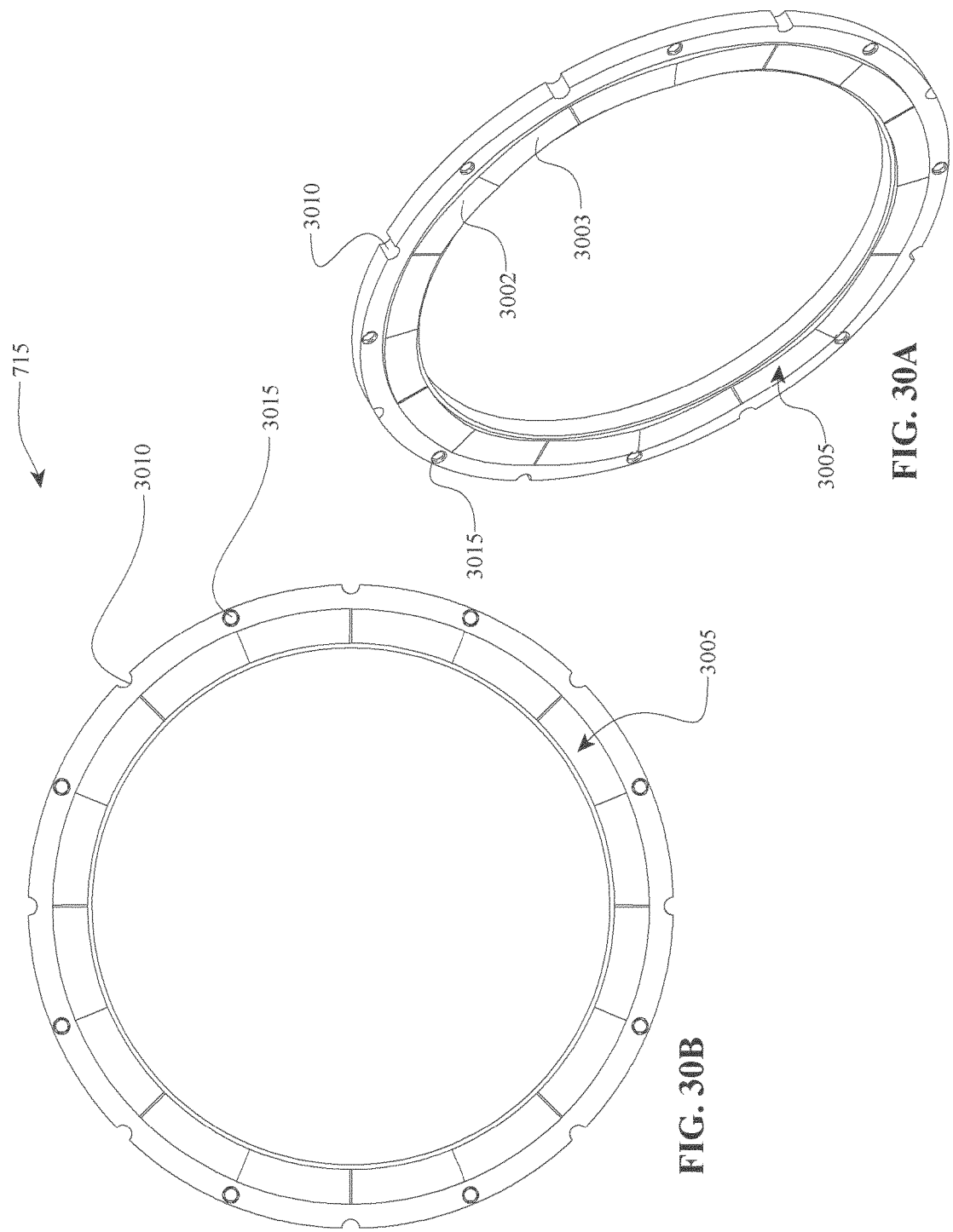

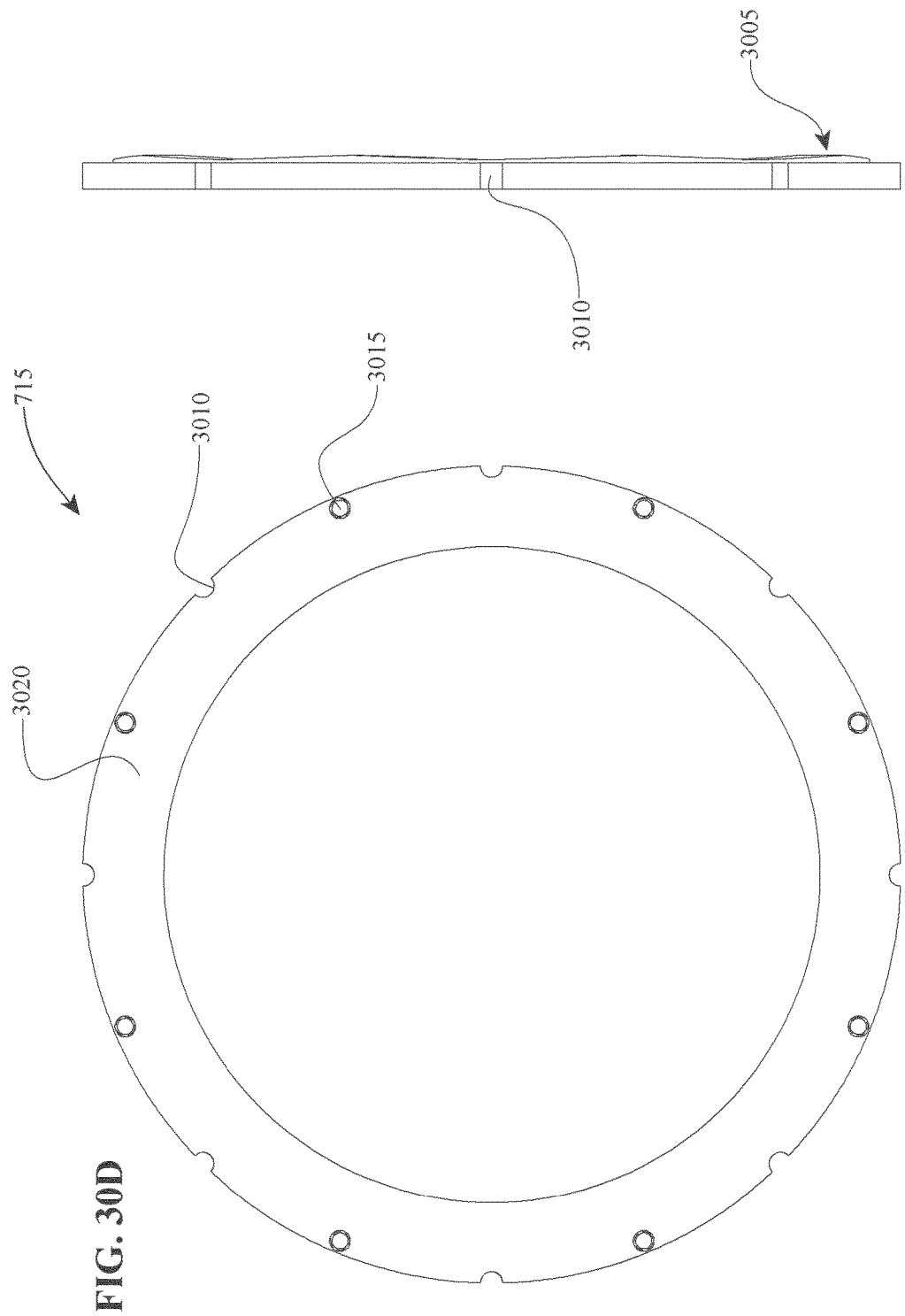

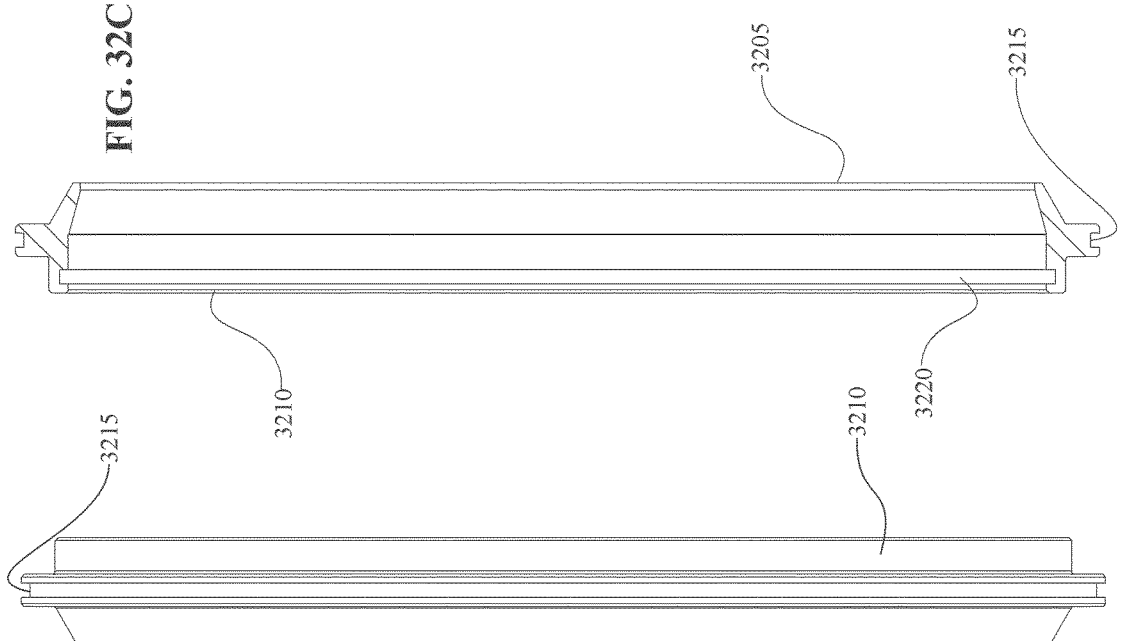
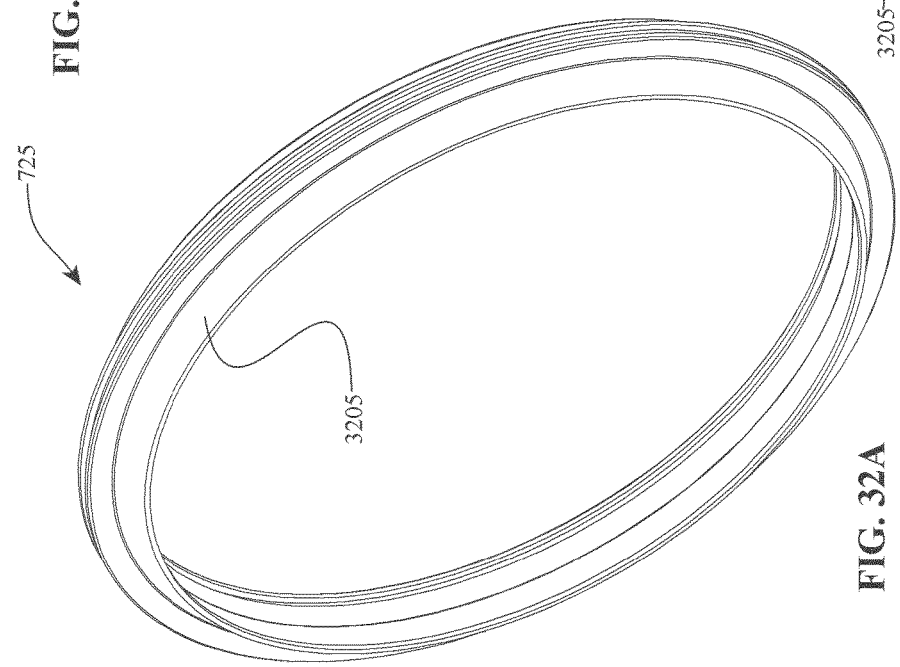

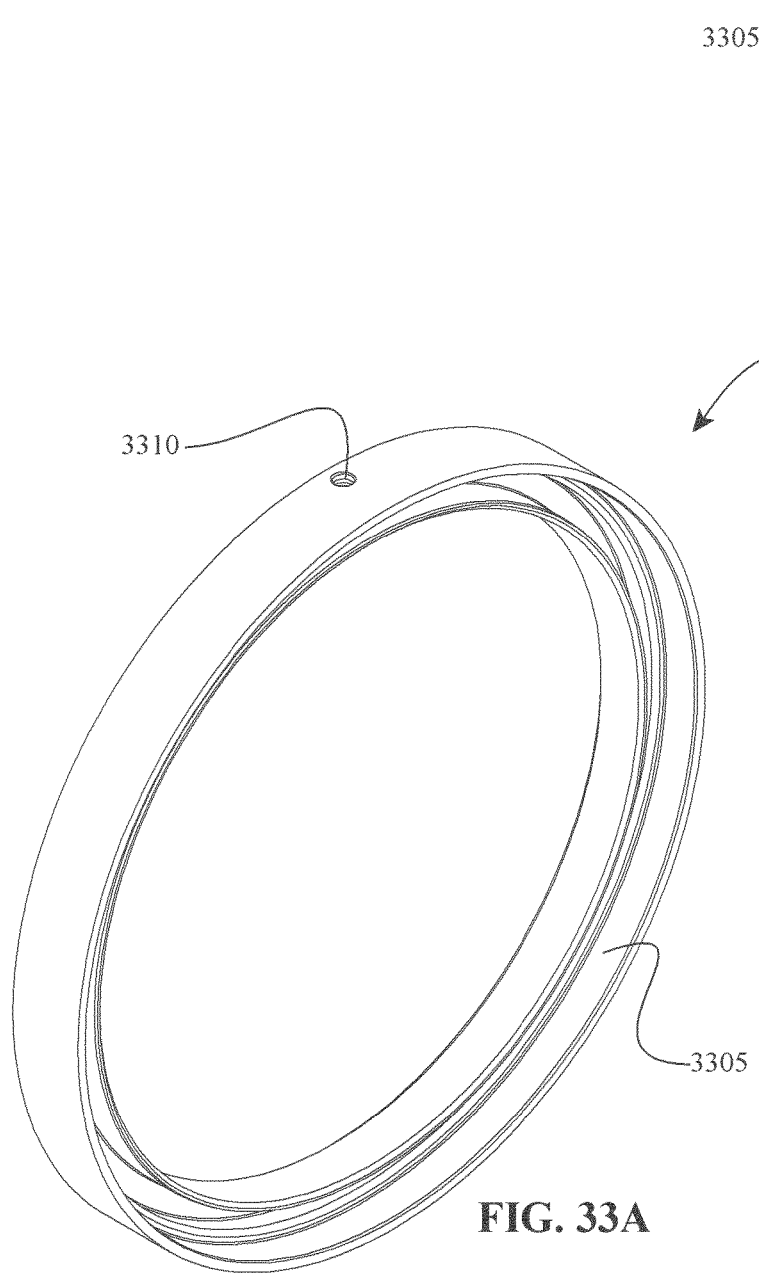
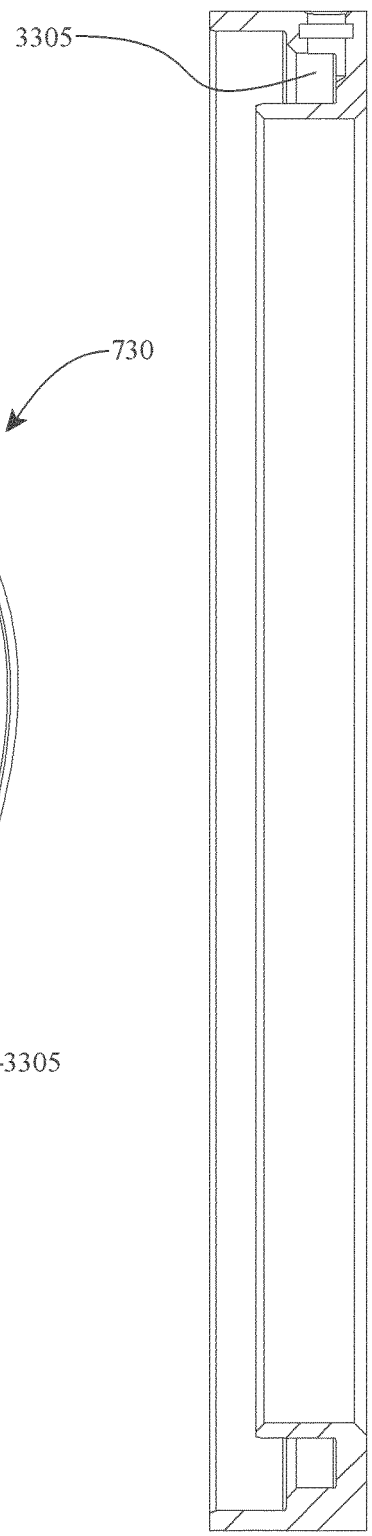
FIG. 33A
FIG. 33B

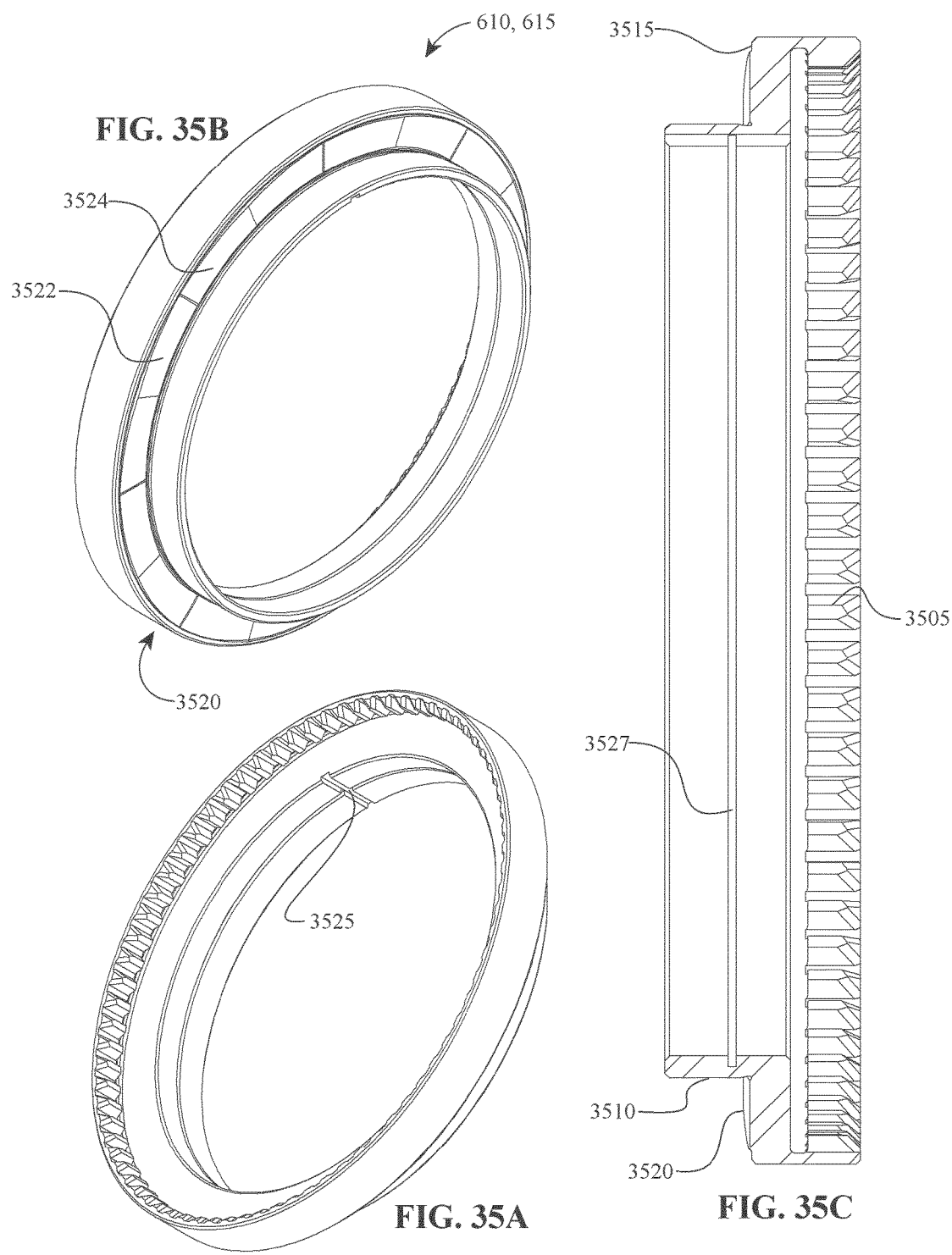

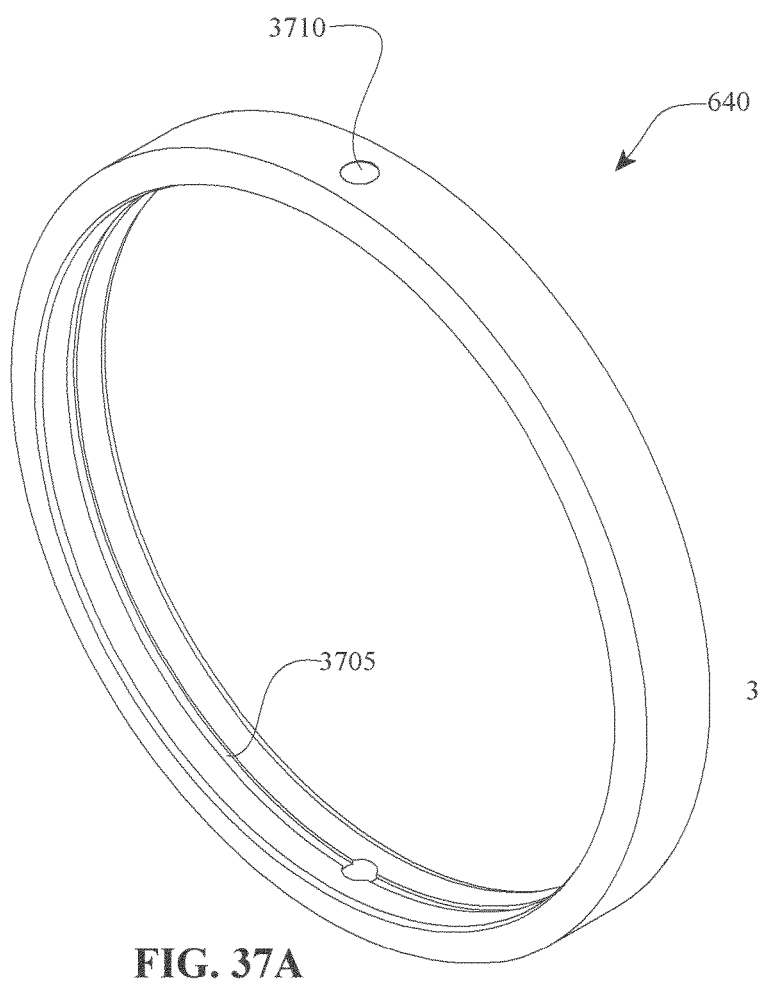
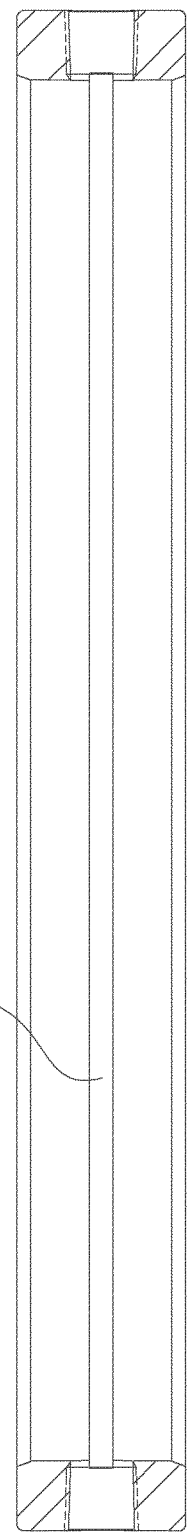
FIG. 37A
FIG. 37B

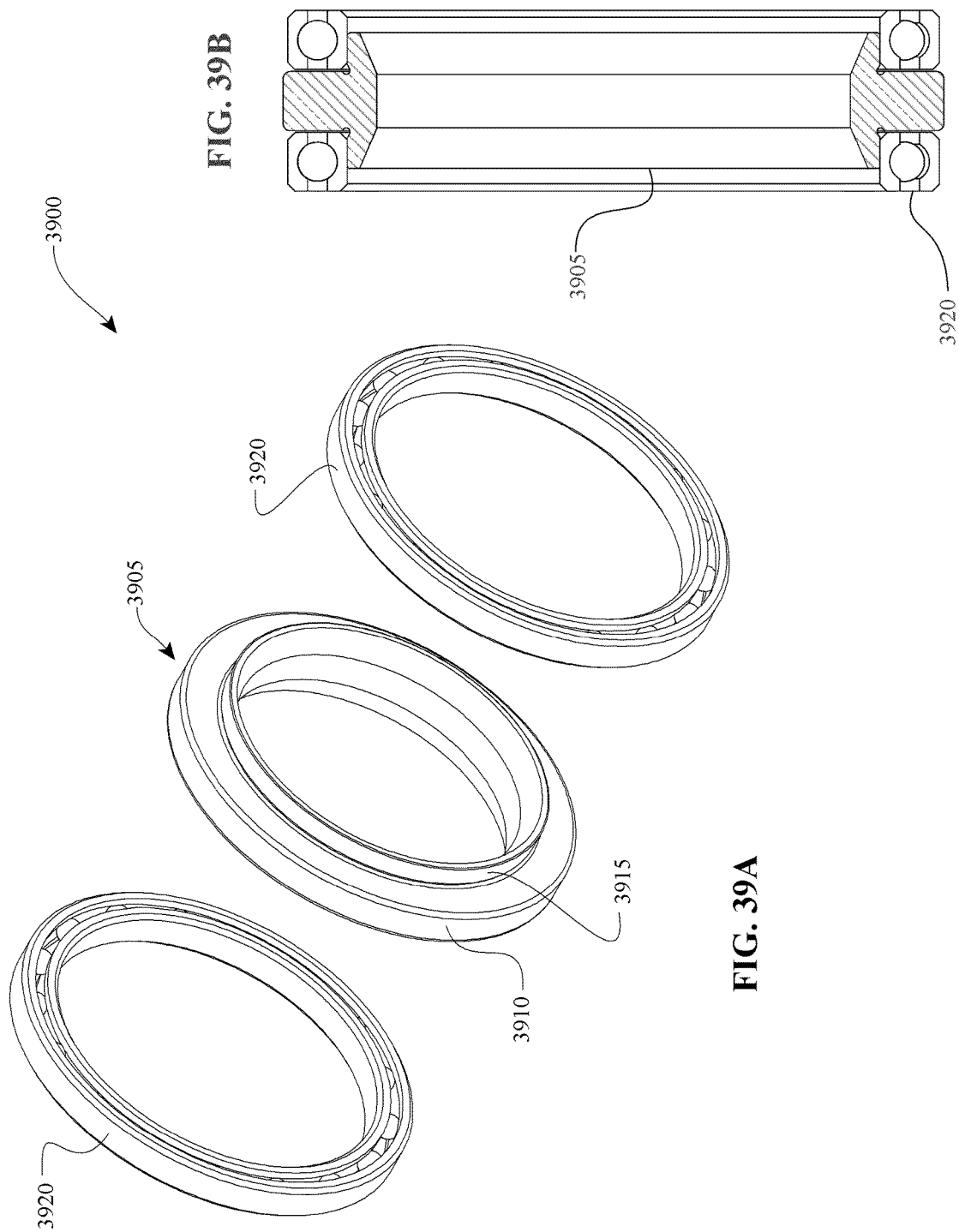

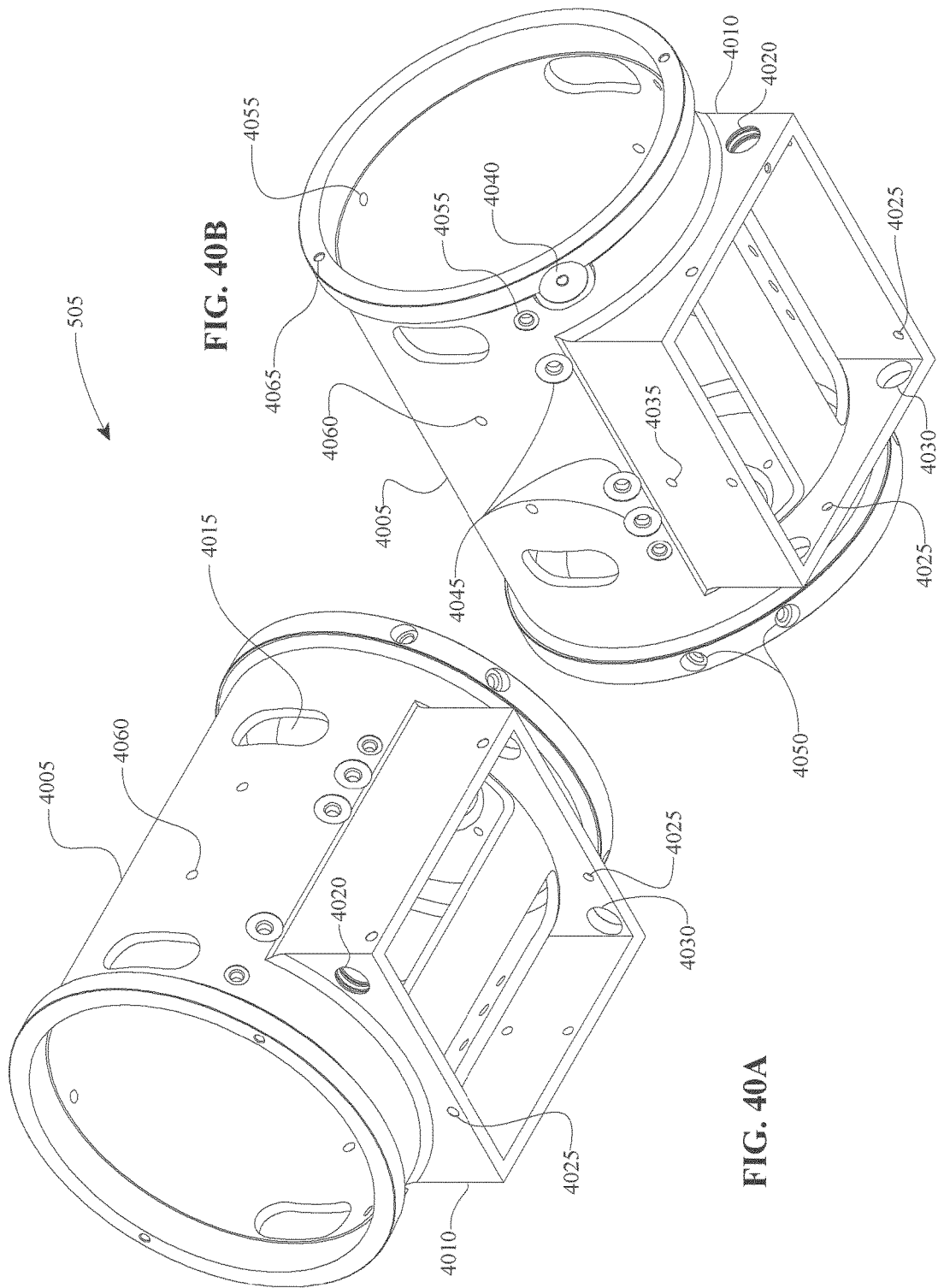

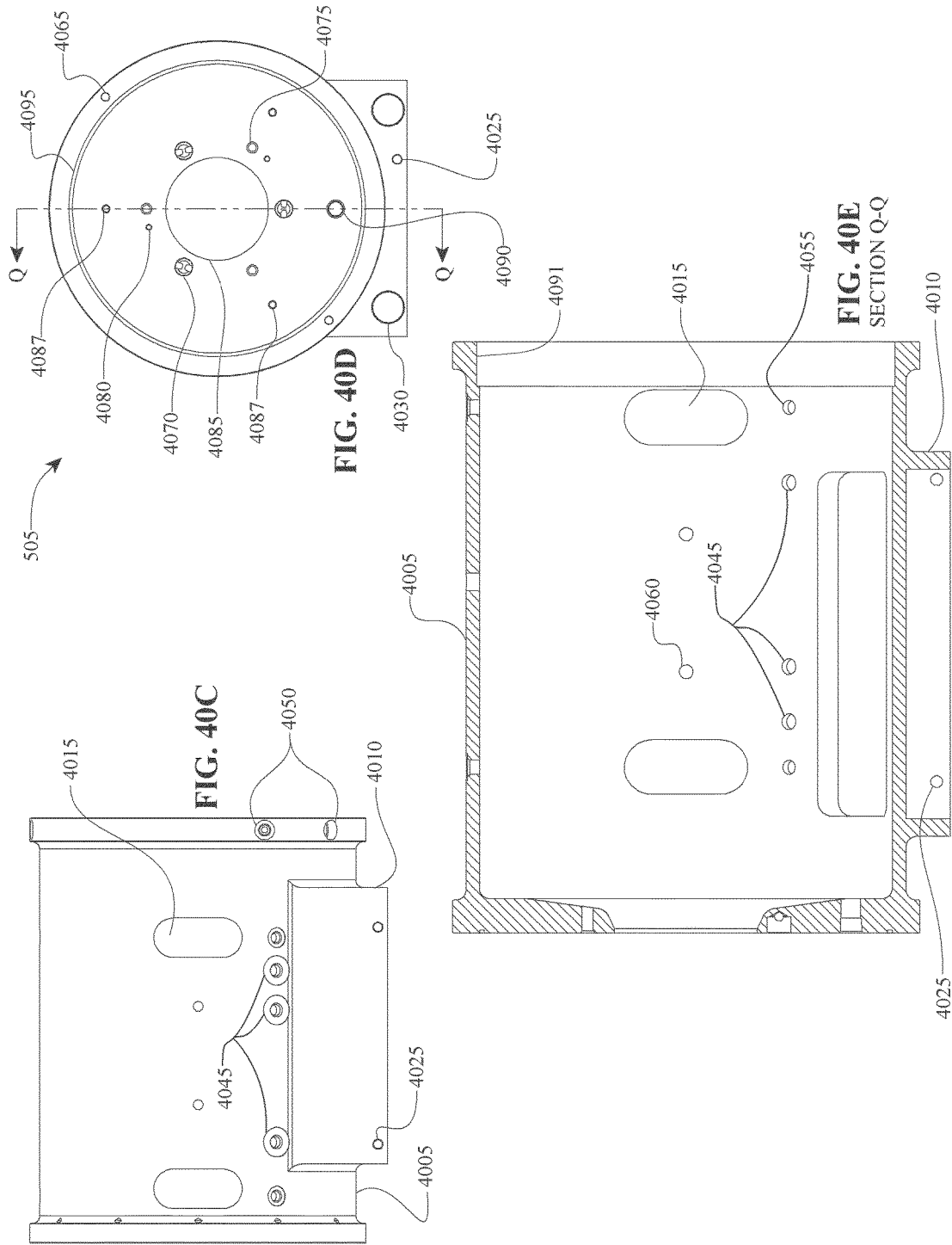

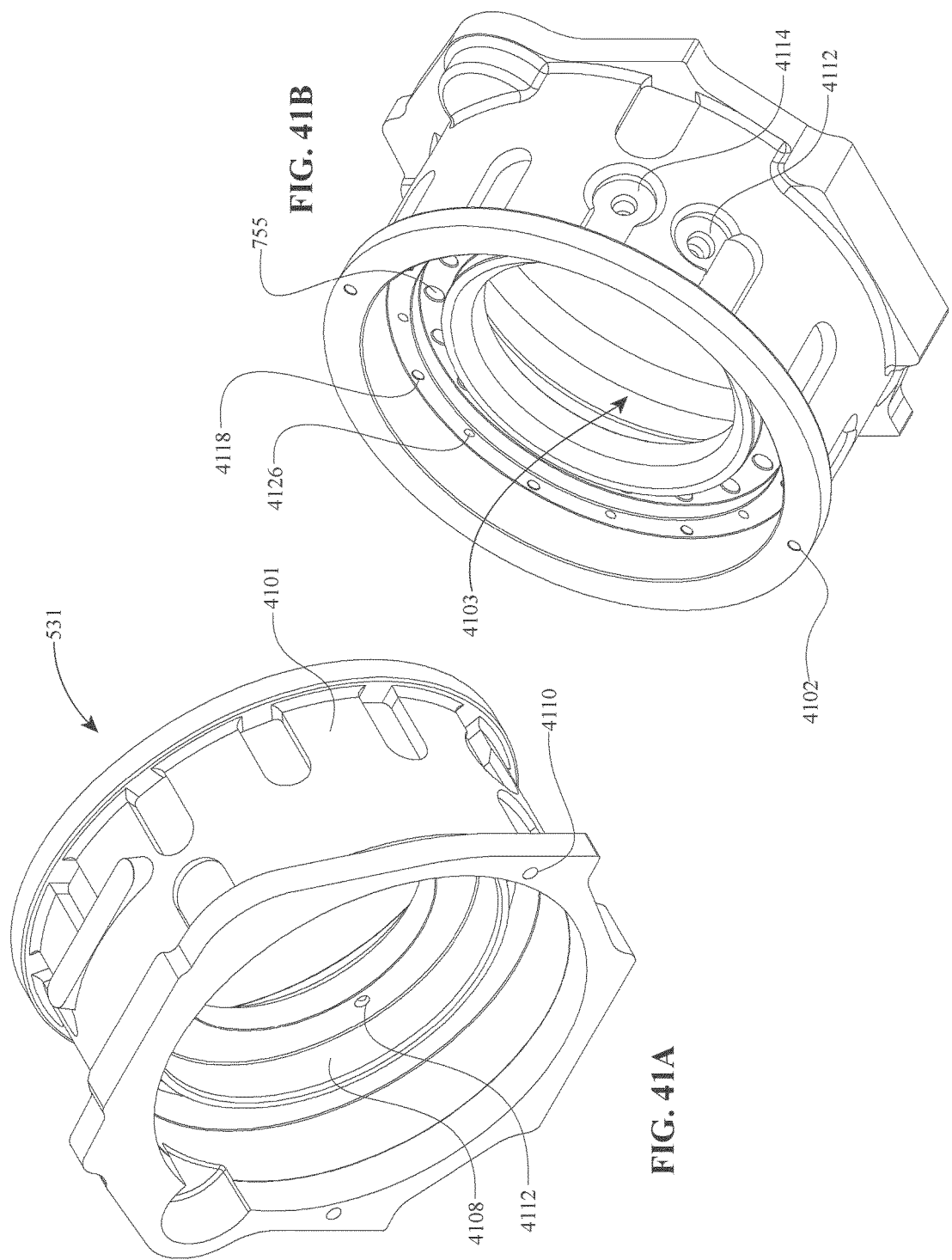

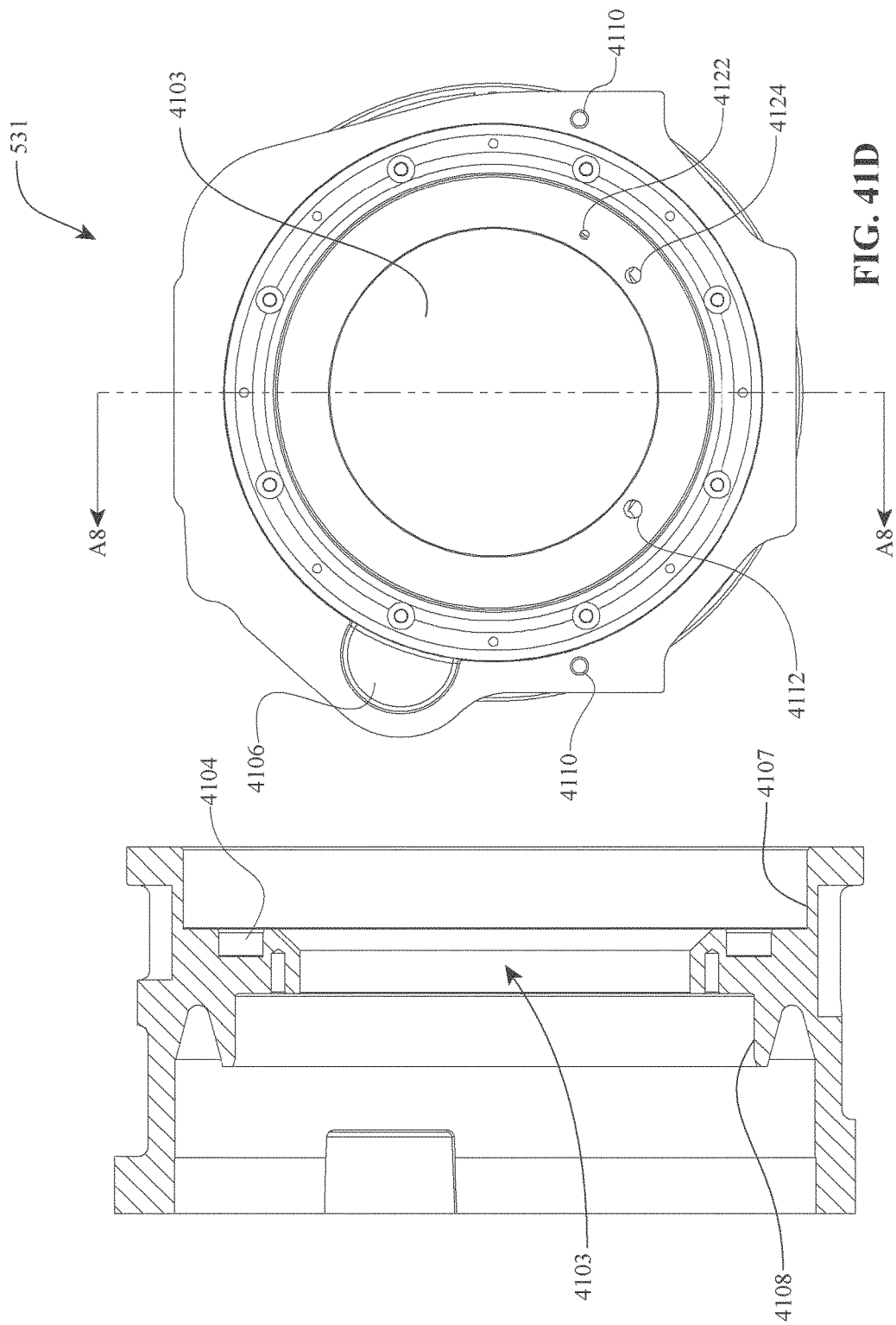

INFINITELY VARIABLE TRANSMISSIONS, CONTINUOUSLY VARIABLE TRANSMISSIONS, METHODS, ASSEMBLIES, SUBASSEMBLIES, AND COMPONENTS THEREFOR

CROSS-REFERENCE TO RELATED APPLICATIONS

This application is a continuation of U.S. application Ser. No. 14/082,017, filed Nov. 15, 2013 and scheduled to issue on Jan. 19, 2016 as U.S. Pat. No. 9,239,099, which is a divisional of U.S. application Ser. No. 13/679,702, filed Nov. 16, 2012 and issued as U.S. Pat. No. 8,585,528 on Nov. 19, 2013, which is a continuation of U.S. patent application Ser. No. 12/527,400, filed Aug. 14, 2009 and issued as U.S. Pat. No. 8,313,404 on Nov. 20, 2012, which is a U.S. National Phase under 35 U.S.C. § 371 of International Patent Application No. PCT/US2008/053951, filed Feb. 14, 2008, and published in English on Aug. 21, 2008 as WO 2008/101070, which claims the benefit of U.S. Provisional Application No. 60/890,438, filed on Feb. 16, 2007, all of which are incorporated by reference in their entirety.

BACKGROUND OF THE INVENTION

Field of the Invention

The field of the inventive embodiments relates generally to mechanical power transmission, and more particularly to methods, systems, devices, assemblies, subassemblies and/or components for continuously or infinitely variable transmissions.

Description of the Related Art

In certain systems, power is characterized by torque and rotational speed. More specifically, power in these systems is generally defined as the product of torque and rotational speed. Typically, a transmission couples to a power input that provides an input torque at an input speed. The transmission also couples to a load that demands an output torque and output speed, which may differ from the input torque and input speed. Typically, and generalizing, a prime mover provides the power input to the transmission, and a driven device or load receives the power output from the transmission. A primary function of the transmission is to modulate the power input in such a way to deliver a power output to the driven device at a desired ratio of input speed to output speed ("speed ratio").

Some mechanical drives include transmissions of the type known as stepped, discrete, or fixed ratio. These transmissions are configured to provide speed ratios that are discrete or stepped in a given ratio range. For example, such a transmission may provide for a speed ratio of 1:2, 1:1, or 2:1, but such a transmission cannot deliver intermediate speed ratios such as 1:1.5, 1:1.75, 1.5:1, or 1.75:1, for example. Other drives include a type of transmission generally known as a continuously variable transmission (or "CVT"), which includes a continuously variable variator. A CVT, in contrast to a stepped transmission, is configured to provide every fractional ratio in a given range. For example, in the range mentioned above, a CVT is generally capable of delivering any desired speed ratio between 1:2 and 2:1, which would include speed ratios such as 1:1.9, 1:1.1, 1.3:1, 1.7:1, etc. Yet other drives employ an infinitely variable transmission (or "IVT"). An IVT, like a CVT, is capable of producing every speed ratio in a given ratio range. However, in contrast to a CVT, the IVT is configured to deliver a zero output speed (a "powered zero" state) with a steady input speed. Hence, given the definition of speed ratio as the ratio of input speed to output speed, the IVT is (at least theoretically) capable of delivering an infinite set of speed ratios, and consequently, the IVT is not limited to a given ratio range. It should be noted that some transmissions use a continuously variable variator coupled to other gearing and/or clutches to produce IVT functionality. However, as used here, the term IVT is primarily understood as comprehending an infinitely variable variator which produces IVT functionality without being necessarily coupled to additional gearing and/or clutches.

The field of mechanical power transmission is cognizant of continuous or infinitely variable variators of several types. For example, one well known class of continuous variators is the belt-and-variable-radius-pulley variator. Other known variators include hydrostatic, toroidal, and cone-and-ring variators. In some cases, these variators couple to other gearing to provide IVT functionality. Some hydromechanical variators can provide infinite ratio variability without additional gearing. Some variators, continuously and/or infinitely variable, are classified as frictional or traction variators because they rely on dry friction or elastohydrodynamic traction, respectively, to transfer torque across the variator. One example of a traction variator is a ball variator in which spherical elements are clamped between torque transfer elements and a thin layer of elastohydrodynamic fluid serves as the torque transfer conduit between the spherical and the torque transfer elements. It is to this latter class of variators that the inventive embodiments disclosed here are most related.

There is a continuing need in the CVT/IVT industry for transmission and variator improvements in increasing efficiency and packaging flexibility, simplifying operation, and reducing cost, size, and complexity, among other things. The inventive embodiments of the CVT and/or IVT methods, systems, subassemblies, components, etc., disclosed below address some or all of the aspects of this need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a carrier input cap for an infinitely variable transmission having planet-pivot arm assemblies. In one embodiment, the carrier input cap has a generally circular body with a central bore. In one embodiment the carrier input cap includes a group of carrier fingers arranged angularly about the central bore. The carrier fingers have a first set of fluid channels. The carrier input cap includes a set of surfaces formed on the carrier fingers. The surfaces can be configured to couple to the planet-pivot arm assemblies.

Another aspect of the invention addresses a carrier center block for an infinitely variable transmission having planet-pivot arm assemblies. The carrier center block includes a generally circular body having a central bore, and the carrier center block includes a neck extending axially from the circular body and concentric with the central bore. In one embodiment, the carrier center block includes several carrier fingers arranged angularly about, and extending radially from, the central bore. The carrier fingers have a first set of fluid channels. The carrier center block also has a set of surfaces formed on the carrier fingers. The surfaces can be configured to couple to the planet-pivot arm assemblies.

One more aspect of the invention concerns a carrier output block for an infinitely variable transmission having planet-pivot arm assemblies. The carrier output block includes a generally circular body having a central bore, and includes a shaft extending from the circular body and coaxial with the central bore. The shaft has a splined end. In one embodiment, the carrier output block has several carrier fingers arranged angularly about, and extending radially from, the central bore. The carrier fingers have a first set of fluid channels. In one embodiment, the carrier output block also has several surfaces formed on the carrier fingers. The surfaces can be configured to couple to the planet-pivot arm assemblies.

Yet another aspect of the invention involves a pivot arm for an infinitely variable transmission. The pivot arm includes a first arm extension having a first bearing bore and a pivot bore configured on one end of the first arm extension at a distal location from the first bearing bore. In one embodiment, the pivot arm has a second arm extension coupled on one end to the pivot bore. The second arm extension has a second bearing bore formed on an end of the second arm extension that is at a distal location from the pivot bore. At least one of the first and second arm extensions has a group of lubricant passages.

One aspect of the invention concerns a pivot arm for a shifting mechanism of an infinitely variable transmission (IVT), where the shifting mechanism has a planet axle. The pivot arm has a central pivot bore, a first extension extending from the central pivot bore. The pivot arm has a second extension extending from the central pivot bore and opposite the first extension. In one embodiment, the pivot arm has first and second axle bores respectively located on the first extension and the second extension. The axle bores can be configured to receive the planet axle.

Another aspect of the invention relates to a planet axle for a variator. The planet axle has an elongated body with a substantially cylindrical center portion. The planet axle also has a plurality of grooves arranged on the cylindrical central portion. At least one of the grooves is configured to receive an elastomer ball. At least one of the grooves is configured to receive a retainer clip. In one embodiment, the planet axle has a first neck on one end of the elongated body. The first neck can be configured to taper radially toward a longitudinal axis of the elongated body. The first neck can also be configured to expand radially toward the cylindrical central portion. The planet axle can have a second neck on another end of the elongated body opposite the first neck. The second neck can be configured to taper radially toward the longitudinal axis of the elongated body, and the second neck can be configured to expand radially toward the cylindrical center portion.

Yet one more aspect of the invention addresses a planet axle for a pivot-arm assembly of an infinitely variable transmission. The planet axle has an elongated body with a substantially cylindrical central portion. The cylindrical central portion has a set of eccentric grooves. In one embodiment, the planet axle has a first cylindrical portion extending from and coaxial with, the cylindrical central portion. The first cylindrical portion has a smaller diameter than the cylindrical central portion. The planet axle includes a second cylindrical portion extending from and coaxial with, the first cylindrical portion. The second cylindrical portion has a smaller diameter than the first cylindrical portion. In one embodiment, the planet axle has a third cylindrical portion extending from, and coaxial with, the second cylindrical portion, the third cylindrical portion has a smaller diameter than the second cylindrical portion.

In another aspect, the invention concerns an input shaft for an infinitely variable transmission having a hydraulic system. The input shaft includes a substantially cylindrical body having a central bore. The cylindrical body can be configured to house a valve of the hydraulic system. In one embodiment, the input shaft includes a manifold flange that extends from a first end of the cylindrical body. The input shaft can have a splined portion extending from a second end of the cylindrical body. The input shaft can also have several recesses formed on the outer face of the flange. The recesses can be configured to cooperate with the hydraulic system. In one embodiment, the input shaft a number of fluid channels arranged on the outer face of the flange.

Another aspect of the invention relates to an input shaft for a transmission having an elongated body with an external surface. The input shaft includes a central cavity formed in the elongated body. The input shaft can have several fluid channels configured to provide fluid communication between the central cavity and the external surface. In one embodiment, the input shaft has a valve spool positioned in the central cavity.

One aspect of the invention relates to an input shaft for an infinitely variable transmission having a hydraulic system. The input shaft includes a substantially cylindrical body having a central bore. In one embodiment, the input shaft has a manifold flange extending from a first end of the cylindrical body. The input shaft can include a splined portion extending from a second end of the cylindrical body. The input shaft has several seal grooves formed on an outer circumference of the cylindrical body. The seal grooves can be configured to provide several fluid chambers disposed between the seal grooves. In one embodiment, the input shaft has several fluid ports arranged on the outer circumference of the cylindrical body. The fluid ports can be arranged between the seal grooves.

Another aspect of the invention addresses a fluid manifold for an infinitely variable transmission having a hydraulic system. The fluid manifold has a substantially circular body having a first face, a second face, and a central bore. In one embodiment, the fluid manifold has a lubricant fluid port located on the periphery of the first face. The fluid manifold has several lubricant fluid channels configured to be in fluid communication with the lubricant fluid port. The lubricant fluid channels can be spaced angularly about the central bore, and the lubricant fluid channels can be formed on the second face. In one embodiment, the fluid manifold has a line pressure port located on the periphery of the first face. The fluid manifold has a line pressure fluid channel configured to be in fluid communication with the line pressure port. The line pressure fluid channel formed on the second face. The fluid manifold includes a pilot pressure port located on the periphery of the first face. In one embodiment, the fluid manifold includes a pilot pressure fluid channel configured to be in fluid communication with the pilot pressure port. The pilot pressure fluid channel formed on the second face.

One more aspect of the invention concerns a pivot pin hub for an infinitely variable transmission (IVT). The pivot pin hub includes a substantially cylindrical body having a central bore. The pivot pin hub has a number of finger pairs arranged angularly about, and concentric to, the central bore. The finger pairs extend radially from the central bore. The pivot pin hub includes a first face of the cylindrical body having a substantially flat surface. In one embodiment, the pivot pin hub has a second face of the cylindrical body having several flutes configured to couple to a lock washer of the IVT.

Yet another aspect of the invention involves a control piston for an infinitely variable transmission (IVT). The control piston includes a substantially cylindrical body having a central bore. In one embodiment, the control piston has a flange located at a first end of the cylindrical body. The flange extends radially from the central bore. The control piston has a groove formed on the cylindrical body. The groove can be located on a second end of the cylindrical body, and the groove can be configured to receive a lock washer of the IVT. The control piston includes a seal recess formed on the outer circumference of the flange.

One aspect of the invention concerns a traction ring for an infinitely variable transmission. The traction ring includes a substantially annular ring. In one embodiment, the traction ring has a straight face formed on one side of the annular ring. The traction ring includes a traction surface extending from the straight face toward an inner circumference of the annular ring. The traction surface is angled with respect to the straight face. The traction ring has a set of splines formed on the periphery of the annular ring.

Another aspect of the invention relates to a drive flange for an infinitely variable transmission. The drive flange includes a substantially annular and cylindrical body having a first end and a second end. The first end is placed at a distal location relative to the second end. The drive flange has a set of splines formed on the inner diameter of the first end. The drive flange includes a cap formed on the second end. The cap has a central bore.

Yet one more aspect of the invention addresses a reaction flange for an infinitely variable transmission (IVT). The reaction flange includes a generally annular and cylindrical body having a first end and a second end. In one embodiment, the reaction flange has a set of splines formed on the inner circumference of the first end. The reaction flange has a substantially flat surface formed on the second end. The flat surface can be configured to react axial force during operation of the IVT. The flat surface has several dowel recesses.

In another aspect, the invention concerns a torque transfer coupling for an infinitely variable transmission (IVT). The torque transfer coupling includes a substantially annular cylinder having a first end, a middle portion, and a second end. In one embodiment, the torque transfer coupling has a first set of splines formed on the inner circumference of the first end. The torque transfer coupling has a second set of splines formed on the inner circumference of the second end. The torque transfer coupling also has a third set of splines formed on the outer circumference of the middle portion.

Another aspect of the invention relates to a reaction flange for an infinitely variable transmission having a traction ring. The reaction flange includes a substantially circular body having a first end, a second end, and a central bore. The reaction flange has a first set of splines formed on the inner circumference of the first end. The first set of splines can be configured to couple to the traction ring. The reaction flange also has an end cover formed on the second end. The end cover has a splined central bore.

One aspect of the invention relates to an input cam flange for an infinitely variable transmission. The input cam flange includes a substantially cylindrical and tubular body having a first end and a second end. In one embodiment, the input cam flange has a set of splines formed on the inner circumference of the first end. The input cam flange has a flange extending from the periphery of the cylindrical and tubular body. The input cam flange includes a set of cam ramps formed on the flange. The cam ramps have a set of counterclockwise helical ramps and a set of clockwise helical ramps. The input cam flange also has a neck extending from the flange.

Another aspect of the invention addresses a cam base for an infinitely variable transmission. The cam base includes a substantially annular ring having a set of cam ramps formed on one face of the annular ring. The set of cam ramps include a set of counterclockwise helical ramps and a set of clockwise helical ramps. The cam base also has several dowel recesses formed on outer circumference of the annular ring.

One more aspect of the invention concerns a cam load piston for an infinitely variable transmission (IVT). The cam load piston includes a substantially annular flange having a substantially flat surface on one side and a recessed portion on a side that is opposite to the side with the flat surface. The recessed portion can be configured to couple to compression springs of the IVT. The cam load piston has a first sealing ring groove formed on an inner circumference of the annular flange. The cam load piston also has a second sealing ring groove formed on an outer circumference of the annular flange.

Yet another aspect of the invention involves an unloader piston for an infinitely variable transmission (IVT) having an unloader cylinder. The unloader piston is a substantially annular ring. In one embodiment, the unloader piston has a first rim formed on a face of the annular ring. The first rim can be configured to couple to the unloader cylinder. The unloader piston has a second rim formed on a side that is opposite to the face with the first rim. The unloader piston has a first seal groove formed on an outer circumference of the annular ring. The unloader piston also has a second seal groove formed on an inner circumference of the annular ring.

One aspect of the invention concerns a center cam base for an infinitely variable transmission. The center cam base includes a substantially annular cylindrical body. In one embodiment, the center cam base includes a set of splines formed on an outer circumference of the annular cylindrical body. The center cam base has a first set of ramps formed on a first face of the annular cylindrical body. The center cam base also has a second set of ramps formed on a second face of the annular cylindrical body.

Another aspect of the invention relates to a cam ring for an infinitely variable transmission. The cam ring includes a substantially circular flange having a central bore. The cam ring has a set of splines formed on an inner circumference of the central bore. In one embodiment, the cam ring has a cam shoulder formed on an outer periphery of the circular flange. The cam shoulder has a neck extending from the cam shoulder. The neck has a clip ring groove formed on the inner circumference. The cam shoulder also has a set of cam ramps formed on the cam shoulder.

Yet one more aspect of the invention addresses an output disc for an infinitely variable transmission. The output disc has a substantially annular cylindrical body. In one embodiment, the output disc has a first set of splines formed on an inner circumference of a first end of the annular cylindrical body. The output disc has a second set of splines formed on an outer circumference of a second end of the annular cylindrical body. The output disc also has a flange extension extending from the second end of the annular cylindrical body.

In another aspect, the invention concerns a variator housing for an infinitely variable transmission (IVT). The variator housing includes a substantially cylindrical container having a first end and a second end. The variator housing has a skirt extending from the cylindrical container. The skirt is configured to couple to an oil pan of the IVT. In one embodiment, the variator housing has a set of pick up ports arranged on the skirt. The variator housing has several instrumentation access ports arranged on the cylindrical container. The variator housing has a first set of dowel pin holes arranged on the first end of the cylindrical container. The variator housing also has a second set of dowel pin holes arranged on the second end of the container, and the variator housing has several lubrication ports arranged on a peripheral surface of the second end of the cylindrical container.

Another aspect of the invention relates to a bell housing for an infinitely variable transmission having a hydraulic system. The bell housing includes a substantially cylindrical body having a central passage. In one embodiment, the bell housing has a cam load piston port formed on the periphery of the cylindrical body. The bell housing has a lubrication port formed on the periphery of the cylindrical body, and the bell housing has a line pressure port formed on the periphery of the cylindrical body. The bell housing includes a pilot pressure port formed on the periphery of the cylindrical body. The cam load piston port, the lubrication port, the line pressure port, and the pilot pressure port are each configured to be in fluid communication with the hydraulic system. The bell housing also includes a recess formed on the central passage. The recess can be configured to couple to a cover plate of the transmission.

One aspect of the invention relates to a drivetrain having a power source and an infinitely variable variator coupled to the power source. The infinitely variable variator includes a first set of traction rollers and a second set of traction rollers. The infinitely variable variator has a carrier operationally coupled to the first and the second sets of traction rollers. The carrier can be configured to rotate about a longitudinal axis of the infinitely variable variator. In one embodiment, the drivetrain includes a hydraulic system configured to control the transmission ratio of the infinitely variable variator.

Another aspect of the invention addresses a drivetrain for a tractor having a bell housing gearing and an infinitely variable transmission operably coupled to the bell housing gearing. The infinitely variable transmission includes a carrier configured to rotate about a longitudinal axis of the infinitely variable transmission. The infinitely variable transmission has a first set of planet-pivot arm assemblies. The carrier is operationally coupled to at least one of the planet-pivot arm assemblies. The drivetrain also includes a range box coupled to the infinitely variable transmission.

One more aspect of the invention concerns a variator having an input shaft arranged along a longitudinal axis of the variator. The variator includes a carrier operationally coupled to the input shaft. In one embodiment, the variator includes an array of pivot-arm assemblies operationally coupled to the carrier. The variator has a set of traction rollers coupled to the pivot arm assemblies. The variator also has a set of planet axles coupled to the traction rollers. The traction rollers are adapted to rotate about a planet axis substantially coaxial with the planet axles.

Yet another aspect of the invention involves a variator having an input shaft and a carrier coupled to the input shaft. The variator has a first set of planet-pivot arm assemblies operationally coupled to the carrier. In one embodiment, the variator has a first non-rotatable traction ring operationally coupled to the first set of planet-pivot arm assemblies. The variator has an output traction ring operationally coupled to the first set of planet-pivot arm assemblies, and the variator has a torque transfer device operationally coupled to the output traction ring. In one embodiment, the variator has an axial force generating mechanism operationally coupled to the first non-rotatable traction ring. The variator also has a second set of planet-pivot arm assemblies coupled to the carrier. Each of the planet-pivot arm assemblies of the first and second sets of planet-pivot arm assemblies include a planet and a planet axle operationally coupled to the planet. The planet-pivot arm assemblies also include a pivot arm coupled to the planet axle. The pivot arm can be operationally coupled to a ratio shifting mechanism of the variator.

One aspect of the invention concerns a planet-pivot arm assembly for an infinitely variable transmission having a ratio shifting mechanism. The planet-pivot arm assembly includes a planet and a planet axle operationally coupled to the planet. The planet-pivot arm assembly also includes a pivot arm coupled to the planet axle. The pivot arm is operationally coupled to the ratio shifting mechanism.

Another aspect of the invention relates to a planet-pivot arm assembly for a variator of an infinitely variable transmission. The planet-pivot arm assembly has a substantially spherical planet with a central bore. In one embodiment, the planet-pivot arm assembly has a planet axle having a first and a second end. The planet-pivot arm assembly also has a set of elastomer balls mounted in the planet axle and configured to be a frictional interface between the central bore of the planet and the planet axle.

Yet one more aspect of the invention addresses a planet-pivot arm assembly for an infinitely variable transmission. The planet-pivot arm assembly includes a substantially spherical planet and a planet axle operationally coupled to the planet. The planet-pivot arm assembly has a pivot arm coupled to the planet axle. The pivot arm includes a first arm extension having a first bearing bore, and a second arm extension having a second bearing bore. The pivot arm also includes a pivot bore coupled to the first and second arm extensions. The pivot bore can be placed at a distal location from the first and second bearing bores. The planet-pivot arm assembly includes several lubricant passages formed in the first and second arm extensions.

In another aspect, the invention concerns a center cam assembly for applying an axial load to components of an infinitely variable transmission having traction rings and one or more arrays of planets. The center cam assembly includes a first cam ring configured to operably couple to a first traction ring. The center cam assembly has a second cam ring configured to operably couple to a second traction ring. The first and second cam rings are adapted to generate an axial force that urges the first and second traction rings against the one or more arrays of planets. The center cam assembly includes a number of torque transfer rings interposed between the first and second traction rings and the first and second cam rings, respectively. The center cam assembly also includes a center cam base having a set of ramps. The center cam base can be operably coupled to the first and second cam rings. The center cam base is interposed between the first and second cam rings. The center cam assembly also includes a number of cam rollers configured to cooperate with the first and second cam rings to generate an axial force.

Another aspect of the invention relates to a center cam assembly a centering coupling and a traction ring configured to have a flange. The centering coupling is operationally coupled to the flange. The center cam assembly includes a drive output element coaxial with the traction ring. The drive output element can be operably coupled to the centering coupling. The center cam assembly has a center output transfer element coupled to the drive output element. The center cam assembly also has a number of axial force generating elements interposed between the traction ring and the center output transfer element.

One aspect of the invention relates to an input cam assembly for an infinitely variable transmission having a traction ring. The input cam assembly includes a cam flange configured to couple to the traction ring. In one embodiment, the input cam assembly includes a cam base positioned coaxially with the cam flange. The input cam assembly has a set of cam rollers supported in a roller retainer. The cam rollers can be adapted to interact with the cam base.

Another aspect of the invention addresses a carrier for an infinitely variable transmission (IVT). The carrier includes a first carrier center block. In one embodiment, the carrier has a second carrier center block coupled to the first carrier center block. A hydraulic fluid chamber is formed at the interface between the first and second carrier center blocks. The carrier includes a carrier input cap coupled to the first carrier center block. The carrier also includes a carrier output cap coupled to the second carrier center block.

One more aspect of the invention concerns a hydraulic ratio shifting control system for a variator having a plurality of planets operationally coupled to planet axles and to pivot arms. The hydraulic ratio shifting control system includes a piston operationally coupled to at least one pivot arm of the variator. The hydraulic ratio shifting control system has a regulator configured to hydraulically actuate the piston and thereby actuate the pivot arm. In one embodiment, the hydraulic ratio shifting control system includes a control signal device operably coupled to the regulator. The hydraulic ratio shifting control system has a synchronizer mechanism operationally coupled to the pivot arms. The hydraulic ratio shifting control system also has a feedback system coupled between the synchronizer mechanism and the regulator.

Yet another aspect of the invention involves a ratio shifting mechanism for a continuously variable transmission having an input shaft and a carrier. The ratio shifting mechanism includes a hydraulic valve adapted to be integral, at least in part, with the input shaft. The ratio shifting mechanism includes a hydraulic circuit configured to allow a control fluid to flow in and out of the carrier through a number of channels and chambers. At least some of the channels and chambers are formed in the input shaft.

Another aspect of the invention addresses a position feedback mechanism for a continuously or infinitely variable transmission. The position feedback mechanism includes a hydraulic control valve configured to cooperate with a shifting mechanism of the transmission. The position feedback mechanism includes a control screw operationally coupled to the control valve. In one embodiment, the position feedback mechanism includes a feedback screw coupled to the control screw. The feedback screw is configured to operably couple to a variator of the transmission.

One more aspect of the invention concerns a synchronizer device for a variator of a continuously or infinitely variable transmission. The synchronizer device includes a control screw and a group of pivot pin hubs coupled to the control screw. The control screw is configured to synchronize a plurality of planet arrays of the transmission to the same tilt angles.

Yet another aspect of the invention involves a shifting mechanism for a continuously or infinitely variable transmission (C/IVT). The shifting mechanism includes a control valve configured to be housed in a cavity of an input shaft of the C/IVT. The shifting mechanism has a control piston in fluid communication with the control valve. The shifting mechanism also includes a pivot pin hub operationally coupled to the control piston. The pivot pin hub can be operably coupled to a pivot arm of the C/IVT.

One aspect of the invention concerns a method of shifting an infinitely variable transmission having a group of pivot arms. The method has the steps of operably coupling a feedback mechanism to the group of pivot arms, and the step of operably coupling a regulator to the feedback mechanism. The method includes the step of delivering one or more indications of the state of the group of pivot arms from the feedback mechanism to the regulator. The method includes receiving a control signal at the regulator, and regulating a hydraulic pressure with the regulator. The hydraulic pressure is based at least in part on the combination of the control signal and the one or more indications of the state of the group of pivot arms. The method also includes the step of actuating a transmission ratio adjustment by using the hydraulic pressure to move the plurality of pivot arms.

Another aspect of the invention relates to a variator including a first array of planet-pivot arm assemblies. The planet-pivot arm assemblies have a first array of traction rollers. The variator includes a second array of planet-pivot arm assemblies. The planet-pivot arm assemblies have a second array of traction rollers. The variator includes a carrier configured to receive and support the arrays of planet-pivot assemblies. Each of the first and second array of traction rollers is arranged angularly about a longitudinal axis of the carrier, and each of the first and second arrays of traction rollers is positioned concentrically with the longitudinal axis of the carrier. The variator includes a first non-rotatable traction ring coupled to the first array of planet-pivot arm assemblies. The variator further includes a second non-rotatable traction ring coupled to the second array of planet-pivot arm assemblies. In one embodiment, the variator has a first output traction ring coupled to the first array of planet-pivot arm assemblies. The variator also has a second output traction ring in contact with the second array of planet-pivot arm assemblies. The variator includes an axial force generation mechanism operably coupled to the first and/or second output traction ring. In one embodiment, the variator has a shifting mechanism coupled to the planet-pivot arm assemblies. The shifting mechanism synchronously actuates the first and second array of planet-pivot arm assemblies for tilting an axis of rotation of the traction rollers. The variator also has an input shaft coupled to the carrier.

Yet one more aspect of the invention addresses an infinitely variable transmission (IVT) having a carrier configured to rotate about a longitudinal axis of the IVT. The IVT includes a first array of planet-pivot assemblies operationally coupled to the carrier. The carrier is adapted to receive and support said array of planet-pivot assemblies. Each planet-pivot assembly has a group of planets arranged angularly about the longitudinal axis. The IVT includes an input shaft coupled to the carrier. The input shaft and the carrier are configured to be coaxial with, and to rotate about, a central axis of the transmission. The IVT includes a first non-rotatable traction ring coupled to the first array of planet-pivot arm assemblies, and the IVT includes an output traction ring in contact with the first array of planet-pivot assemblies. The IVT has an idler assembly arranged coaxial with the longitudinal axis of the transmission. The idler assembly is in contact with the planets. The IVT also has a hydraulic control system configured to be in fluid communication with the carrier and/or the input shaft. The hydraulic control system can be adapted to adjust the transmission ratio of the IVT.

In another aspect, the invention concerns a method of operating a variator of an infinitely variable transmission. The method includes the steps of operably coupling an input shaft to a carrier of the variator and receiving a power at the input shaft. The method includes the step of transferring an input torque T1 at an input speed W1 to the carrier via the input shaft. The method further includes the step of transferring out of the variator a second torque T2 at a second speed W2 from a drive flange of the variator. The second torque T2 and the second speed W2 can be configured to be continuously variable. The second torque T2 and the second speed W2 depend at least in part on a tilt angle of traction planets of a group of planet-pivot arm assemblies of the variator. The second speed W2 is capable of having a magnitude of zero. The second speed W2 is capable of having a forward and a reverse direction of rotation.

Another aspect of the invention relates to a method of providing hydraulic axial loading to allow for dynamic reaction to torque spikes in a continuously variable transmission. The method includes the step of providing a mechanical load cam assembly configured to produce axial force in response to a torque spike. The method also includes the step of coupling a hydraulic axial loading mechanism to the mechanical load cam assembly. The hydraulic axial loading mechanism can be configured to provide an axial force based at least in part on a steady state operating torque of the transmission.

One aspect of the invention relates to a method of changing the ratio of a variator of a continuously variable or infinitely variable transmission. The method includes the steps of providing a hydraulic control valve and operably coupling the hydraulic control valve to a set of hydraulic pistons. The method includes the step of operably coupling a group of planet axles of the variator to at least one of the set of hydraulic pistons. In one embodiment, the method includes the step of regulating the hydraulic pressure with the hydraulic control valve. The method includes the step of supplying a hydraulic pressure from the hydraulic control valve to at least one of the set of hydraulic pistons. The method also includes the step of actuating a change in a tilt angle of the planet axles via the hydraulic pressure.

Another aspect of the invention addresses a method of shifting a continuously or infinitely variable transmission. The method includes the steps of hydraulically coupling a control valve to a control piston and coupling the control piston to a feedback spring. In one embodiment, the method includes the step of providing a pilot pressure indicative of a tilt angle of a planet axle of the transmission to the control valve. The pilot pressure range is at least a function of a spring rate of the feedback spring, a total deflection range of the feedback spring, and an area of the control piston. The method also includes the step of actuating a tilting of the planet axle based at least in part on the pilot pressure. The tilting of the planet axle shifts the transmission.

BRIEF DESCRIPTION OF THE DRAWINGS

FIG. 5A is a cross-sectional view, along the line A-A, of certain components of the variator of FIG. 3B.

FIG. 6C is a cross-sectional view of an alternative centering mechanism and center cam assembly that can be used with the variator of FIG. 5A.

FIG. 8 is a detail view D of the cross-section shown in FIG. 5A.

FIG. 8A is a perspective view of a carrier assembly that may be used with the variator of FIG. 5A.

FIG. 8B is a right-side elevational view of the carrier assembly of FIG. 8A.

FIG. 8E is a perspective view of a first end member of the carrier assembly of FIG. 8A.

FIG. 8F is a second perspective view of the first end member of FIG. 8E.

FIG. 8H is a cross-sectional view, along the line A1-A1, of the first end member of FIG. 8G.

FIG. 8I is a cross-sectional view, along the line B1-B1, of the first end member of FIG. 8G.

FIG. 8J is a cross-sectional view, along the line C1-C1, of the first end member of FIG. 8G.

FIG. 8K is a perspective view of a middle member of the carrier of FIG. 8A.

FIG. 8L is a second perspective view of the middle member of FIG. 8K.

FIG. 8M is a right-side, elevational view of the middle member of FIG. 8L.

FIG. 8N is a cross-sectional view, along the line A2-A2, of the middle member of FIG. 8M.

FIG. 8O is a cross-sectional view, along the line B2-B2, of the middle member of FIG. 8M.

FIG. 8P is a cross-sectional view, along the line C2-C2, of the middle member of FIG. 8M.

FIG. 8S is a right-side elevational view of the second end member of FIG. 8R.

FIG. 8T is a cross-sectional view, along the line A3-A3, of the second end member of FIG. 8S.

FIG. 8U is a cross-sectional view, along the line B3-B3, of the second end member of FIG. 8S.

FIG. 14A is a perspective view of a pivot arm than can be used with the planet-pivot arm subassembly of FIG. 9.

FIG. 14B is a right-side elevational view of the pivot arm of FIG. 14A.

FIG. 14C is a cross-sectional view, along the line E-E, of the pivot arm of FIG. 14B.

FIG. 15D is a perspective view of a guide wheel that can be used with the planet-pivot arm subassembly of FIG. 9.

FIG. 15E is a second perspective view of the guide wheel of FIG. 15D.

FIG. 15F is a left-side elevational view of the guide wheel of FIG. 15E.

FIG. 15G is a cross-sectional view, along the line G-G, of the guide wheel of FIG. 15F.

FIG. 16D is a cross-sectional view, along the line I-I, of the subassembly of FIG. 16B.

FIG. 17A is a perspective view of an input shaft that can be used with the ratio shifting mechanism of FIG. 16.

FIG. 17B is another perspective view of the input shaft of FIG. 17A.

FIG. 18A is a perspective view of a manifold that can be used with the ratio shifting mechanism of FIG. 16.

FIG. 18B is a second perspective view of the manifold of FIG. 18A.

FIG. 18C is left-side, elevational view of the manifold of FIG. 18A.

FIG. 18D is a cross-sectional view, along the line K-K, of the manifold of FIG. 18C.

FIG. 18E is a cross-sectional view, along the line L-L, of the manifold of FIG. 18C.

FIG. 21A is a perspective view of a pivot pin hub that can be used with the ratio shifting mechanism of FIG. 16.

FIG. 21B is a front elevational view of the pivot pin hub of FIG. 21A.

FIG. 21C is a right-side elevational view of the pivot pin hub of FIG. 21A.

FIG. 21D is a cross-sectional view, along line M-M, of the pivot pin hub of FIG. 21C.

FIG. 22A is a perspective view of a control piston that can be used with the ratio shifting mechanism of FIG. 16.

FIG. 22B is a top elevational view of the control piston of FIG. 22A.

FIG. 22C is a cross-sectional view, along the line N-N, of the control piston of FIG. 22B.

FIG. 23A is a perspective view of a gearset and shaft assembly that can be coupled to the variator of FIG. 5A.

FIG. 23B is a second perspective view of the gearset and shaft assembly of FIG. 23A.

FIG. 25A is a perspective view of a drive flange that can be used with the variator of FIG. 5A.

FIG. 25B is a second perspective view of the drive flange of FIG. 25A.

FIG. 25C is a left-side elevational view of the drive flange of FIG. 25B.

FIG. 25D is a cross-sectional view, along the line P-P, of the drive flange of FIG. 25C.

FIG. 28A is a perspective view of an alternative reaction flange that can be used with the variator of FIG. 5A.

FIG. 28B is a cross-sectional view of the reaction flange of FIG. 28A.

FIG. 30A is a perspective view of a cam base that can be used with the variator shown in FIG. 5A.

FIG. 30B is a front elevational view of the cam base of FIG. 30A.

FIG. 30C is a right-side elevational view of the cam base of FIG. 30A.

FIG. 30D is a back-side elevational view of the cam base of FIG. 30A.

FIG. 32A is a perspective view of an unloader piston that can be used with the variator of FIG. 5A.

FIG. 32B is a right-side elevation view of the piston of FIG. 32A.

FIG. 32C is a cross-sectional view of the piston of FIG. 32A.

FIG. 33A is a perspective view of an unloader cylinder that can be used with the variator of FIG. 5A.

FIG. 33B is a cross-sectional view of the unloader cylinder of FIG. 33A.

FIG. 35A is a perspective view of a cam ring that can be used with the variator of FIG. 5A.

FIG. 35B is a second perspective view of the cam ring of FIG. 35A.

FIG. 35C is a cross-sectional view of the cam ring of FIG. 35CA.

FIG. 37A is a perspective view of a carrier pilot ring that can be used with the variator of FIG. 5A.

FIG. 37B is a cross-sectional view of the pilot ring of FIG. 37A.

FIG. 38B is a cross-sectional view of the synchronization ring of FIG. 38A.

FIG. 39A is an exploded, perspective view of an idler assembly that can be used with the variator of FIG. 5A.

FIG. 39B is a cross-sectional view of the idler assembly of FIG. 39A.

FIG. 40A is a perspective view of a variator housing that can be used with the variator of FIG. 5A.

FIG. 40B is a second perspective view of the variator housing of FIG. 40A.

FIG. 40C is a front elevational view of the variator housing of FIG. 40A.

FIG. 40D is a right side elevational view of the variator housing of FIG. 40A.

FIG. 40E is a cross-sectional view, along the line Q-Q, of the variator housing of FIG. 40D.

FIG. 41A is a perspective view of a bell housing that can be coupled to the variator of FIG. 5A.

FIG. 41B is another perspective view the bell housing of FIG. 41A.

FIG. 41C is yet another perspective view of the bell housing of FIG. 41A.

FIG. 41D is a front elevational view of the bell housing of FIG. 41A.

Figure 41C:
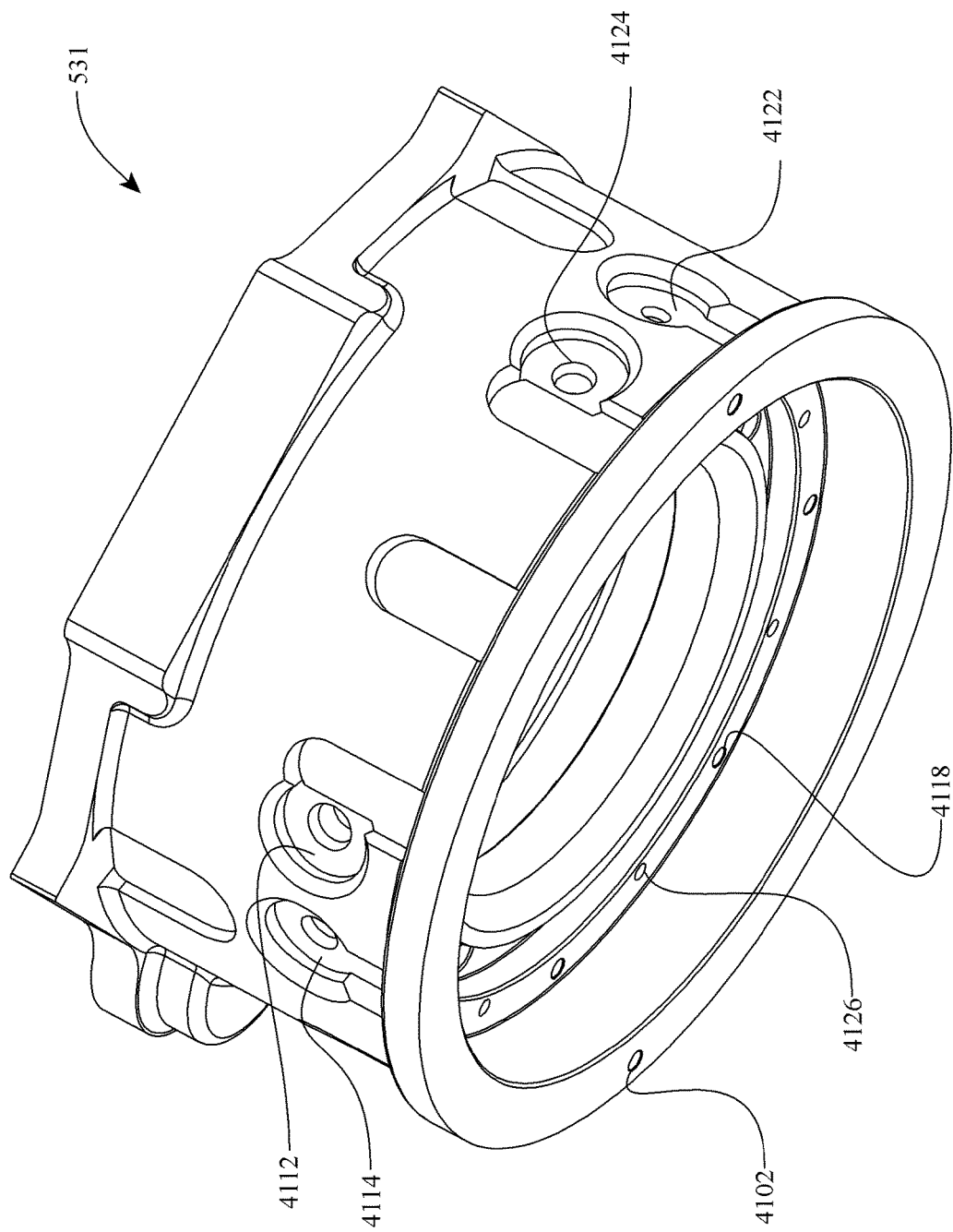

FIG. 41E is a cross-sectional view, along the line A8-A8, of the bell housing of FIG. 41D.

DETAILED DESCRIPTION OF CERTAIN INVENTIVE EMBODIMENTS

Certain inventive embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. The CVT/IVT embodiments described here are generally related to transmissions and variators disclosed in U.S. Pat. Nos. 6,241,636, 6,419,608, 6,689,012, and 7,011,600. The entire disclosure of each of these patents is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

Figure 1:
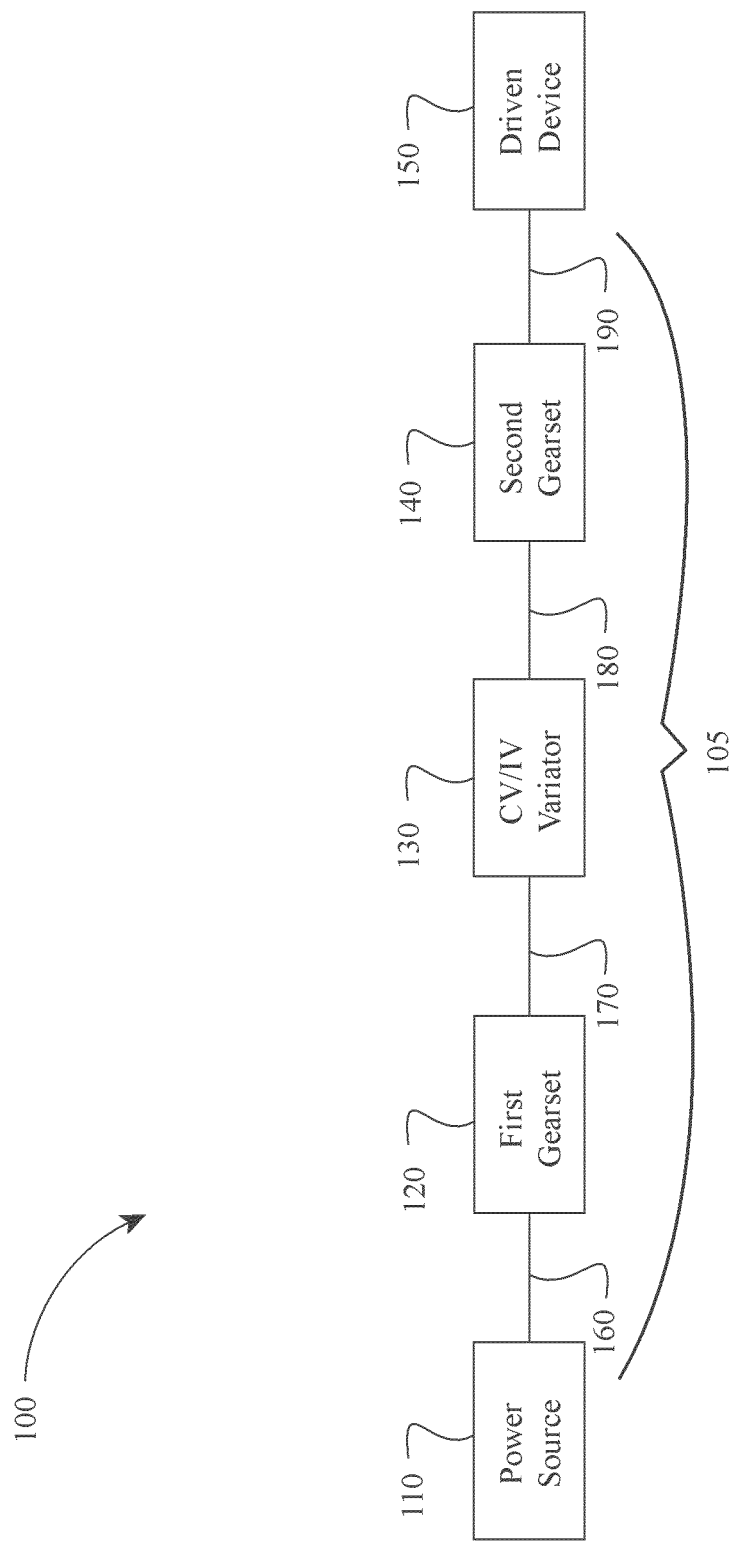
FIG. 1 is a block diagram of a drive system that uses a continuously or infinitely variable variator.

Referencing FIG. 1, one embodiment of a drive system 100 uses a continuously variable transmission (CVT) or an infinitely variable transmission (IVT) CVT/IVT 105. The drive system 100 can include a power source 110 that couples via a coupling 160 to a first gearset 120. A coupling 170 couples a continuously variable (CV) or infinitely variable (IV) CV/IV variator 130 to the first gearset 120, and a coupling 180 couples the CV/IV variator 130 to a second gearset 140. A driven device 150 couples via a coupling 190 to the second gearset 140. It should be understood that the description of the CVT/IVT 105 as including the variator 130, the gearsets 120, 140, and the couplings 160, 170, 180, 190 is primarily a matter of convenience. Depending on the application and context, the variator 130 by itself may be considered and can provide all the functionality of a transmission and, consequently, the variator 130 can be referred to as a continuously variable or infinitely variable transmission.

The power source 110 can be, for example, an electric motor, an internal combustion engine, or a hybrid prime mover combining both the electric motor and the internal combustion engine. The first and second gearsets 120, 140 can be any gear box arrangements, each of which can include one or more planetary gearsets. The driven device 150 can be, for example, a coupling, a shaft, a propeller, a differential drive split gearbox, a tractive load (for example, moving a motorcycle, car, truck, or tractor), an industrial load (for example, driving a fixed or semi-fixed installation such as a printing press), a propulsive load (for example, moving watercraft such as a ship or a boat, or moving aircraft such as an airplane or a helicopter), a utility load (for example, driving a dumpster lift, garbage truck compactor, or turbine propeller), an agricultural load (for example, driving a spray attachment on a tractor or a combine), and mixed uses thereof such as tractive and agricultural loads, or tractive and utility loads, etc. The driven device 150 can additionally be a compressor, a generator, a pump, an accessory drive that includes, for example, an alternator, a water pump, a cooling fan, etc.

The couplings 160, 170, 180, and 190 can be any suitable mechanisms for transferring power between the coupled devices. For example, the couplings 160, 170, 180, and 190 can be any type of coupling ranging from a spline, key, weld, or flange coupling to a single planetary gearset, to a gearbox having multiple planetary gearsets and other gears in parallel or serial arrangements. The CV/IV variator 130 can be any of the embodiments of a continuously variable or an infinitely variable variator such as those described hereinafter.

In some embodiments, the drive system 100 can have one or none of the first and second gearsets 120, 140. Hence, for example, the drive system 100 can be configured such that the power source 110 couples to the CV/IV variator 130 via a coupling 160, without the first gearset 120 coupling between the power source 110 and the CV/IV variator 130. In other embodiments, the CV/IV variator 130 can couple to the driven device 150 without the second gearset 140 coupling between the CV/IV variator 130 and the driven device 150. Moreover, in some embodiments additional gearsets can be coupled in series or in parallel to the first gearset 120, CV/IV variator 130, or the second gearset 140.

Figure 2:
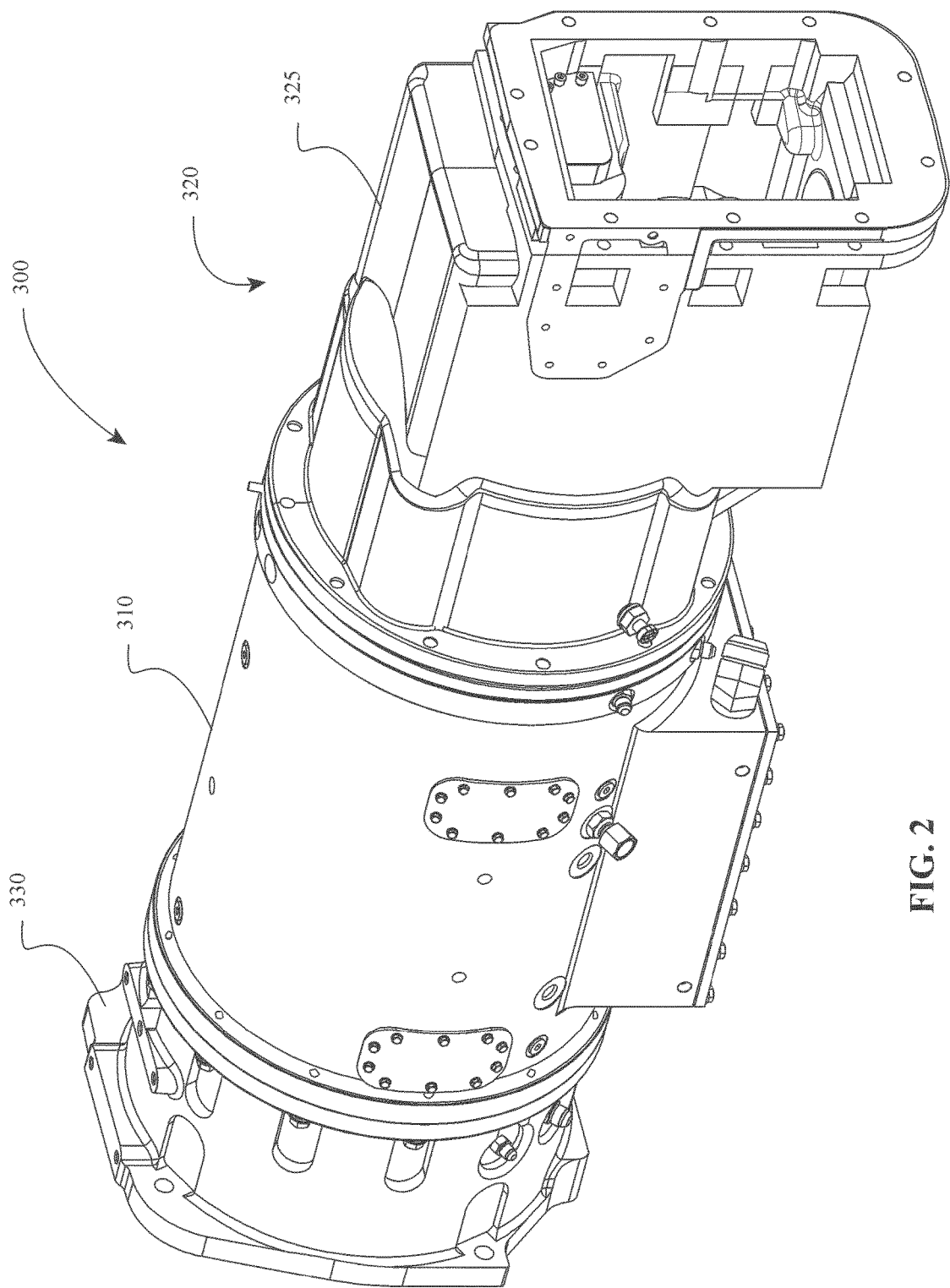
FIG. 2 is a perspective view of a variator as might be coupled to a bell housing and a range box of a tractor to provide a tractor transmission.
Figure 3A:
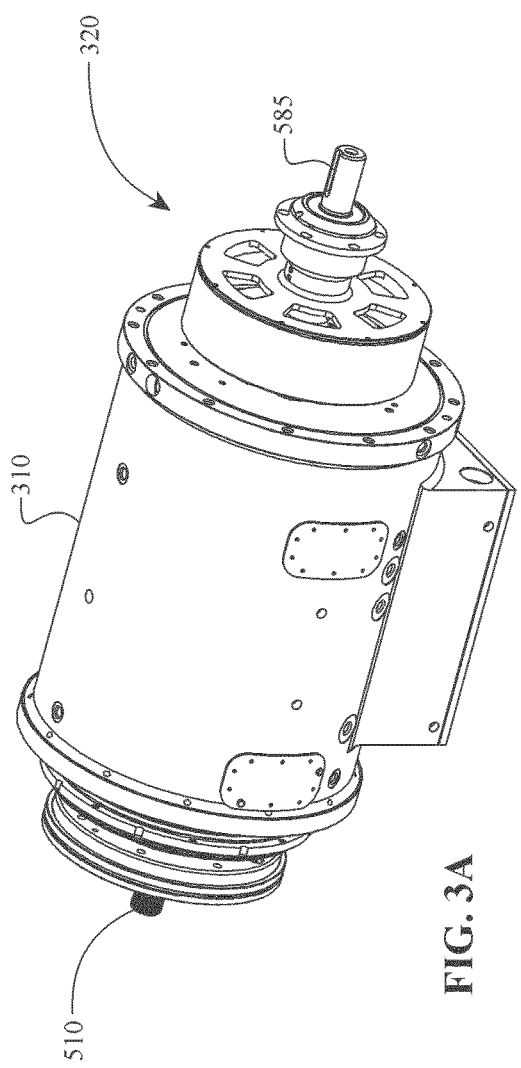
FIG. 3A is an isometric view of a variator coupled to an input shaft at one end and to a gearset and output shaft at the other end.
Figure 3B:
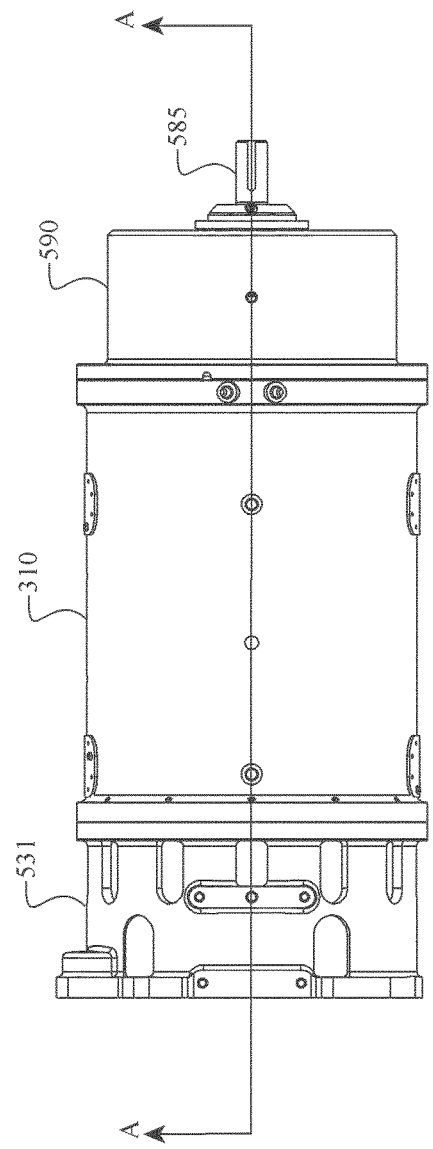
FIG. 3B is an elevational top view of the variator of FIG. 3A when coupled to a bell housing and to a housing for the gearset.

One embodiment of the drive system 100 can be implemented with a transmission assembly 300 in, for example, a tractor application as shown in FIG. 2. In the embodiment shown, a bell housing 330 attaches to a CV/IV variator 310, which couples to a range box or gearset 320 having a range box housing 325. In some embodiments, as will be described below, the bell housing 330 and the gearset 320 are configured with features specifically adapted to cooperate with the components of the CV/IV variator 310. FIG. 3A shows one embodiment of the CV/IV variator 310 that includes an input shaft 510 and that couples to a gearset 320, which in this embodiment couples to an output shaft 585. FIG. 3B shows the CV/IV variator 310 as might be configured with a bell housing 531 and a housing 590 for the gearset 320.

Figure 4A:
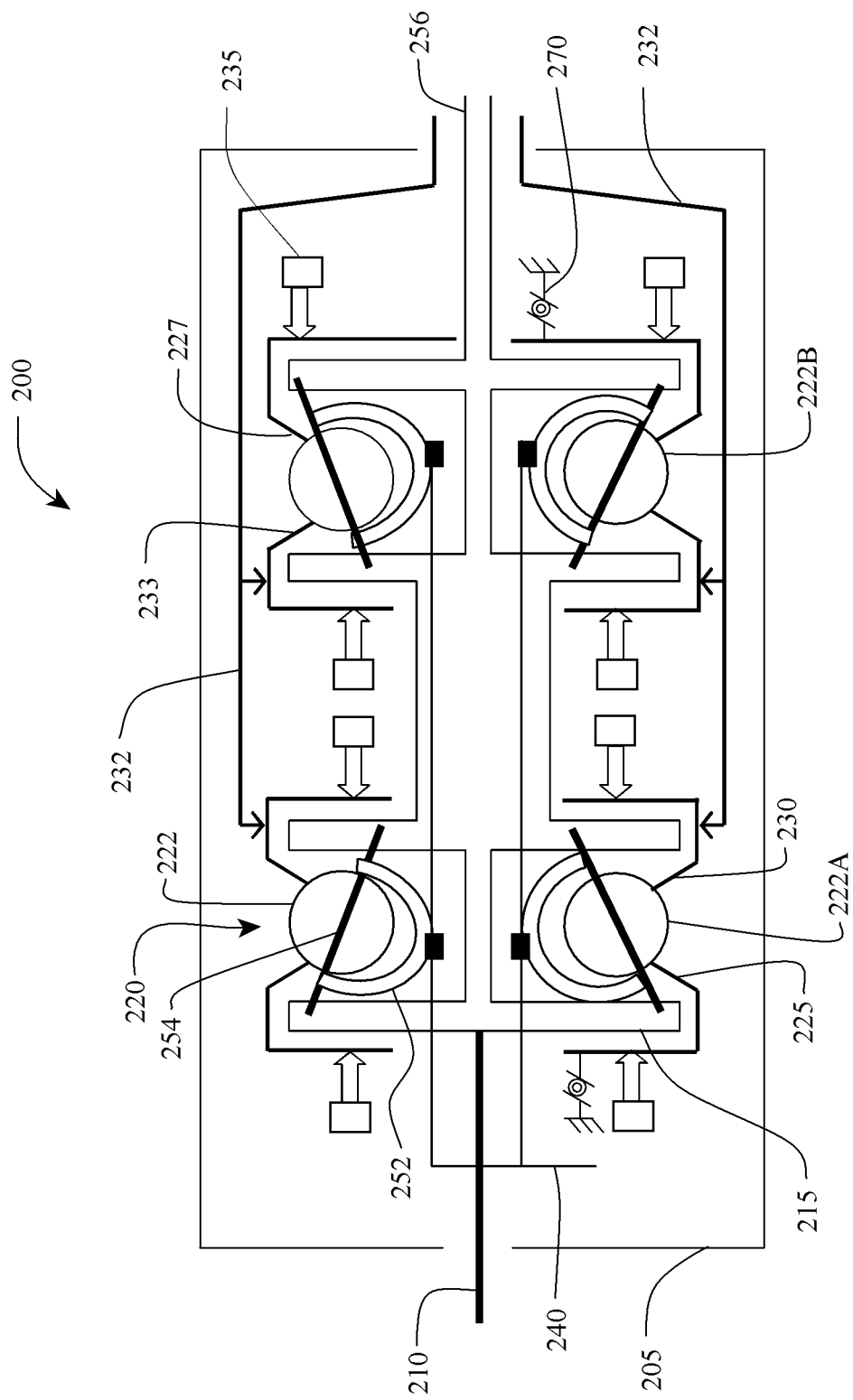
FIG. 4A is a schematic diagram of one embodiment of a variator in accordance with inventive embodiments described here.

Referring now to FIG. 4A, a schematic representation of one embodiment of a variator 200 that can be used with embodiments of the drive system 100 is shown. The variator 200 can be a continuously variable variator or an infinitely variable variator. The variator 200 includes a variator housing 205 that houses a carrier 215, which in this embodiment is configured to rotate about its longitudinal axis and is operationally coupled to planet-pivot arm assemblies 220. Generally, in some embodiments, a planet-pivot arm assembly 220 includes a planet 222 mounted on a planet axle 254 that is operationally coupled to a pivot arm 252; the planet 222 may be a traction roller as described below. The pivot arm 252 is configured to pivot or tilt the planet axle 254 to produce a ratio shift in the variator 200. The planet-pivot arm assemblies 220 are typically arranged at equally spaced, angular positions about the central, longitudinal axis of the variator 200. In the embodiment illustrated an input shaft 210 couples to the carrier 215. As used here, a "traction roller" can in some embodiments be a spherical roller or a ball. Hence, as used here, the terms "traction roller", "spherical roller", or "ball" are interchangeable when referring to rolling elements that transfer power using traction.

Traction rings 225 and 227 contact, respectively, planet arrays 222A and 222B of the planet-pivot arm assemblies 220. Idler assemblies (not shown in FIG. 2A, but see FIG. 5A for an example) contact and radially support the planet arrays 222A and 222B. In some embodiments, the idler assemblies are mounted coaxially with the longitudinal axis of the variator 200 (see FIG. 5A, for example). Traction rings 230 and 233 contact, respectively, the planet arrays 222A and 222B. The traction rings 230, 233 are operationally coupled to a torque output element 232. In some embodiments, the traction rings 225, 277 may be coupled to ground by a grounding mechanism 270. As used here, "ground" refers to a stationary element such as the variator housing 205, for example. The grounding mechanism 270 may be, for example, a key, a spline, clips, or other fastening means that substantially prevents axial and/or rotational movement of the traction rings 225, 227. It should be noted that in certain embodiments only one or none of the rings 225, 227 is grounded. The variator 200 can also include several axial force generating ("AFG") mechanisms 235. In some embodiments, the variator 200 includes a ratio shifting mechanism 240 that operationally couples to the planet-pivot arm assemblies 220.

In the embodiment shown in FIG. 4A, during operation of the variator 200, the input shaft 210 imparts a torque to the carrier 215, which then transfers the torque to the planet-pivot arm assemblies 220. In one embodiment, the traction rings 225 and 227 are nonrotatable and provide rolling surfaces and torque reaction for the planet arrays 222A and 222B, respectively. In other embodiments, however, one or both of the traction rings 225 and 227 may be configured to be rotatable.

In the embodiment shown in FIG. 4A, the planet arrays 222A, 222B transfer torque to the traction rings 230 and 233, which are rotatable and configured to couple operationally to, and thereby transfer torque to, the torque output element 232. In one embodiment, the carrier 215 can be coupled to, or be integral with, an output shaft 256. Hence, the variator 200 can be configured to receive one power input via the input shaft 210 and to provide two power outputs: a power output through the torque output element 232 and a power output through the carrier 215 and output shaft 256. Of course, the variator 200 can be configured to transmit power in the reverse power path. That is, in some embodiments, the variator 200 can receive power via the shaft 256 and/or torque element 232, and the variator can then output power via the shaft 210. Since the variator 200 can be configured to provide at least two power paths, the variator 200 can be a torque splitting device.

In embodiments where the carrier 215 is configured to rotate about the axis of the variator 200 and the traction rings 225, 227 are nonrotatable, the torque output element 232 can be made to achieve a zero speed and/or reverse the direction of its rotation. Moreover, when the output of the torque output element 232 is combined with the output of the output shaft 256, the output of the variator 200 can be zero or negative. Because some embodiments of the variator 200 can produce a zero output speed while the input speed is nonzero, and the torque ratio is generally inverse to the speed ratio, the variator 200 can be described as an infinitely variable variator.

In the embodiment shown in FIG. 4A, the ratio shifting mechanism 240 controls the ratio of the torque applied to the carrier input versus the torque reaction at the planet-pivot arm assemblies 220. As will be further described below, in one embodiment of the variator 200, the ratio shifting mechanism 240 includes a hydraulic control system configured to change the angle of the axis of rotation of the planet arrays 222A and 222B via, among other things, actuation (for example, pivoting or tilting) of the pivot arms 252 and the planet axles 254. A person of ordinary skill in the relevant technology will recognize that in addition to the ratio shifting mechanism 240 there are other devices that can be used to effectuate a ratio shift in the variator 200.

Figure 4B:
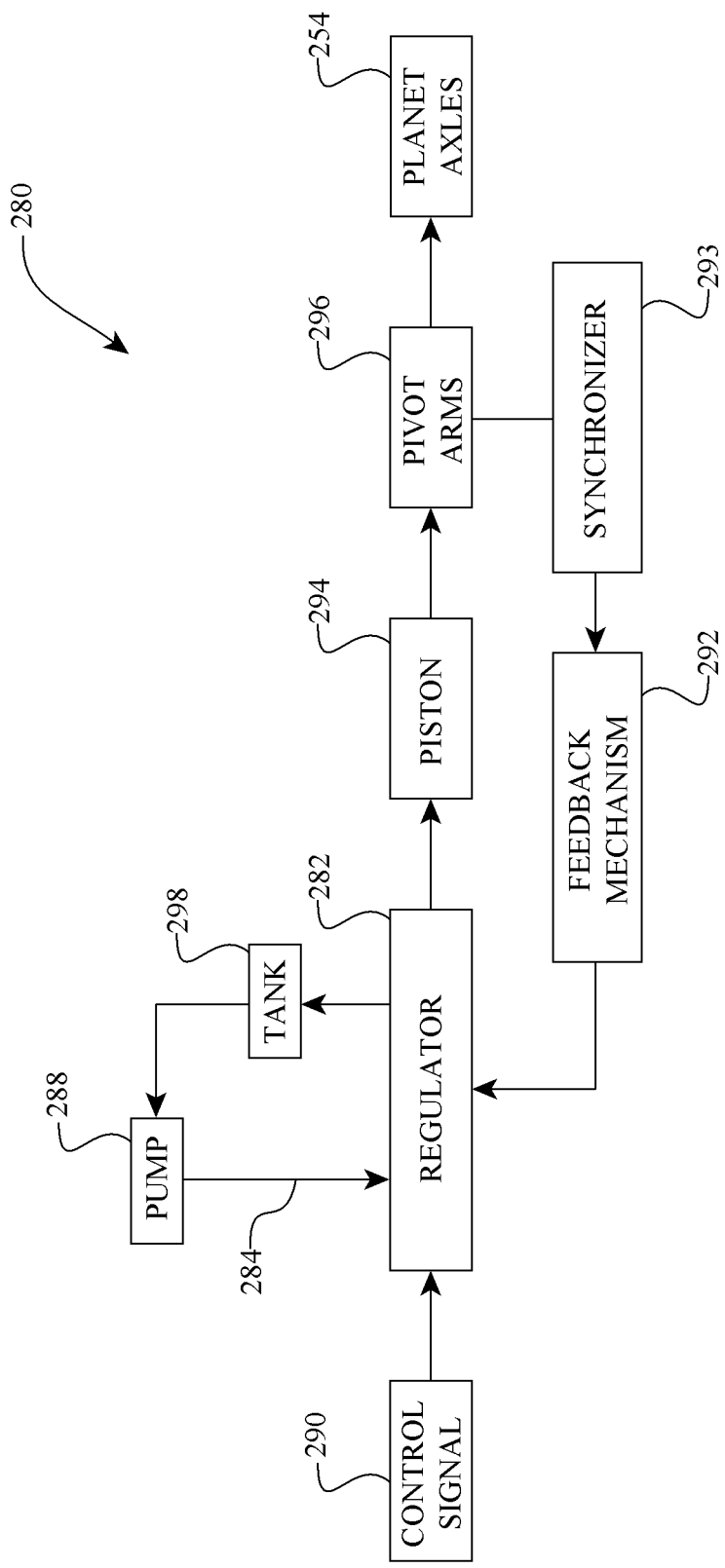
FIG. 4B is a schematic diagram of a hydraulic shifter that can be used with the variator of FIG. 4A.

Referencing now FIG. 4B, one embodiment of a hydraulic ratio shifting control system 280 (or shifter 280) that can be used with the variator 200 is illustrated. The shifter 280 includes a regulator 282 for regulating hydraulic fluid shift pressure 284 that is used to actuate at least one piston 294. A pump 288 can be used to feed control fluid to supply the shift pressure 284 to the regulator 282. A control signal device 290 and a feedback mechanism 292 each can be coupled to the regulator 282. As illustrated, the pivot arms 296 can be coupled to a synchronizer 293, which in turn can be coupled to the feedback mechanism 292. In other embodiments, however, the synchronizer is not used and, instead, the pivot arms 296 can be coupled directly to the feedback mechanism 292. In one embodiment, the piston 294 is operationally coupled to the pivot arms 296. The regulator 298 can be adapted to be in fluid communication with a fluid collection pan or tank 298.

The regulator 282 can be a valve, for example. In one embodiment, the regulator 282 is a four-way valve having a valve spool that regulates control fluid pressure and/or flow to the piston 294 and the tank 298. The control signal device 290 may be any mechanical, electrical, or electro-mechanical device suitably configured to deliver a control signal to the regulator 282. In some embodiments, the control signal is hydraulic fluid pressure (also referred to as pilot pressure). In yet other embodiments, the control signal device 290 can be adapted to receive and process electrical or mechanical signals from the feedback mechanism 292 and/or the synchronizer 293.

The control piston 294 can be configured and adapted such that shift pressure 284 actuates a movement of the control piston 294. The pivot arms 296 can be the pivot arms 252 shown in FIG. 4A. In some embodiments, the feedback mechanism 292 is mechanical, electronic, and/or electromechanical. In one embodiment, the feedback mechanism 292 includes a feedback screw and a feedback spring (see FIG. 16C and FIG. 20). The synchronizer 293 can be, for example, a mechanical linkage that synchronizes multiple planet arrays 222A, 222B, for example, so that the planet axles 254 of each planet array 222A, 222B have the same tilt angle. In one embodiment, for example, the synchronizer 293 includes a device having a turnbuckle function, which device can be coupled to the planet arrays 222 through one or more additional linkages. The pump 288 and the tank 298 can be typical, well known, fluid pumping and collection devices.

During operation, to shift ratio the control signal device 290 actuates the regulator 282, which is configured to allow shift pressure 284 to actuate the piston 294. In some embodiments, the regulator 282 can be configured to regulate the rate at which shift pressure 284 is delivered. Since the control piston 294 couples to the pivot arms 296, the pivot arms 296 are actuated by and respond to the motion of the control piston 294. In some embodiments, the pivot arms 296 are operationally coupled to the planet axles 254 such that a motion of the pivot arms 296 results in a shifting or tilting of the angle of the planet axles 254 with respect to a longitudinal axis of the variator 200. The shifting of the angle of the planet axles 254 results in a shifting of the ratio of the variator 200.

As stated above, in some embodiments, the pivot arms 296 may be coupled to the feedback mechanism 292. In such embodiments, the feedback mechanism 292 may be configured to deliver to the regulator 282 one or more indications of the state of the pivots arms 296, such indications can include, for example, angular position, axial position, angular speed, axial or linear speed, etc. In some embodiments, indications can include hydraulic fluid flow and/or pressure in the pistons, an electrical signal from speed ratio measurements, position of the carrier 215, angular position of the planets 222, axial force on the traction rings 225, 227, 230, and/or 233 caused by centrifugal or gyroscopic forces that arise from rotation of the carrier 215. As the pivot arms 296 move in response to the movement of the controls piston 294, the feedback mechanism 292 relays any of the above mentioned indications to the regulator 282. By combining the control signal from the control signal device 290 and the indicia delivered by the feedback mechanism 292, the regulator 282 further regulates the shift pressure 284 to actuate a desired ratio adjustment or to maintain a steady state ratio.

In some embodiments of the variator 200, AFG mechanisms 235 apply axial force to the traction rings 225, 227, 230 and 233 to facilitate the efficient transfer of torque between the planet arrays 222A, 222B and the traction rings 230 and 233. In other embodiments, AFG mechanisms 235 may be coupled only to some of the traction rings 225, 227, 230 and 233, rather than to all of them. The AFG mechanisms 235 can be cam-based, wherein the interaction between cam surfaces and rollers generates axial force (which can be proportional to the torque applied at the cam surfaces), or can be hydraulic-actuator-based, wherein a hydraulic fluid actuates a combination of pistons and cylinders to generate axial force. In yet other embodiments, the AFG mechanisms 235 can combine both cam and hydraulic axial force generating methods. It should be noted that hydraulic- or cam-based AFG mechanisms 235 are not the only options to generate suitable axial force in the variator 200. Preferably, AFG mechanisms 235 are configured to generate axial force that can respond quickly to transient torque spikes and that is dependent or responsive, at least in part, to the highest torque level present at any of the traction rings 225, 227, 230, and 233.

Referencing FIGS. 5A-8, in one embodiment the variator 310 of FIG. 3A has a variator housing 505 that houses, among other things, a carrier 515. An input shaft 510 couples to the carrier 515. In some embodiments, the input shaft 510 and the carrier 515 are not rigidly constrained axially relative to the housing 510. That is, in some embodiments, the input shaft 510 and the carrier 515 can, at least partially, float axially within the variator housing 505. In this embodiment, the input shaft 510 and carrier 515 are configured to rotate about their central, longitudinal axis. In one embodiment, the input shaft 510 and the carrier 515 are rotationally coupled.

Figure 5B:
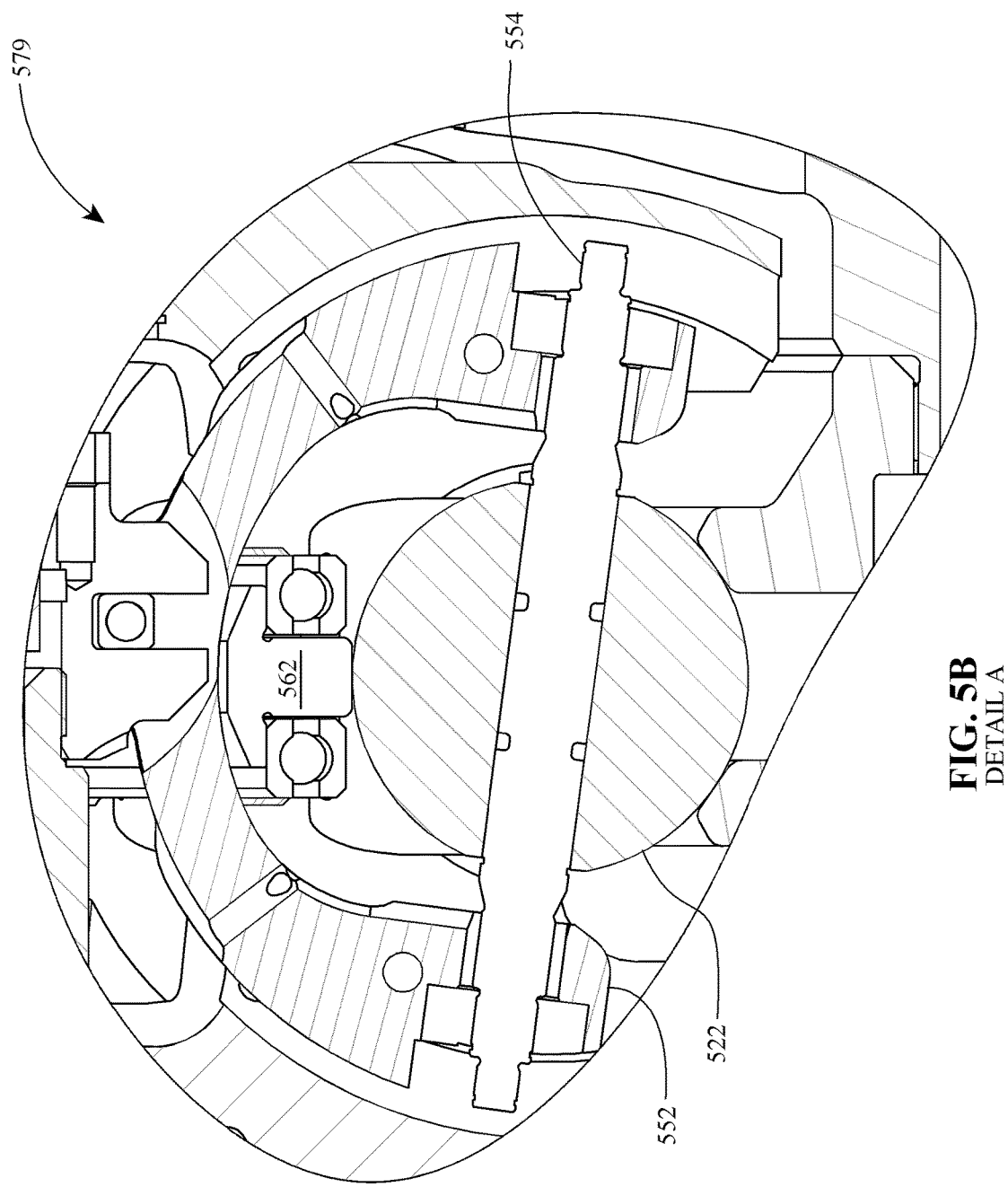
FIG. 5B is a detail view A of the cross-section shown in FIG. 5A.

In one embodiment, the variator 310 includes planet-pivot arm assemblies 579 (see Detail A and FIG. 5B). A planet-pivot arm assembly 579 typically includes a planet axle 554 that provides support and an axis of rotation for a planet 522.

In this embodiment, pivot arms 552 support the planet axles 554, and idlers 562 provide radial support and position for the planets 522. Additional description of the planet-pivot arm assemblies 579 is provided below with reference to FIGS. 9-15G.

In some embodiments, a cover plate 560 mounts coaxially about the input shaft 510 and couples to a manifold 565. The cover plate 560 can be configured to provide bearing support for the input shaft 510. In the embodiment shown, a bell housing 531 is adapted to receive, support, and fasten to the cover plate 560 and manifold 565.

Traction rings 525A, 530 contact the planets 522A, while the traction rings 525B, 533 contact the planets 522B. In the embodiment depicted, the traction rings 525A, 525B are configured to be substantially or completely nonrotatable. A drive flange 532 couples to the traction rings 530, 533 through a center cam assembly 570 (see Detail B and FIGS. 6A-6B). In one embodiment, the drive flange 532 couples to a sun gear 2320 of a downstream gearset 320 (see FIGS. 23A-23C). In the embodiment shown, the drive flange 532 can, but need not, be axially fixed.

Figure 6A:
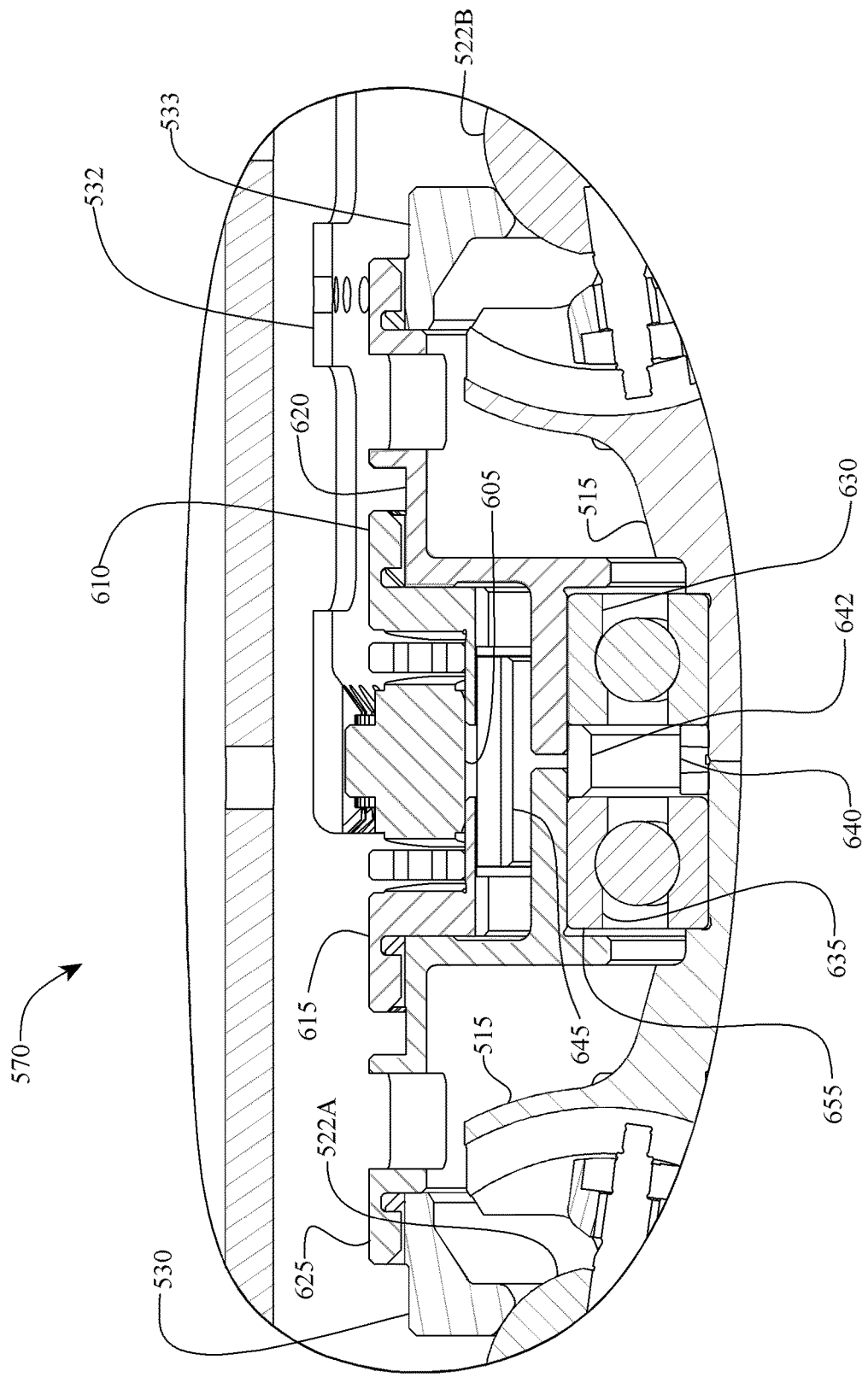
FIG. 6A is a detail view B of the cross-section shown in FIG. 5A.
Figure 6B:
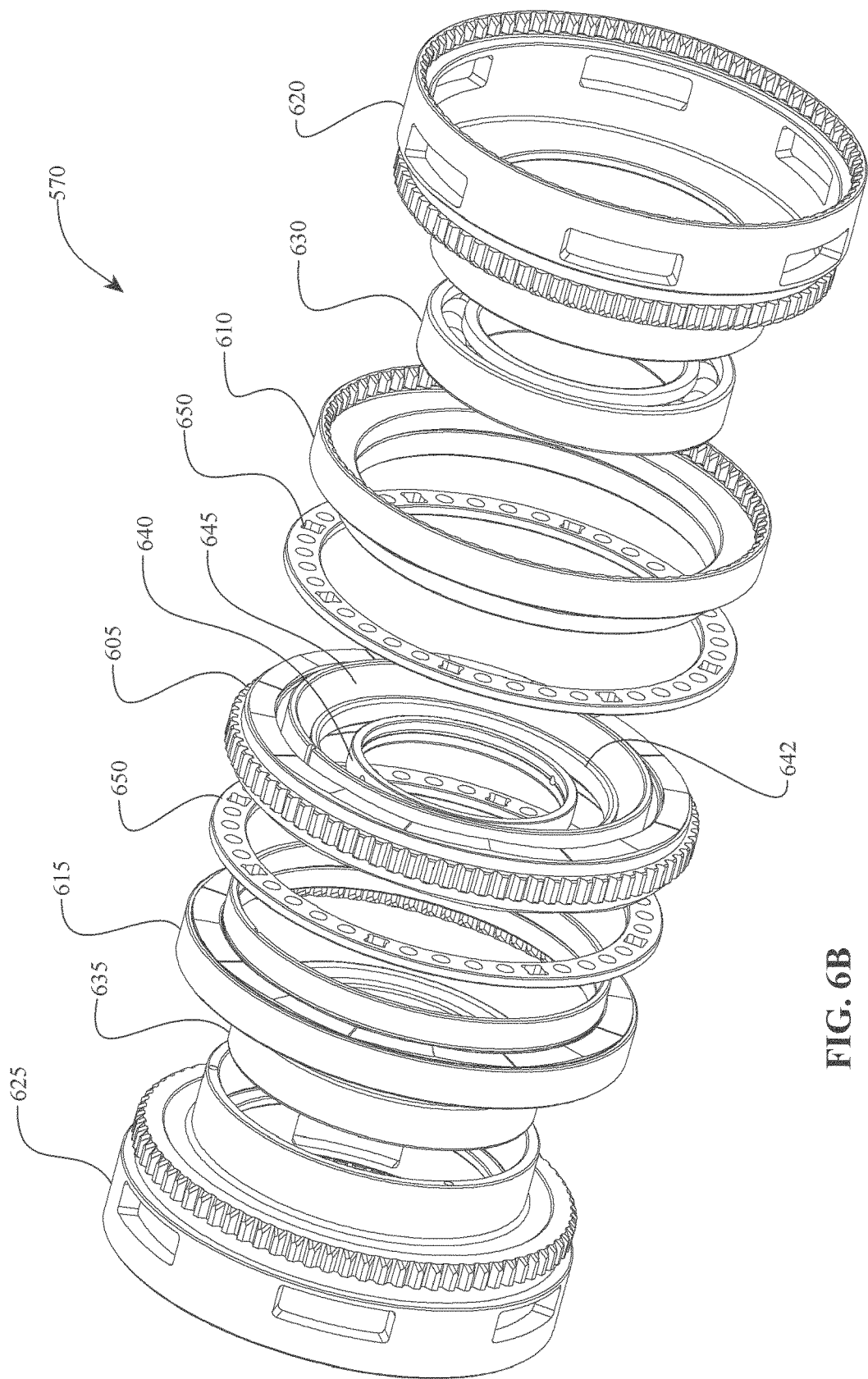
FIG. 6B is a partially exploded, isometric view of certain variator components shown in FIG. 6A.
Figure 7A:
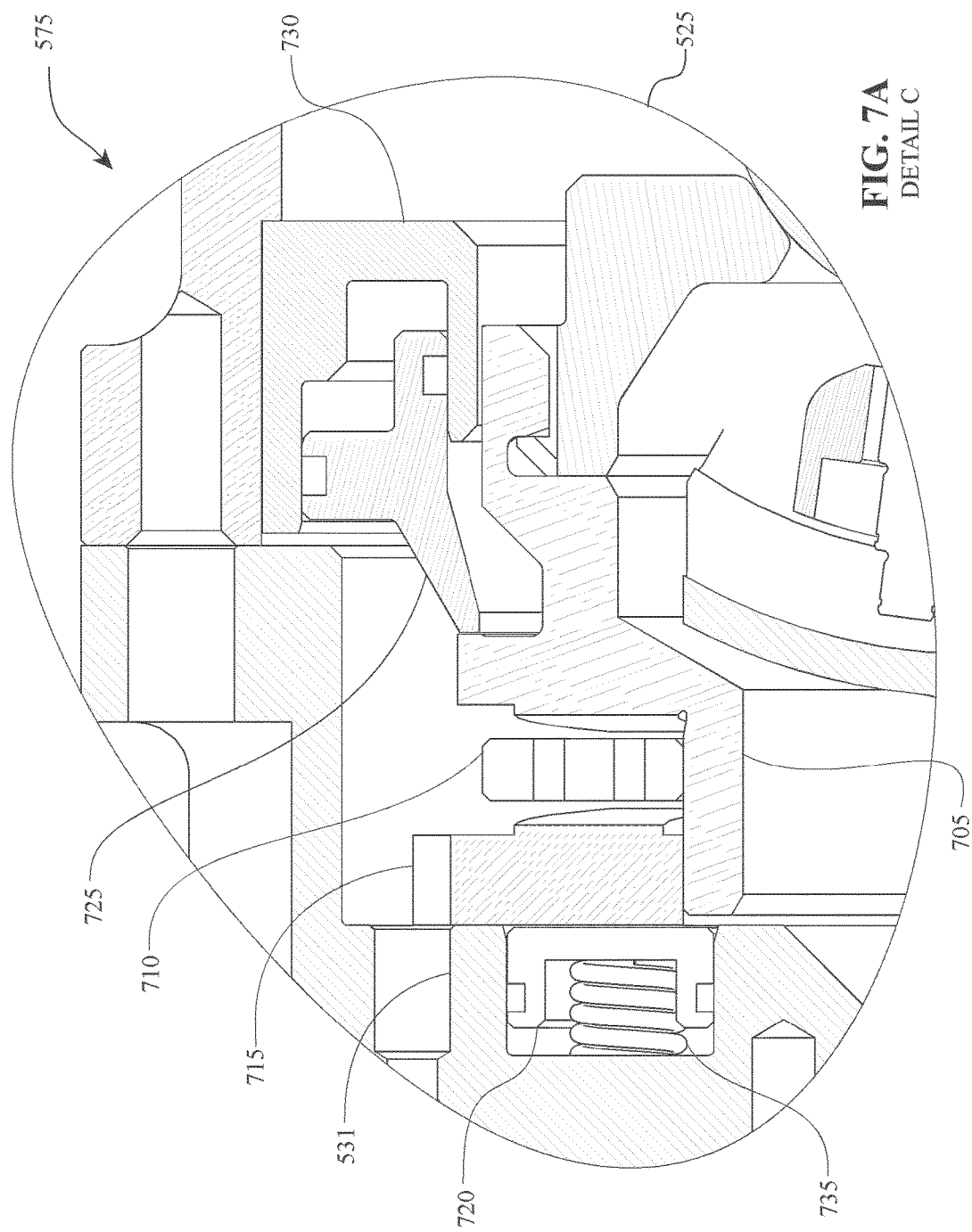
FIG. 7A is a detail view C of the cross-section shown in FIG. 5A.
Figure 7B:
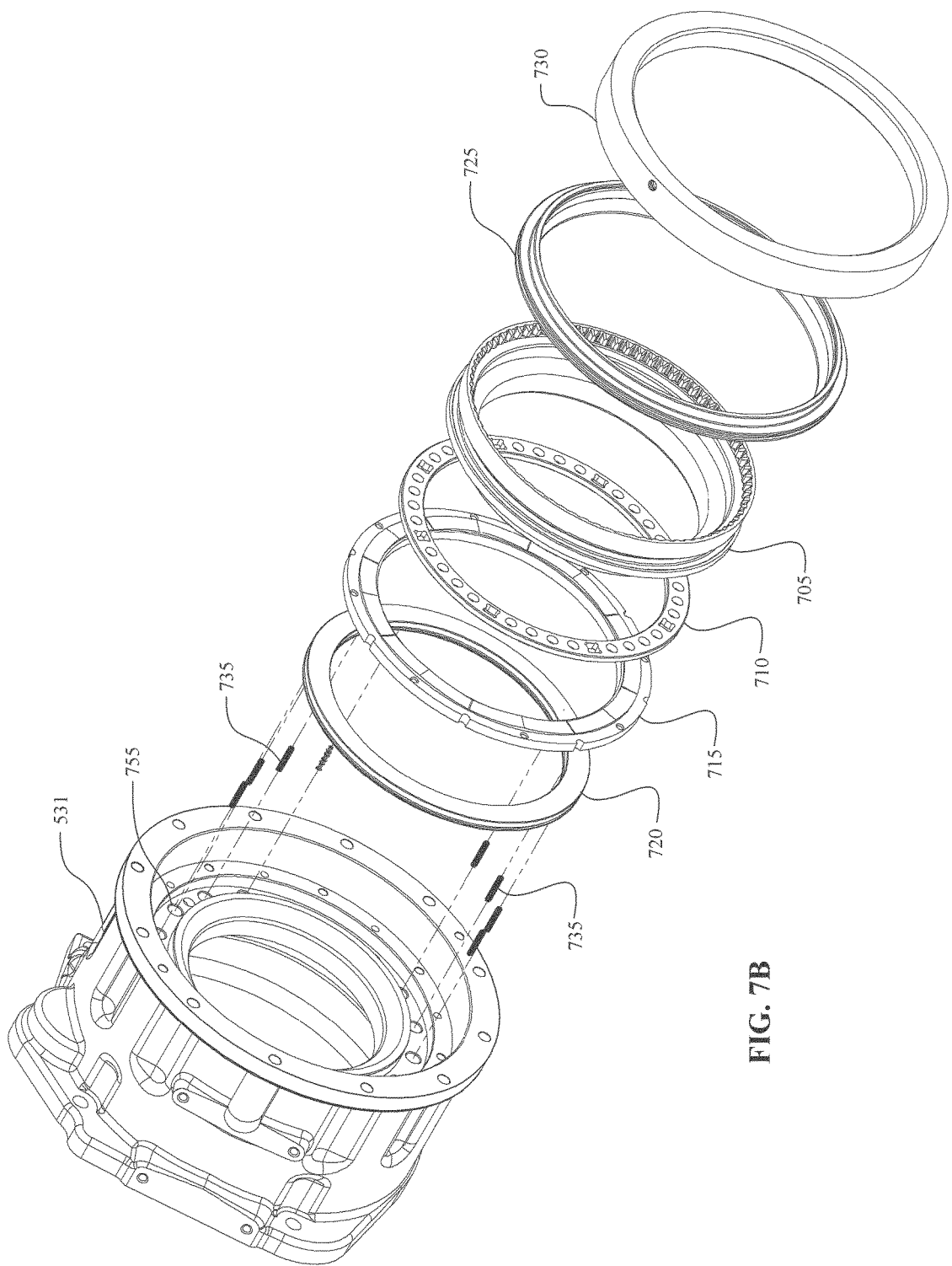
FIG. 7B is a partially exploded, isometric view of certain variator components shown in FIG. 7A.

In the embodiment illustrated, an input cam assembly 575 couples to the traction ring 525A (see Detail C and FIGS. 7A-7B). The center cam assembly 570 and the input cam assembly 575 function in part as axial force generators. The center cam assembly 570 and the input cam assembly 575 will be further described below with reference to FIGS. 6A-6B and FIGS. 7A-7B, respectively.

During operation of the variator 310, in one embodiment the input shaft 510 applies a torque to the carrier 515, which then transfers torque to the traction rings 530, 533 via the planet-pivot arm assemblies 579. The traction rings 530, 533 then transfer torque to the center cam assembly 570 and the drive flange 532, which rotate together as a rigid body. Hence, certain embodiments of the variator 310 facilitate power splitting. That is, the variator 310 can be adapted to receive a power input at the input shaft 510 and to deliver power via two different paths. Assuming, for example, that the input shaft 510 delivers power at an input speed w1 and an input torque T1, the variator 310 can deliver power at a continuously variable speed w2 and output torque T2 via the drive flange 532, and the variator 310 can provide power at an output speed w1 and output torque T3 via a splined shaft 844 coupled to the carrier 515. In the embodiment shown, the splined shaft 844 is integral to the carrier 515; however, in other embodiments, the splined shaft 844 can be coupled to the carrier 515 via any suitable means, including keying, splines, bolts, dowels, gears, hydraulic or electric motors, etc.

In certain embodiments, one of either the drive flange 532 or the carrier spline shaft 844 can be used as drive or as a power take off. In yet other embodiments, the two torque outputs T2 and T3 can be summed into one torque output T4 at the output shaft 585 via auxiliary gearsets. As discussed below with reference to FIG. 42, the variator 310 can be adapted to couple to a range box 4200 for providing a transmission having multiple modes, including reverse. Depending on the tilt angle of the planet axles 554, the drive flange 532 can be made to reverse the direction of its rotation as well as substantially have a zero speed of rotation, that is, w2 equals about zero. In some embodiments, when the output of the drive flange 532 is summed to the output of the splined shaft 844, the variator 310 can produce zero output speed. Consequently, the variator 310 can be configured to be an infinitely variable variator or transmission.

Referencing FIGS. 5A, 8, and 16A-20 now, in the embodiment illustrated the variator 310 can have a ratio shifting mechanism 577 in which the input shaft 510 is adapted to receive and interact with various components of a hydraulic valve. The ratio shifting mechanism 577 is partially shown in Detail D of FIGS. 5A and 8; for additional description of embodiments of the ratio shifting mechanism 577, see FIGS. 16A-22C and the accompanying text. Embodiments of the input shaft 510 will be further described below with reference to FIGS. 17A-17D. In one embodiment, the ratio shifting mechanism 577 includes a hydraulic circuit configured such that control fluid flows in and out of the carrier 515 through channels 814A, 814B and chambers 580A, 580B (see FIGS. 8D and 16C-16D).

In some embodiments, Control pistons 582 couple to pivot pin hubs 805. Pivot pin blocks 810, supported in the pivot pin hubs 805, receive pivot pins 815 that couple to the pivot arms 552. In one embodiment, a control screw 820 is composed of a right control screw 820A rigidly coupled to a left control screw 820B, wherein the lead of the threads of the right control screw 820A are opposite in direction to the lead of the threads of the left control screw 820B. When the control screw 820 turns in one direction, the oppositely directed threads of the right and left control screws 820A, 820B provide a turnbuckle functionality. In some embodiments, the right control screw 820A and the left control screw 820B are one integral part. In one embodiment, a right control screw nut 825A is rigidly coupled to a pivot pin hub 805A, while a left control screw nut 825B is rigidly coupled to a pivot pin hub 805B. Hence, when the control screw 820 is axially constrained and turned, the right control screw nut 825A and the left control screw nut 825B translate axially in opposite direction to each other (see FIG. 19), which causes the pivot arms coupled to the planets 522A to pivot (about the center of the planets 522A) in a direction opposite to the synchronous pivoting of the pivot arms coupled to the planets 522B.

Further, in some embodiments, the absolute value of the thread lead between the right control screw 820A and the right control screw nut 825A and the left control screw 820B and left control screw nut 825B is equal, which causes the axial motion of the right control screw nut 825A and the left control screw nut 825B to be substantially equal in magnitude and opposite in direction. In one embodiment, the equal but opposite axial motion is converted to equal and opposite rotational motion of pivot arms 552A, 522B via pin slider mechanisms. As the pivot arms 552 are made to pivot, due to the operational coupling of the pivot arms 552 to the planet axles 554, the tilt angle of the axis of rotation of the planets 522 is adjusted and, thereby, an equal adjustment in the ratio of the separate variator cavities of variator 310 takes place. In some embodiments, through the use of a differential mechanism for example, the ratio of the separate variator cavities can be set to different values by, in part, choosing different leads for each of the control screws 820A, 820B and/or the control screw nuts 825A, 825B. The control screw 820, control screw nuts 825, pivot pin hubs 805, and link screw end stops 870, shown in FIG. 19 ensure that the tilt angle of the axis of rotation of the planets 522A are mirrored with respect to planets 522A relative to a center plane of the variator 310 that bifurcates the distance between the centers of the planets 522A and 522B.

In some embodiments, the control screw 820A cooperates with a control screw nut 825A to provide mechanical feedback to the hydraulic valve. In the embodiment shown in FIG. 5A, a control screw nut 825B cooperates with a control screw 820B to provide mechanical feedback to a sensor to facilitate determination of the angular position of the planet axles 554, which gives the angular position of the rotational axis of the planets 522 (see FIGS. 19 and 23D-23F). The control screw nuts 825A, 825B rigidly couple to the pivot pin hubs 805. A control screw end stop 870 fixes the control screw 820A axially. Further discussion of the operation of the hydraulic ratio shifting mechanism 577 is provided below with reference to FIGS. 16A-16D and 20.

It is noted that in this embodiment of the variator 310, at least in part because of the configuration of the center cam assembly 570, axial thrust bearings are not used to transmit axial loads that arise from traction transfer between components. Rather, the traction rings 525A, 525B are fixed rotationally and configured to transmit axial force to the variator housing 505. Since the traction rings 525A, 525B do not use axial thrust bearings, the bearing drag loss that usually arises where axial thrust bearings are used for transmitting axial loads is avoided.

Referencing FIG. 6A and FIG. 6B specifically, in one embodiment, the center cam assembly 570 includes a center cam base 605 configured to couple to the drive flange 532 via, for example, splines. The center cam base 605 couples operationally to a right cam ring 610 and a left cam ring 615. In one embodiment, rollers (not shown) supported in cam roller retainers 650 provide the operation coupling between the center cam base 605 and the cam rings 610, 615. The right cam ring 610 couples to a right torque transfer ring 620, and the left cam ring 615 couples to a left torque transfer ring 625. The right torque transfer ring 620 couples to the traction ring 533, and the left torque transfer ring 625 couples to the traction ring 530. As used here to refer to cam rings 610, 615 and torque transfer rings 620, 625, the terms "left" and "right" refer only to a position relative to the center cam base 605 and have no other meaning.

Bearings 630, 635 hold, respectively, the torque transfer rings 620, 625 concentric to the carrier 515. In some embodiments, the bearings 630, 635 are radial bearings, but in other embodiments the bearings 630, 635 can be ball bearings, for example. A carrier pilot ring 640 and a carrier center bearing shim 642 are located between the bearings 630, 635. A synchronization ring 645 fits concentrically between the cam rings 610, 615 and the torque transfer rings 620, 625. The synchronization ring 645 couples to the cam rings 610, 615. The synchronization ring 645 allows axial deflection but does not allow the cam rings 610, 615 to rotate relative to each other, which keeps the center cam base 605 centered between the two planet arrays 522A, 522B. As shown in FIG. 6B, cam roller retainers 650 are positioned between the center cam base 605 and the cam rings 610, 615. The cam roller retainers 650 are configured to support and separate rollers (not shown) that couple the cam rings 610, 615 to the center cam base 605 when torque is applied to the center cam assembly 570. The shape of the rollers can be cylindrical, barrel, or spherical, for example.

Because the cam ring 610 couples via the synchronization ring 645 to the cam rings 615, the rise of the respective rollers in the cam rings 610, 615 is substantially equal. This ensures symmetrical axial displacement of the cam rings 610, 615 relative to the planet arrays 522A, 522B as the cam rings 610, 615 are loaded. It is preferable that during operation the distance between the center of the planet arrays 522A, 522B and the center of the transmission carrier 515 be the same for both planet arrays 522A, 522B. In some embodiments, it is also preferable that the carrier 515 move axially with the deflection produced by the axial force. The inner races of the bearings 630, 635 rigidly mount to the carrier 515. The outer races of the bearings 630, 635 mount, with a sliding fit for example, to the torque transfer rings 620, 625. In this embodiment, the outer races of the bearings 630, 635 can move axially with respect to the center cam assembly 570. To aid in keeping the carrier 515 centered between the planet arrays 522A, 522B, wave springs (not shown) are positioned between the side 655 of the outer races of the bearings 630, 635 and the torque transfer rings 620, 625. Axial deflection is preferably allowed, because of the axial force generation, but the carrier 515 is preferably centered at all times between the planet arrays 522A, 522B. In some embodiments, the wave springs act only on the outer races of the bearings 630, 635 and only on the axial direction. However, in other embodiments, the outer races of the bearings 630, 635 are press fit, for example, to the torque transfer rings 620, 625, and the wave springs act only on the inner races of the bearings 630, 635.

Referring now to FIG. 6C, a center assembly 1000 that can be used with the variator 310 will now be described. The center assembly 1000 does not rely on springs to achieve the centering function. In one embodiment, the center assembly 1000 includes bearings 1002 supported by the carrier 515. A centering coupling 1004 rides on the bearings 1002 and couples to flanges of traction rings 1006. Axial force generating elements 1008 are interposed between the traction rings 1006 and a center output transfer element 1010, which is coupled to a drive output element 1012. In some embodiments, the axial force generation elements 1008 include load cams 1014, 1016 that are operationally coupled via cam rollers 1018. In one embodiment, axial thrust bearings 1020 are interposed between the centering coupling and the center output transfer element 1010. For certain applications, it might be desirable to use shims 1022 to ensure minimum clearances and/or accurate positioning of components. In some embodiments, splines are used to couple the centering coupling 1004 to the traction rings 1006 and the center output transfer element 1010 to the drive output element 1012, respectively. It should be noted that the traction rings 1006, though rotationally fixed to, are axially unconstrained relative to the centering coupling 1004.

With reference to FIG. 7A and FIG. 7B, in one embodiment, the input cam assembly 575 includes a cam flange 705 coupled to the traction ring 525 and adapted to interact with cam rollers (not shown) supported in a roller retainer 710. The shape of the cam rollers can be spherical, barrel, or cylindrical, for example. As shown, the cam base 715 may be positioned between the roller retainer 710 and a cam load piston 720. The cam flange 705 couples operationally to an unloader piston 725, which cooperates with an unloader cylinder 730. In this embodiment, the input cam assembly 575 may also include a number of compression springs 735 positioned between one side of the cam load piston 720 and partially in bores 755 of the bell housing 531. For descriptive purposes, the cam flange 705, roller retainer 710, cam base 715, and associated rollers, will be referred to here as the mechanical load cam assembly 717.

The input cam assembly 575 is one embodiment of an axial force mechanism that combines both hydraulic- and cam-based axial force generation. Using hydraulic pressure, the cam load piston 720 can apply axial force to the traction ring 525 via the mechanical load cam assembly 717. In other embodiments, the mechanical load cam assembly 717 can be modified into a single, or multiple, part component that without the use of cams transmits axial force from the cam load piston 720 to the traction ring 525. In some embodiments, however, the cam load piston 720 is not used and only the mechanical load cam assembly 717 provides axial force at the input side of the variator 310. The mechanical load cam assembly 717 may be characterized as a passive axial force generator that reacts axial force in series and in proportion to a torque.

In embodiments that employ hydraulic axial loading, it is preferable to provide for dynamic reaction to torque spikes. This can be done by combining a cam-based axial loading mechanism, configured to react quickly to torque spikes, with a hydraulic axial loading mechanism. In one embodiment employing active axial force generation, hydraulic pressure regulates the axial force generated by a cam to a desired magnitude. For example, the mechanical load cam assembly 717 can be configured to provide a level of axial force that exceeds the maximum required operational axial force, and the unloader piston 725 and unloader cylinder 730 provide hydraulic control to regulate the axial force generated by the mechanical load input cam assembly 717 to a desired axial force. Hence, in one embodiment, the cam load piston 720 is not used, and instead axial force generation is controlled with the mechanical load cam assembly 717 such that the cam-based axial force generation is oversized for the transmission. In the embodiment shown in FIGS. 5A, 7A, and 7B, the unloader piston 725 is configured to take the force of the cam flange 705 off traction ring 525 and, thereby, unload the planets 522 to a selected level. In such embodiments, axial force can be mostly constant, allowing for handling torque spikes with a cam-based AFG, while controlling the steady state axial force desired for a given torque with a hydraulically-based AFG. Where a hydraulic unloading piston is used, it is possible to use only the input load cam assembly 717; in such embodiments, the cam rings 610, 615 and center cam 605 can be replaced with a solid member.

By way of example, as torque increases, hydraulic pressure is reduced to let the input cam assembly 717 take over. If in a given application 100 pounds of axial force is desired at steady state, a cam that produces 1000 pounds of axial force is provided. A pressure to the unloader piston 725 and unloader cylinder 730 is provided to reduce the axial force on the traction ring 525 to 100 pounds. This configuration handles torque spikes, minimizes drag during normal operation, and facilitates programming desired axial force requirements.

It is to be noted that while FIG. 5A depicts one embodiment having a combination of hydraulic- and cam-based axial force generating mechanisms at the input side of the variator 310, depending on the embodiment all or any of the cam load piston 720, input cam assembly 717, and unloader piston 725 and unloader cylinder 730, may not be used. In embodiments where no AFG mechanism is used at the input side of the variator 310, the traction ring 525 is fixed rotationally to a nonrotatable element of the variator 310 and a thrust element may be interposed between the traction ring 525 and the variator housing 505, for example.

It should be noted that embodiments of the center cam assembly 570 and the input cam assembly 575 produce axial force that is proportional to the torque across the respective cam assembly 570, 575. Hence, whichever cam assembly 570, 575 experiences the highest torque determines the level of axial force in the variator 310 because the cam assembly 570, 575 experiencing the highest torque produces the highest axial force.

Figure 8C:
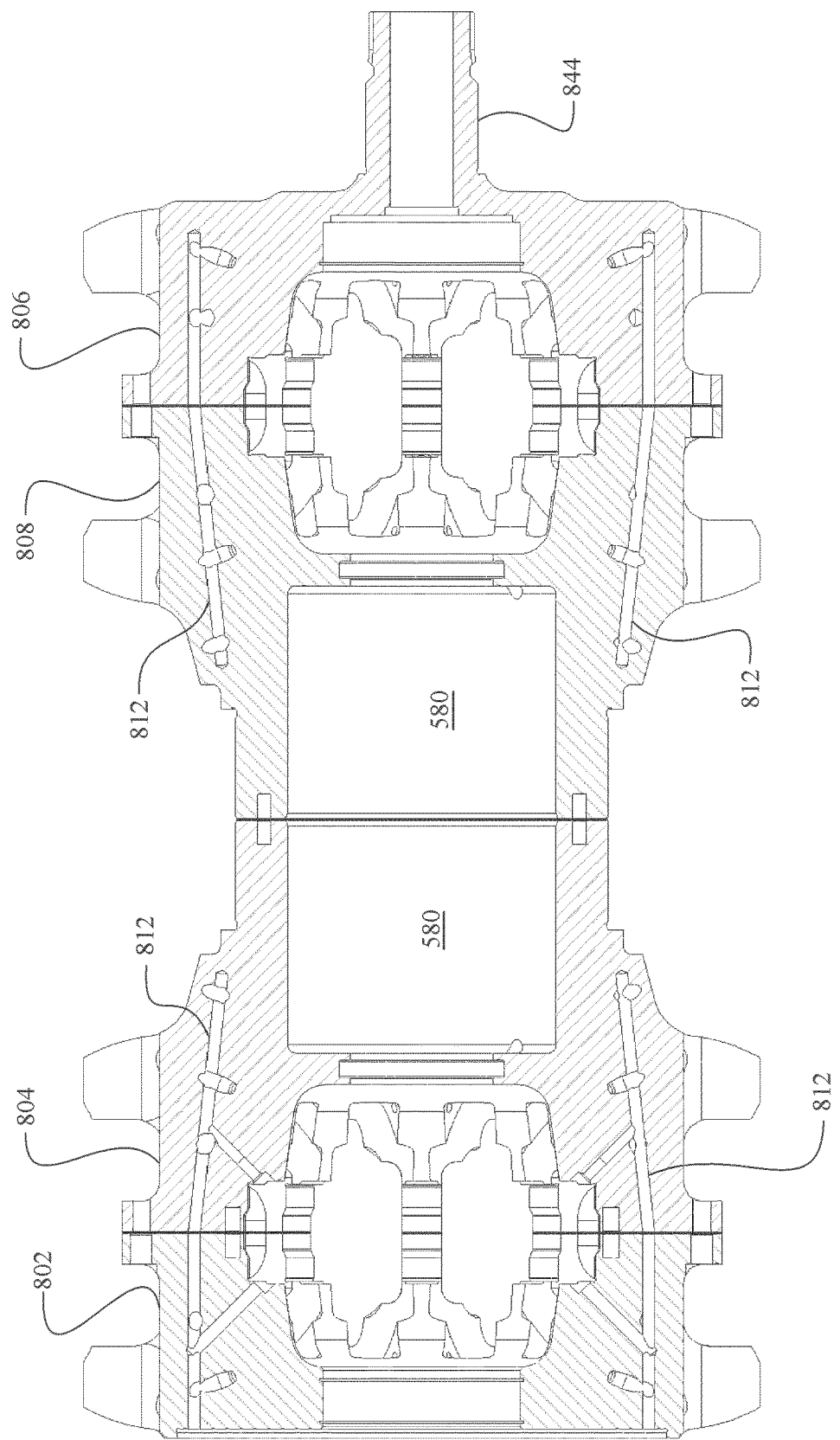
FIG. 8C is a cross-sectional view, along the line B-B, of the carrier assembly of FIG. 8A.
Figure 8D:
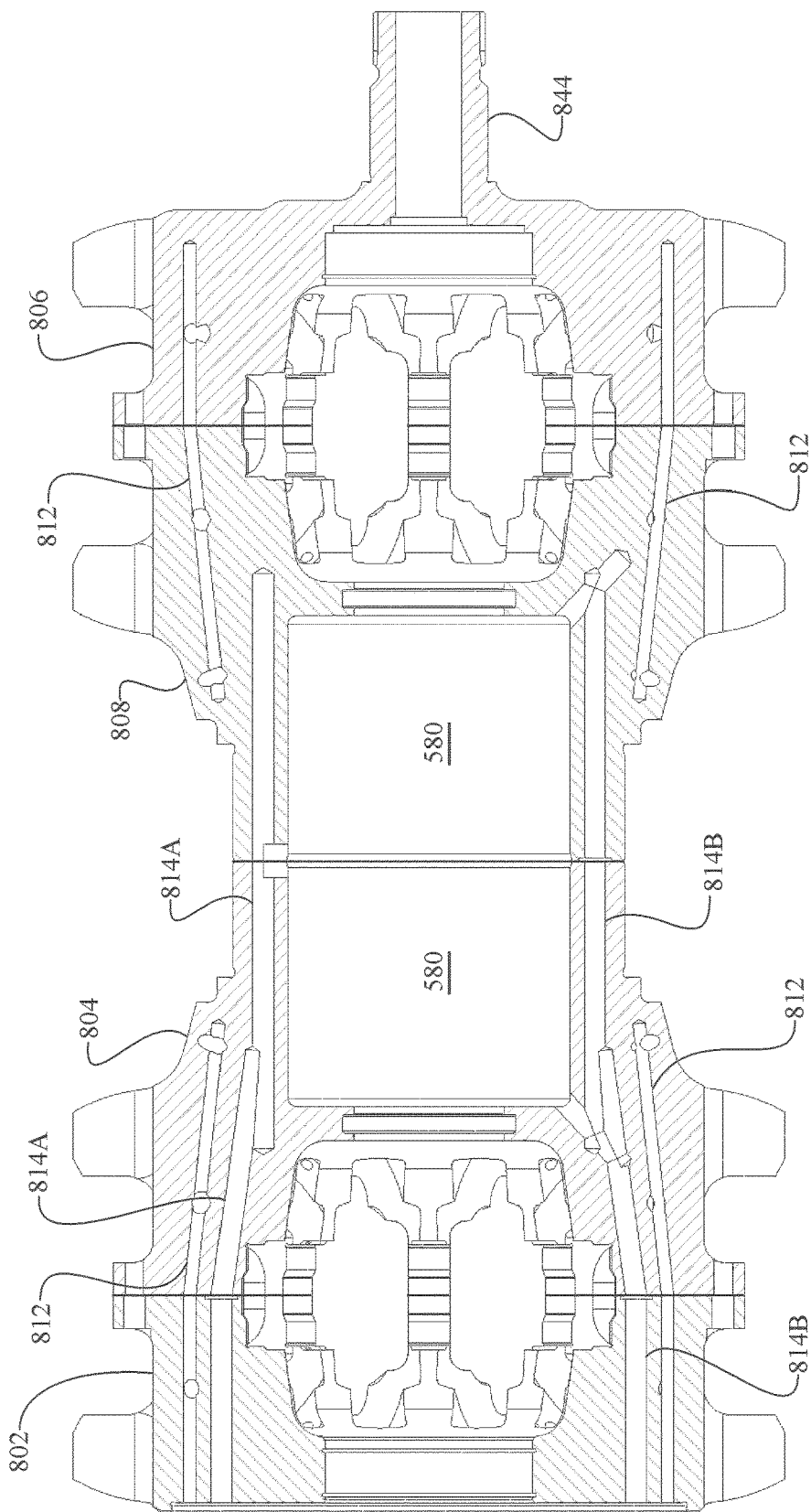
FIG. 8D is a cross-sectional view, along the line C-C, of the carrier assembly of FIG. 8A.
Figure 8G:
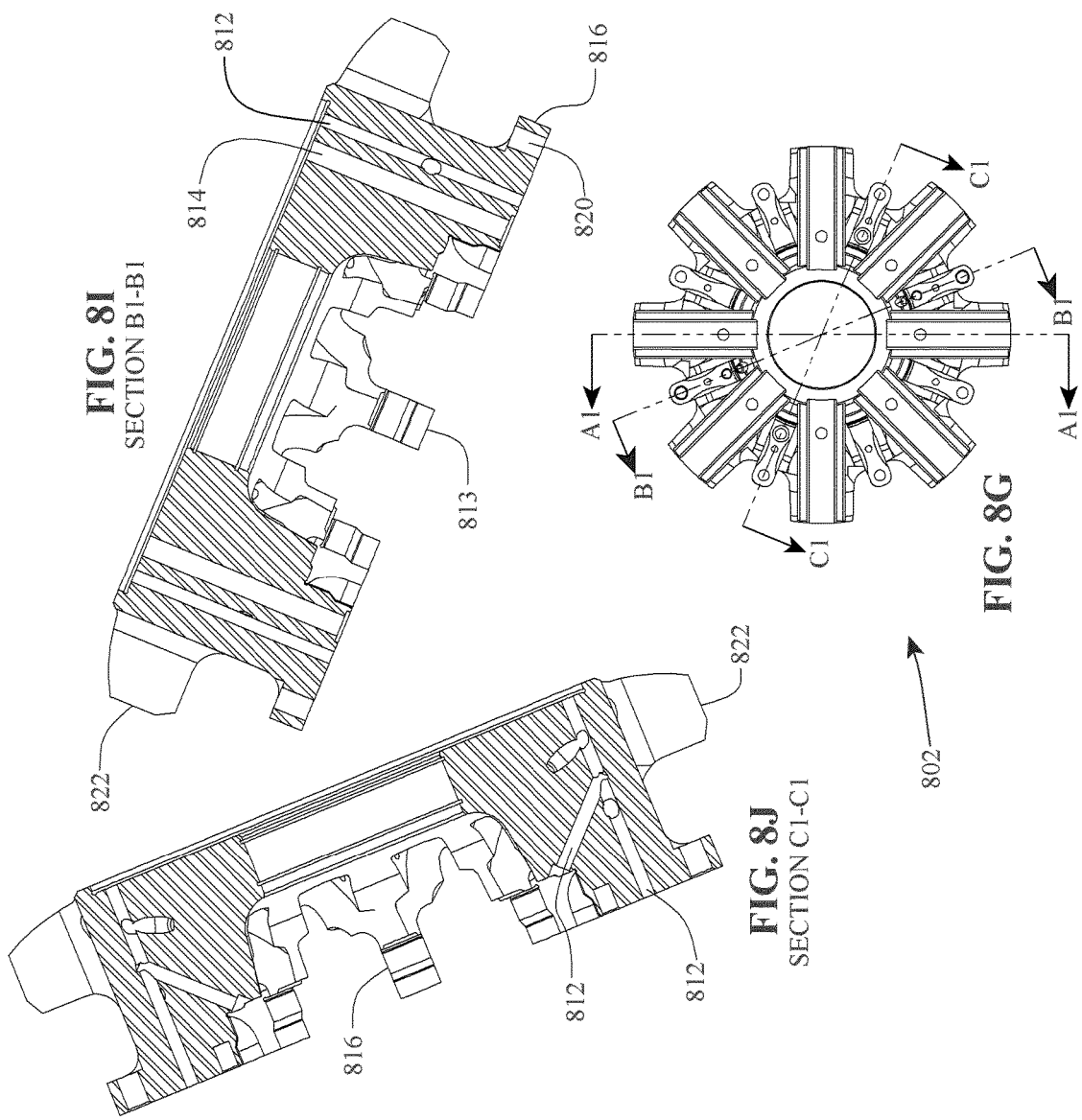
FIG. 8G is a front elevational view of the first end member of FIG. 8E.
Figure 8R:
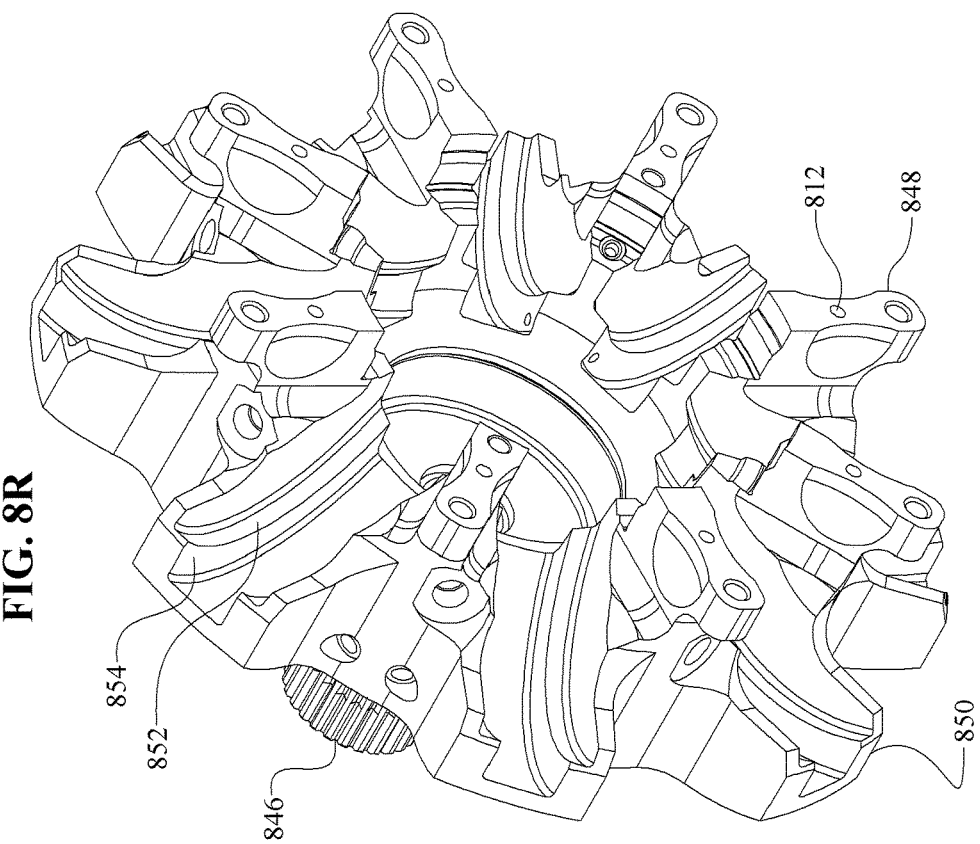
FIG. 8R is a second perspective view of the second end member of FIG. 8Q.
Figure 8Q:
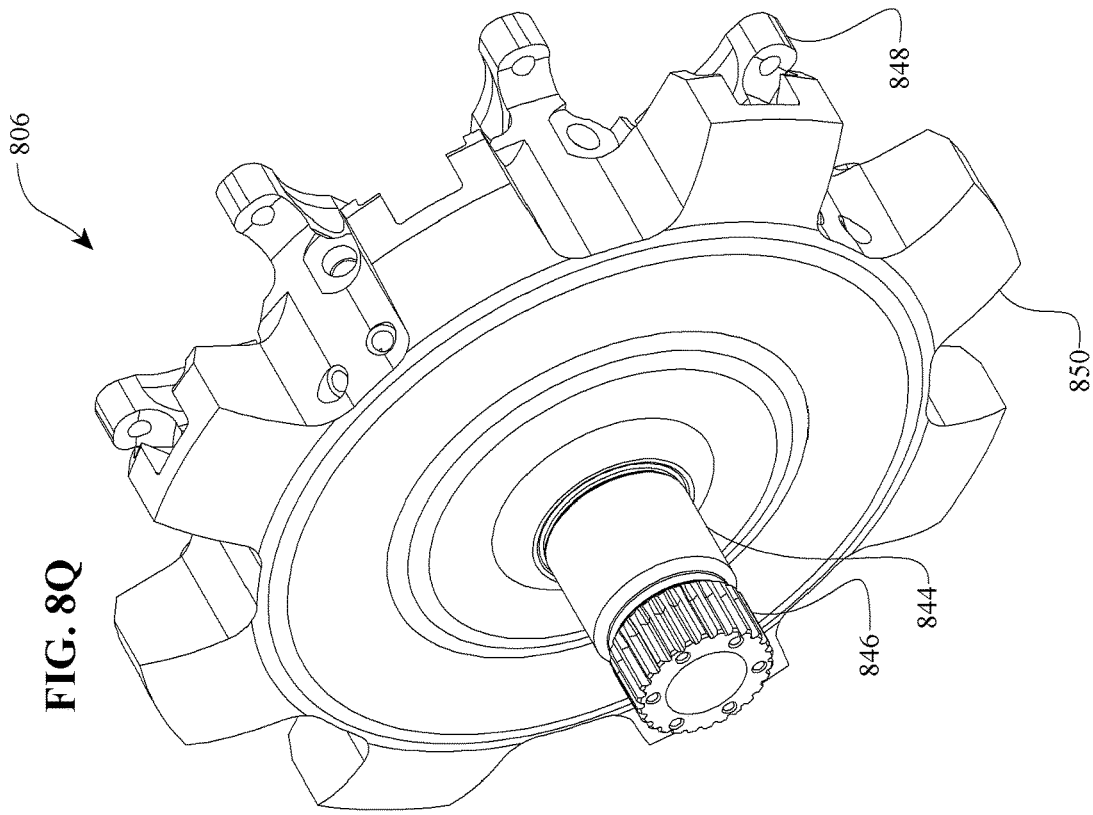
FIG. 8Q is a perspective view of a second end member of the carrier of FIG. 8.
Figure 11:
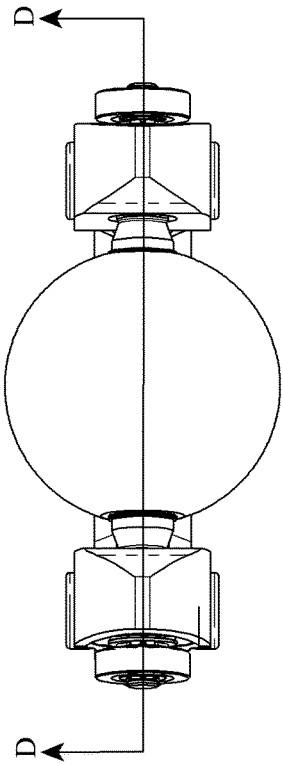
FIG. 11 is a top elevational view of the planet-pivot arm subassembly of FIG. 9.
Figure 12:
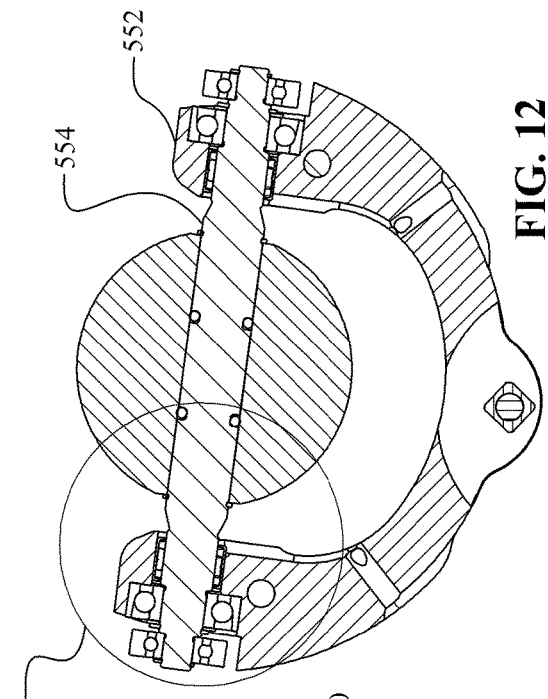
FIG. 12 is a cross-sectional view, along the line D-D, of the planet-pivot arm subassembly of FIG. 11.
Figure 9:
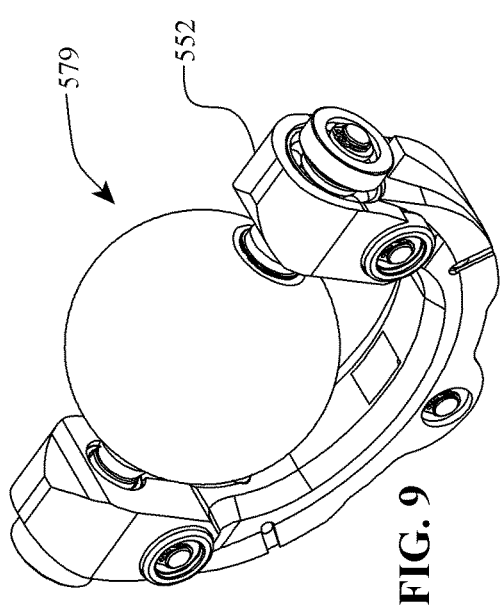
FIG. 9 is a perspective view of a planet-pivot arm subassembly that can be used with the variator of FIG. 5A.
Figure 10:
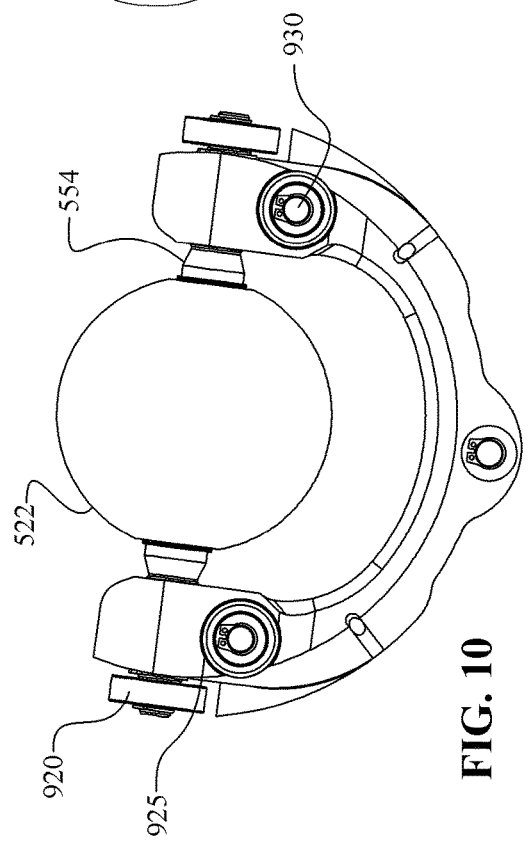
FIG. 10 is a front elevational view of the planet-pivot arm subassembly of FIG. 9.
Figure 13:
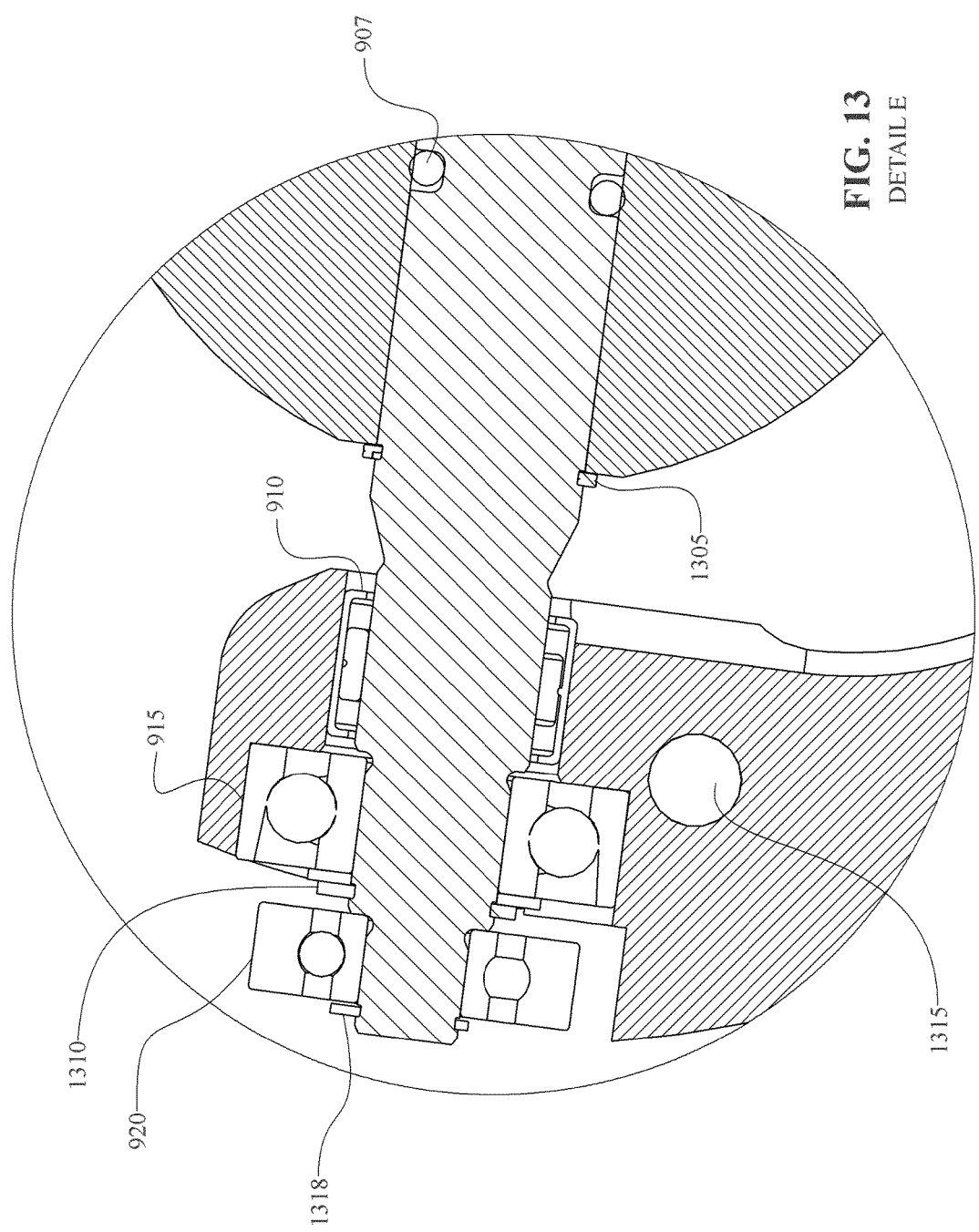
FIG. 13 is a detail view E of the cross-section of FIG. 12.

Referencing FIGS. 8A-8U now, an embodiment of a carrier 515 is shown. In this embodiment, the carrier 515 includes a carrier input cap 802 coupled to a first carrier center block 804. The carrier 515 further includes a carrier output cap 806 coupled to a second carrier center block 808. The first carrier center block 804 and the second carrier center block 808 are coupled together and form a hydraulic fluid chamber 580. As shown in FIGS. 8C and 8D, the carrier input cap 802, and carrier center blocks 804, 808 incorporate lubrication channels 812 and hydraulic pressure fluid channels 814A, 814B. The carrier output cap 806, in this embodiment, includes only the lubrication channels 812.

Referencing FIGS. 8E-8H and 9 now, in this embodiment the carrier input cap 802 has several fastening fingers 816 that facilitate the coupling of the carrier input cap 802 to the carrier center block 804. The fastening fingers 816 have bolt holes 821 to receive bolts or screws (not shown). In this embodiment, the fastening fingers 816 are formed as part of the carrier input cap 802, and the lubrication channels 812 and the hydraulic fluid channels 814A, 814B are formed partly in the fastening fingers 816.

The carrier input cap 802 also includes carrier fingers 822 that have surfaces 824 for imparting force to the bearings 920 of the planet-pivot arm assembly 579 (see FIG. 9), which then transfer the force to the axles 554 supporting the planets 522. Surfaces 826 of the carrier fingers 822 provide support for guide wheels 925 as the planet-pivot arm assembly 579 is shifted. The carrier fingers 822 also include threaded holes 828 to fasten the input shaft 510 to the carrier input cap 802.

In the vicinity of the carrier fingers 822 and the fastening fingers 816, in this embodiment, the carrier input cap 802 includes lubrication ports 885 configured to feed lubrication turrets 887. In the embodiment illustrated, lubrication fluid is pumped from the input shaft 510 into the channels 812 of the carrier input cap 802 and delivered to the lubrication ports 885.

The first and second carrier center blocks 804, 808 are substantially similar; hence, the following description of the first carrier center block 804 is generally applicable to and descriptive of the second carrier center block 808. FIGS. 8K-8P show an embodiment of the first carrier center block 804. Fastening fingers 830 of the center block 804 are generally similar to the fastening fingers 816 of the carrier input cap 802. The bolt holes 832 facilitate the coupling of the carrier input cap 802 and the center block 804. The body of the center block 804, including the fingers 830, incorporates the lubrication channels 812 and the hydraulic fluid channels 814A, 814B.

The center block 804 includes carrier fingers 834 that are similar in form and function to the carrier fingers 822 of the carrier input cap 802. Surfaces 836 of the carrier fingers 834 transfer force to the bearings 920, and surfaces 838 provide support for the guide wheels 925. As illustrated in FIGS. 8L and 8N, the carrier fingers 834 and a neck extension 843 incorporate bolt holes 840 to facilitate the fastening together of the center blocks 804, 808. In some embodiments, the center block 804 additionally includes dowel pin holes 842 for location and assembly purposes. The center block 804 includes an inner cylindrical part 581 formed in the neck extension 843 that along with a similar inner cylindrical part of the center block 808 form the chamber 580.

Referencing FIGS. 8Q-8U now, a carrier output cap 806 is shown. The carrier output cap 806 is substantially similar to the carrier input cap 802. In this embodiment, the carrier output cap 806 does not incorporate hydraulic control fluid channels 814 as does the carrier input cap 802. The carrier output cap 806 includes, in this embodiment, a carrier output shaft 844. In this embodiment, a spline 846 on the carrier output shaft 844 allows torque transfer. The carrier output cap 806 includes fastening fingers 848 and carrier fingers 850 that are substantially the same as fastening fingers 816 and carrier fingers 822 of the carrier input cap 802. Support surfaces 852 and torque transfer surfaces 854 of the carrier output cap 806 are similar to the support surfaces 826 and torque transfer surfaces 824 of the carrier input cap 802.

In some embodiments, the carrier input cap 802, carrier output cap 806, and/or the first and second carrier blocks 804, 808 can be provided with lubrication ports to deliver lubricant to an idler 562 (see FIG. 5B) or an idler 3905 (see FIGS. 39A-39C) and idler bearings 3920.

Referencing FIGS. 9-15F now, a planet-pivot arm assembly 579 includes a planet 522 mounted on a planet axle 554, which is supported on a pivot arm 552. In one embodiment, the planet 522 is a substantially spherical body having a diameter of about 2.5 inches. A central bore of the planet 522 can be about 0.5 inches in diameter for receiving the planet axle 554. The planet 522 can be made of, for example, bearing quality steel such as 52100 steel. Elastomer balls 907 fit in grooves 1505 of the planet axle 554 (see FIG. 15). In one embodiment, the elastomer balls 907 provide a frictional interface between the planet axle 554 and the planet 522 whereby the planet axle 554 and the planet 522 rotate as a unit.

In the embodiment illustrated, clips 1305 fix the axial position of the planet 522 on the planet axle 554. The ends of the planet axle 554 are received in the legs of the pivot arm 552. In this embodiment, each leg of the pivot arm 552 is configured to receive a shell-type needle bearing 910 and an angular contact ball bearing 915. The needle bearing 910 may be press-fit into a bore 1410 (see FIG. 14A) of the pivot arm 552, which press-fit fixes the axial position of the needle bearing 910. The angular contact ball bearing 915 fits in a bore 1420 of the pivot arm 552, and the clip 1310 retains the ball bearing 915 in the bore 1420. In some embodiments, when the bearing 915 is used, use of the guide wheels 925 can be omitted. The ends of the planet axle 554 ride on the bearings 910, 915. A ball bearing 920 is coupled to each end of the planet axle 554. In the embodiment shown, the ball bearing 920 is retained by a clip 1318 and by a shoulder 1540 of the planet axle 554. The guide wheels 925 mount on wheel shafts 930, which are inserted in bores 1315 (see FIG. 13) of the pivot arm 552. The guide wheels 925 react the shift force from the pistons 582 so that the shift force is not transmitted into the bearings 910, 915, 920. The guide wheels 925 keep the pivot arms 552 centered about the planets 522.

One embodiment of a pivot arm 552 is illustrated in FIGS. 14A-14C. The pivot arm 552 includes pivot arm extensions 1425 and 1430 positioned opposite each other about a pivot bore 1435. In the embodiment shown, the pivot arm extensions 1425, 1430 form one integral part, which improves structural rigidity; however, in other embodiments, for ease of assembly for example, the pivot arm extensions 1425, 1430 could be separate parts that are operatively coupled to a pivot point such as the pivot bore 1435. As best shown in FIG. 8, the pivot bore 1435 receives a pivot pin 815, which in some embodiments is supported by a pivot pin block 810. In other embodiments, the pivot pin 815 could be integral with the pivot arm extensions 1425, 1430.

In this embodiment, each pivot arm extension 1425, 1430 includes a bore 1410 and a bore 1420 for receiving bearings 910, 915 (as described above with reference to FIG. 13). In other embodiments, the bores 1410 and 1420 may be replaced by a single bore. Moreover, the bearings 910, 915 may be replaced by a single bearing, or bearing surface, which may be integral with the pivot arm extensions 1425, 1430. In the embodiment illustrated, each pivot arm extension 1425, 1430 includes recesses 1440 and bores 1315. The recesses 1440 receive guide wheels 925 (see FIG. 10), and the bores 1315 receive shafts 930 upon which the guide wheels 925 mount. In the embodiment illustrated, the pivot arm 552 is adapted to impart a primarily radial load on the planet axle 554 at the bearings 910, which contrasts with other methods of tilting the planet axles 554 in which the actuating mechanism imparts a bending load on the planet axles 554. As shown, in some embodiments, the pivot arm 552 includes passages 1445 and 1450 to facilitate the flow of lubricant.

In one embodiment of the pivot arm 552, the distance between the bores 1315 is about 4 inches, and the distance between the center of the pivot bore 1435 and the center of the bore 1410 is about 2.5-3.0 inches. In some embodiments, the pivot arm extensions 1425, 1430 extend from the pivot arm bore 1435 on a radius of about 2.5-3.0 inches, more preferably about 2.75 inches. For some applications, the diameter of the bore 1410 is about 0.5-0.8 inches, and the diameter of the bore 1420 is about 0.8-1.2 inches. In one embodiment, the pivot bore 1435 can have a diameter of about 0.2-0.3 inches, the diameter of the recesses 1440 can be about 0.6-0.8 inches, and the diameter of the bores 1315 can be about 0.2-0.3 inches. For certain applications, the passages 1445, 1450 can have diameters of about 0.1-0.2 inches. In one embodiment, the pivot arm 552 is made of, for example, 4140 heat treated steel. However, due to the centrifugal forces that arise in embodiments where the carrier 515 rotates, it might be preferable to make the pivot arm 552 of a material that has suitable strength but weighs less than steel.

Figure 15A:
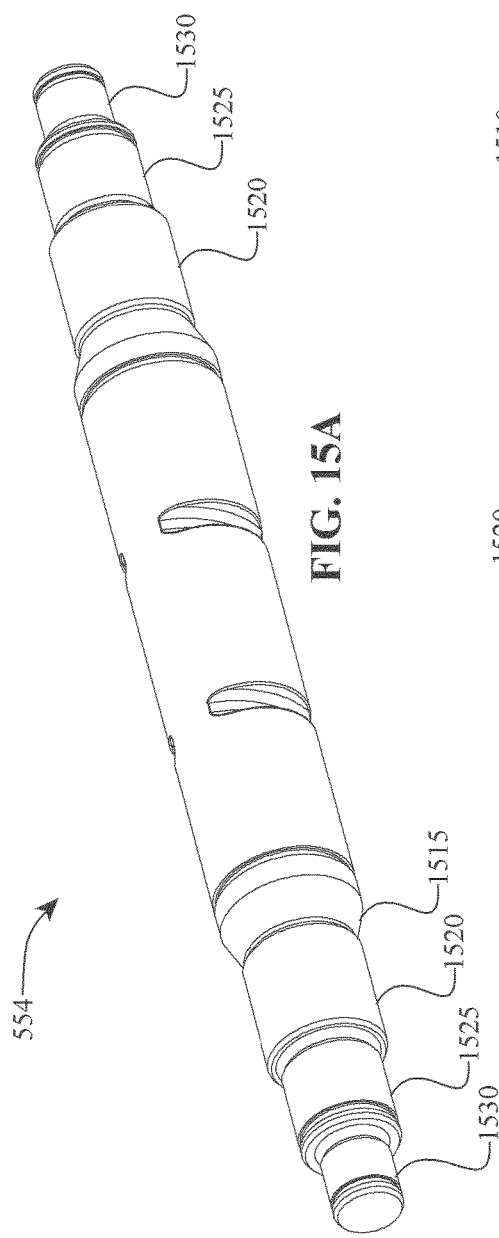
FIG. 15A is a perspective view of a planet axle that can be used with the planet-pivot arm subassembly of FIG. 9.
Figure 15B:
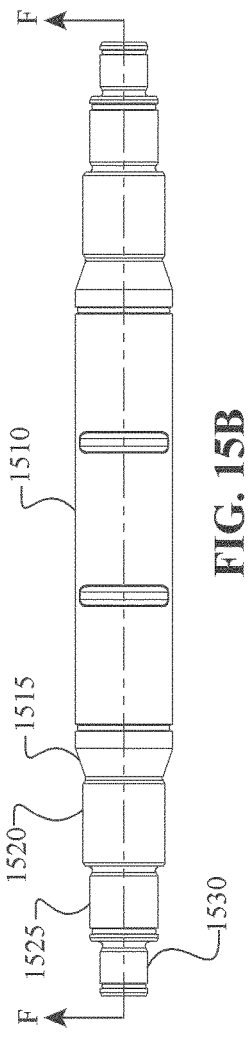
FIG. 15B is a front-elevational view of the planet axle of FIG. 15A.
Figure 15C:
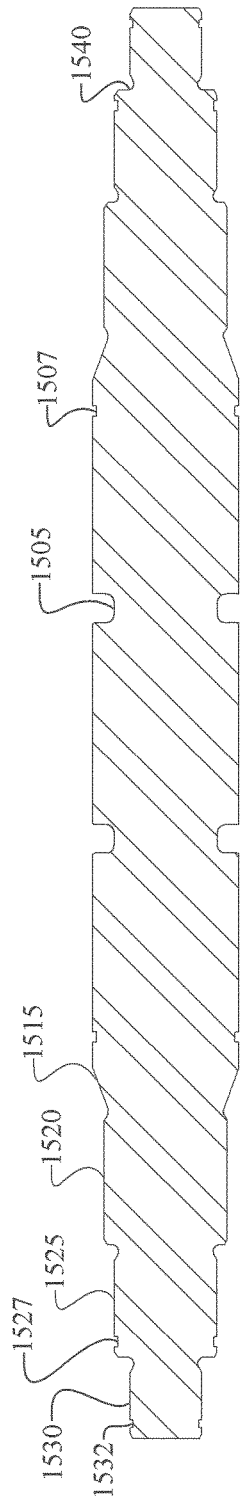
FIG. 15C is a cross-sectional view, along the line F-F, of the planet axle of FIG. 15B.

One embodiment of the planet axle 554 is illustrated in FIGS. 15A-15C. The planet axle 554 comprises a generally cylindrical central portion 1510 having grooves 1505 for receiving elastomer balls 907 (see FIG. 13). In some embodiments, at least one of the grooves 1505 is eccentric relative to the centerline of the planet axle 554 so that the elastomer ball 907 is rolled into a decreasing radial space if there is relative rotation between the planet 522 and the planet axle 554. The central portion 1510 also includes grooves 1507 for receiving retainer clips (not shown) that fix the axial position of the planets 522 on the planet axle 554. At each of its ends, the planet axle 554 has a neck 1515 that tapers radially toward the longitudinal axis of the planet axle 554 then slightly expands radially as it transitions into a cylindrical portion 1520. The cylindrical portion 1520 is configured to support the bearing 910 (see FIG. 13), which in some embodiments is press fit onto the cylindrical portion 1520. The planet axle 554 further includes another generally cylindrical portion 1525 configured to support the bearing 915 (see FIG. 13). The portion 1525 includes a groove 1527 for receiving the clip 1310 that retains in place the bearing 915. A shoulder 1540 of the planet axle 554 also facilitates the axial retention of the bearing 915. A cylindrical portion 1530 of the planet axle 554 is configured to receive and support the bearing 920 (see FIG. 13). A groove 1532 on the portion 1530 is configured to receive the clip 1318 that retains the bearing 920.

In one embodiment, the planet axle 544 has an overall length of about 5.5 inches. The central portion 1510, in certain applications, has a diameter of about 0.5 inches for a slide fit or a press fit into the central bore of the planet 522. In one embodiment, the central portion 1510 has a length of about 2.5 inches. In some embodiments, the cylindrical portion 1520 has a length of about 0.5 inches and a diameter of about 0.45 inches, the cylindrical portion 1525 has a length of about 0.4 inches and a diameter of about 0.40 inches, and the cylindrical portion 1530 has a length of about 0.3 inches and a diameter of about 0.27 inches.

FIGS. 15D-15G depict one embodiment of a guide wheel 925. Because typically the guide wheel 925 is subject to static loading or low speed operation, the guide wheel 925 need not be a bearing. However, in some embodiments, the guide wheel 925 may be, for example, a radial ball bearing. A central bore 1502 of the guide wheel 925 is configured to receive the pin 930 (see FIG. 10) that passes through the pivot arm 552. In some embodiments, the guide wheel is adapted to roll on the pin 930. The guide wheel 925 has a chamfered neck 1504 configured to occupy a recess 1440 of the pivot arm 552 (see FIG. 14A). A counter bore 1506 of the guide wheel 925 is adapted to extend to the end of the pin 930 and to receive a retainer clip (not shown) that holds the pin 930 in place. In some embodiments, the bore 1502 is configured such that pin 930 is retained by the guide wheel 925 by, for example, an interference fit; in such embodiments use of a retainer clip can be avoided. In yet other embodiments, the pin 930 may be adapted to roll in the bore 1315 of the pivot arm 552.

In one embodiment, the diameter of the central bore 1502 is about 0.2-0.3 inches, and the diameter of counterbore 1506 is about 0.4-0.5 inches. The outer diameter of the guide wheel 925 can be about 0.6-0.8 inches, and the diameter of the neck 1504 can be about 0.4-0.6 inches. In one embodiment, the width of the guide wheel 925 is about 0.25-0.35 inches. For certain applications, the guide wheel 925 can be made of AISI or SAE 52100 steel quenched and tempered to about 58 HRC minimum.

One embodiment and operation of a hydraulic ratio shifting mechanism 577 (hereinafter "shifter 577") will be described now; however, first it will be helpful to set out certain definitions. Referencing FIG. 16D, a gamma angle 2395 is defined as the angle between an axis 2380 and the longitudinal axis 2390 of a planet axle 554. The axis 2380 passes through the center of a planet 522 and is parallel to a longitudinal axis 2385 of the variator 310. Hence, when the planet axles 554 are parallel to the axis 2380, the gamma angle 2395 is equal to zero. It should be noted that the gamma angle 2395 can range from a maximum positive value to a maximum negative value, for example from +35 degrees to −35 degrees. In a preferred embodiment, the range of the gamma angle 2395 is from about −30 degrees to about +30 degrees. Different embodiments of the variator 310 can be configured such that the gamma angle 2395 range is different for each embodiment. Moreover, in some embodiments, the range of the gamma angle 2395 need not be symmetrical about zero degrees. That is, in certain embodiments, the maximum positive gamma angle 2395 might be +41 degrees while the maximum negative gamma angle 2395 might be −20 degrees, for example. It should be noted that in some embodiments it is desirable that the value of the gamma angle 2395 for the planets 522A be mirrored by the value of the gamma angle 2395 for the planets 522B.

In the embodiment where the traction rings 525A, 525B are nonrotatable, the rotational speed of the planets 522 about the axis 2390 depends on the gamma angle 2395. In an embodiment where the carrier 515 rotates about the axis 2385, the planets 522 have an orbital speed about the axis 2385. For simplicity, the rotational speed of the planets 522 about the axis 2390 will be referred to as the rotational speed of the planets 522, and the orbital speed of the planets 522 about the axis 2385 will be referred to as the orbital speed of the planets 522. The surface speed on any point of a planet 522 is dependent on both the rotational speed and the orbital speed of the planet 522. The speed of the output traction rings 530, 533 depends on the surface speed of the planets 522 at the contact point between the planets 522 and the output traction rings 530, 533. Said contact point between the planets 522 and the output traction rings 530, 533 will be referred to as the "contact point." Said surface speed at the contact point will be referred to as the "surface speed." The speed of the drive flange 532 is dependent on the speed of the output traction rings 530, 533.

In brief, in one embodiment, to change the ratio of the variator 310 a control valve 1605 is operationally coupled to the planet axles 554. An adjustment in the state of the valve 1605 results in an adjustment of the gamma angle 2395, which produces a change in the rotational speed of the planets 522. As the rotational speed of the planets 522 changes, the speed of the output traction rings 530, 533 changes, which results in a change in the speed of the drive flange 532. What follows is a description of a number of embodiments of devices and methods for causing a change in, or holding steady, the gamma angle 2395.

Figure 16A:
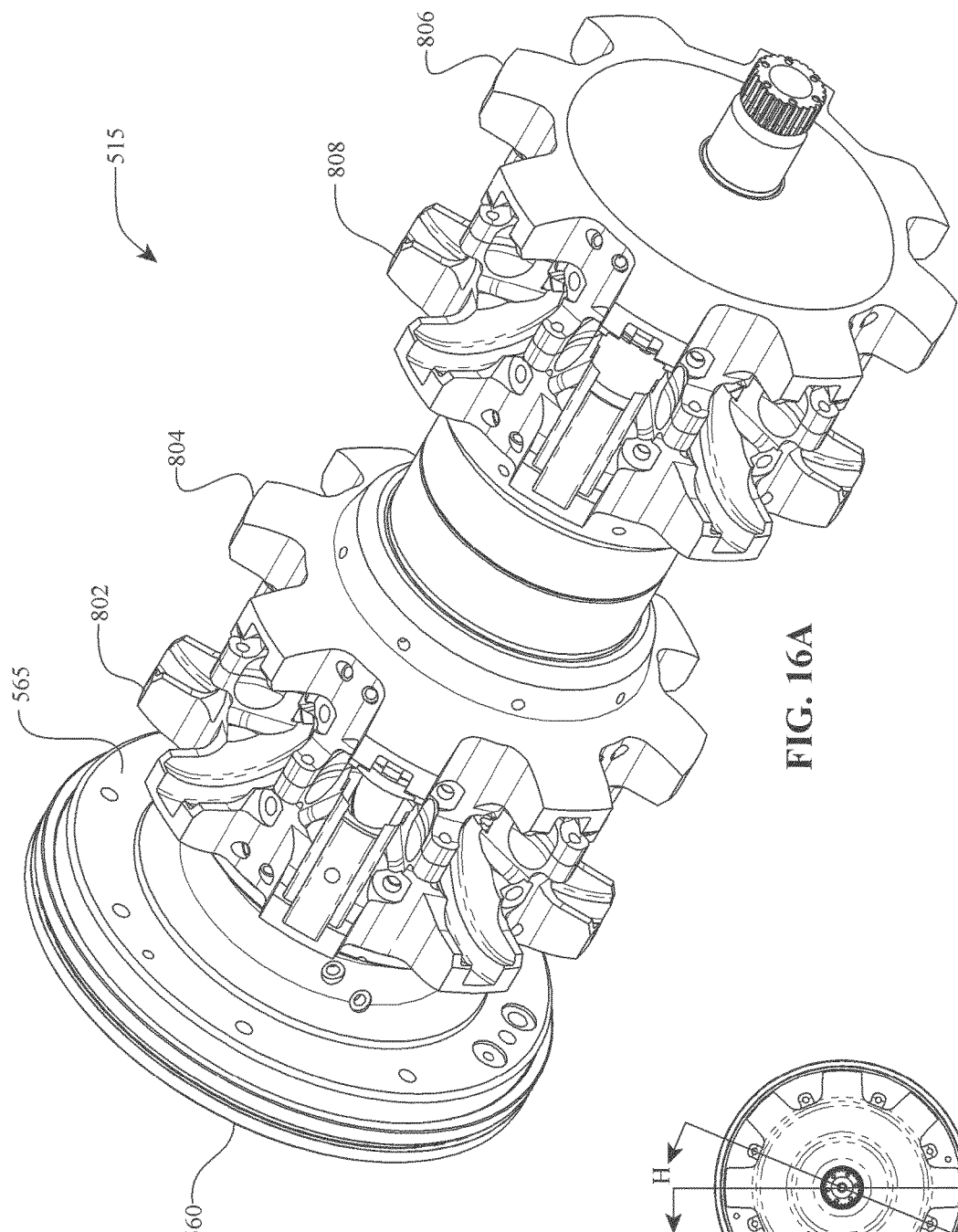
FIG. 16A is a perspective view of a subassembly that can be part of a ratio shifting mechanism for the variator of FIG. 5A.
Figure 16B:
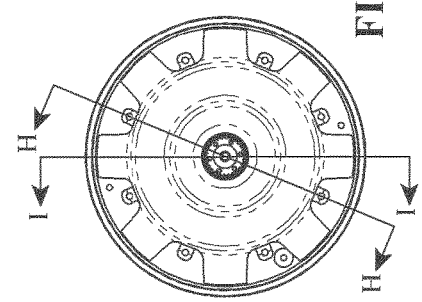
FIG. 16B is a right-side elevational view of the subassembly of FIG. 16A.
Figure 20:
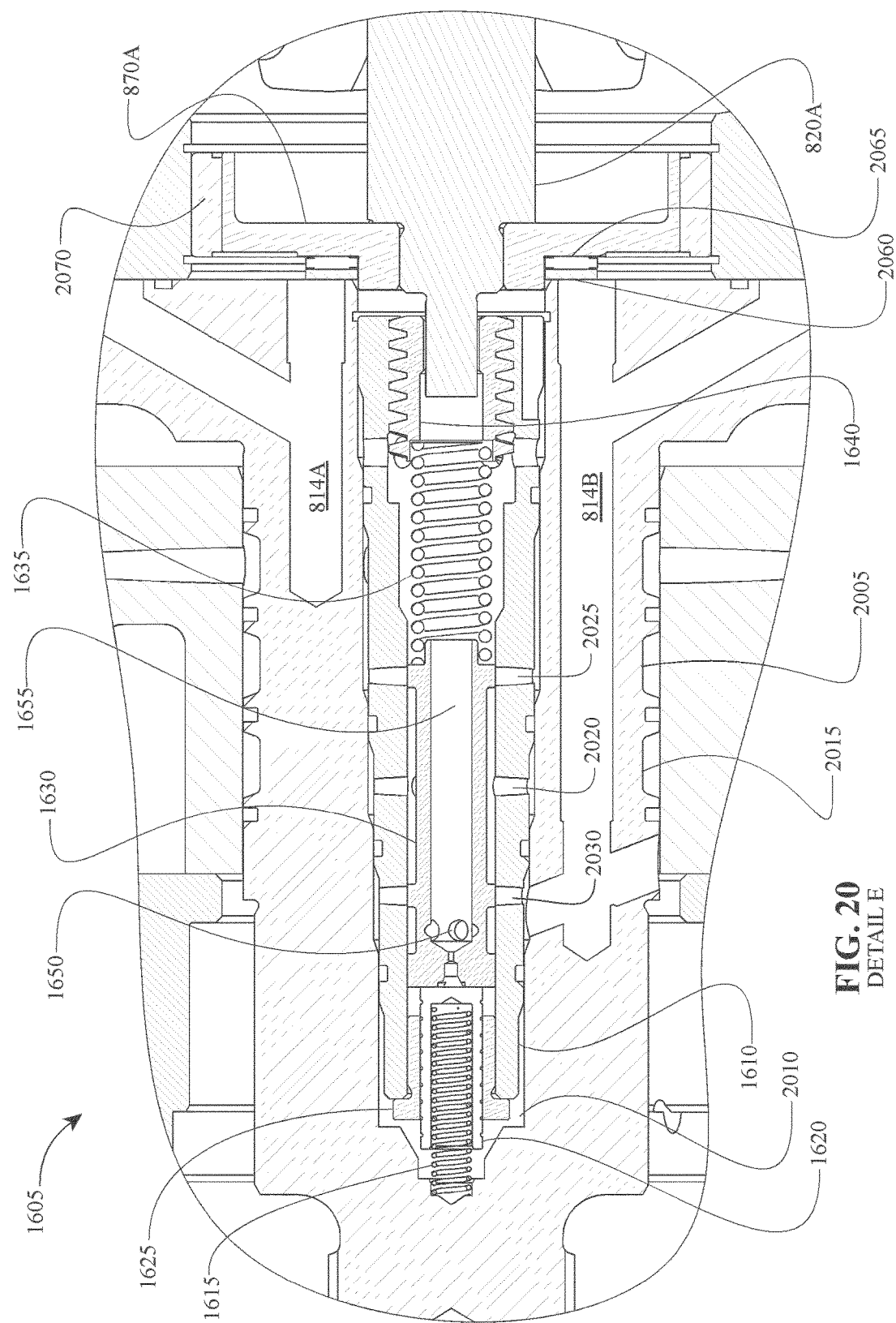
FIG. 20 is a Detail E, of the cross-section of FIG. 16, showing a hydraulic valve system that can be used with the ratio shifting mechanism of FIG. 16.

Turning to FIG. 16A now, in one embodiment the carrier 515 supports various components or functions for shifting the ratio of the variator 310; hence, the carrier 515 is here included as part of the shifter 577. However, it will be apparent to a person of ordinary skill in the relevant technology that the functions of the carrier 515 and those of the shifter 577 can be separated and provided by components that are not integral to one another. Referencing FIGS. 16C and 20 now, the shifter 577 includes a hydraulic control valve 1605 housed in a cavity 512 (see FIG. 17D) of the input shaft 510. The valve 1605, generally shown in detail view E of FIG. 16C and in FIG. 20, is further described below. For delivering control fluid to the valve 1605, in one embodiment the shifter 577 includes a fluid manifold 565 coupled to a cover plate 560. An external pump (not shown) supplies control fluid to the manifold 565. In other embodiments, the pump may be located within the manifold 565, cover plate 560, or other confines of the variator 310. In this embodiment, the manifold 565 and the cover plate 560 mount coaxially about the input shaft 510. For additional description of certain embodiments of the input shaft 510, the manifold 565, and the cover plate 560, see FIGS. 17A-17D, FIGS. 18A-18E, and FIGS. 18F-18I, respectively.

Figure 16C:
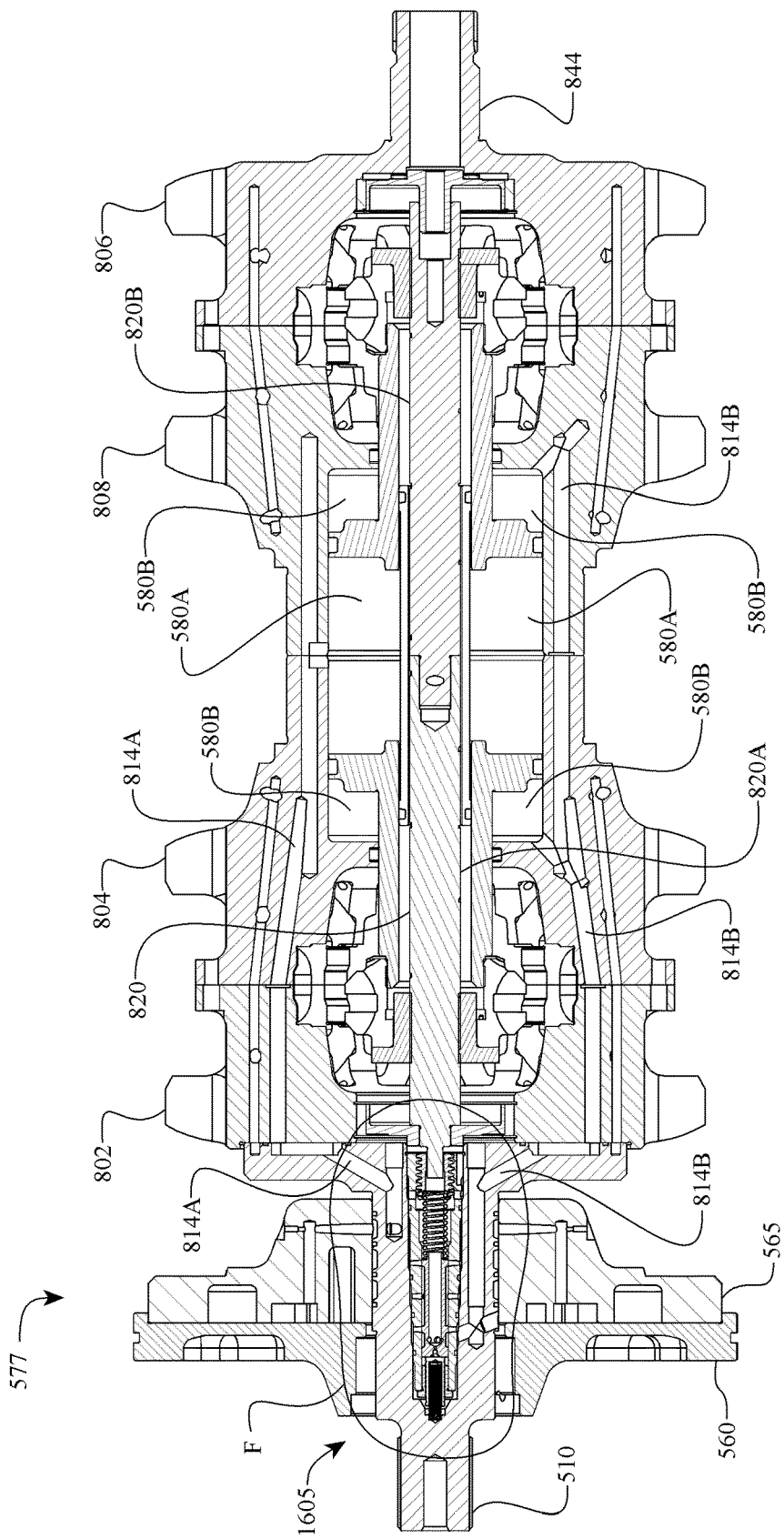
FIG. 16C is a cross-sectional view, along the line H-H, of the subassembly of FIG. 16B.

Referencing FIGS. 8D and 16C, the control valve 1605 is in fluid communication with the chamber 580 via the channels 814A, 814B formed in the input shaft 510 and in the carrier 515. The control pistons 582A, 582B divide the chamber 580 into chambers 580A, 580B. As previously stated, the chamber 580 is formed as carrier center blocks 804, 808 are brought together. Referencing FIG. 16D, the control pistons 582A, 582B are operationally coupled to the pivot pin hubs 805A, 805B, respectively. In one embodiment, the control pistons 582A, 582B couple to the pivot pin hubs 805A, 805B via an interference fit, a key, a weld, threading, or other fastening method. The pivot arms 552 are operationally coupled to the pivot pin hubs 805A, 805B. The pivot arms 552 are operationally coupled to the planet axles 554. See the description of FIG. 5B for an example of a planet-planet axle subassembly 579. For additional description of: the pivot pin hubs 805 see FIGS. 21A-21D, the control pistons 582 see FIGS. 22A-22C, the pivot arms 552 see FIGS. 14A-14C, or the planet axles 554 see FIGS. 15A-15C.

In the embodiment shown in FIG. 20, the control valve 1605 includes a spool bushing 1610 configured to house other valve components and to receive and distribute hydraulic control fluid. In one embodiment, the spool bushing 1610 is constrained axially by a clip (not shown) placed in a clip groove 2003 (see FIG. 17D) of the input shaft 510. A key (not shown) suitably configured to couple the spool bushing 1610 and the input shaft 510 fixes the spool bushing 1610 rotationally relative to the input shaft 510. The person having ordinary skill in the relevant technology will readily recognize other methods of axially and rotationally constraining the spool bushing 1610 relative to the input shaft 510.

Partly housed by the spool bushing 1610, a compression spring 1615 has one end that pushes against a recess of the input shaft 510 and another end that engages a pilot control piston 1620. A pilot control cylinder 1625 receives the pilot control piston 1620. In this embodiment, a flange of the pilot control cylinder 1625 engages the spool bushing 1610. The compression spring 1615 is preferably configured to ensure that the pilot control piston 1620 is continuously pressed against a valve spool 1630. One end of a feedback spring 1635 couples to the valve spool 1630 and the other end of the feedback spring 1635 couples to a feedback screw 1640.

In certain embodiments, the control valve 1605 is adapted to balance the pilot pressure applied to the piston area of the pilot control piston 1620, for example, against the feedback spring 1635. Control sensitivity or resolution is defined here as the operating pilot pressure range divided by the operating range of the gamma angle 2395. Pilot pressure range is the difference between the highest and the lowest pilot pressure. In some applications, it is preferred to use the widest pilot pressure range possible for a given range of the gamma angle 2395. In one instance, for example, the resolution can be 20 psi pilot pressure change for every 1 degree of change in the gamma angle 2395. The pressure range can be adjusted by selection of the area of the pilot control piston 1620 and the characteristics of the feedback spring 1635. Hence, the pilot pressure range can be given by pressure_range=k*d/A, where k is the spring rate, d is the total deflection range of the feedback spring 1635, and A is the area of the pilot control piston 1620. In general, for a given A, a stiffer (that is, higher k) feedback spring 1635 will result in a wider pilot pressure range. Similarly, if the feedback spring 1635 has a higher d over a given range of the gamma angle 2395, the pilot pressure range will be larger. Finally, if A is decreased, the overall pilot pressure range will increase.

Additionally, once the pilot pressure range is established, the center point of that range can be adjusted by setting the initial preload on the feedback spring 1635. If a higher pilot pressure is desired, the feedback spring can be given a larger preloaded deflection. If a lower pilot pressure is desired, the feedback spring 1635 can be given a lower initial deflection. For example, if the feedback spring 1635 is given an initial deflection of 0.020 inch, and the pilot pressure range is 50-250 psi over a range of −20 to 20 degrees for the gamma angle 2395, the pressure range can be increased with a higher initial deflection. Hence, if the feedback spring were given a 0.04 inch initial deflection, the pilot pressure range could change from about 100 psi to 300 psi, for example. In some embodiments, as long as the feedback spring 1635 is never deflected beyond the linear range of the feedback spring 1635, the middle point of the pilot pressure range can be moved up or down without affecting the pilot pressure range.

In one embodiment, the pilot control piston 1620 is about 1.0 inches long, includes a central cavity having a diameter of about 0.2-0.3 inches, and has an outer diameter of about 0.3-0.4 inches. In some embodiments, the pilot control cylinder 1625 has a through, central bore with a diameter of about 0.3-0.4 inches adapted to receive the pilot control piston 1620. An outer diameter of the pilot control cylinder 1625 can be about 0.5-0.6 inches and is adapted to fit, as shown in FIG. 20, in a cavity of the spool bushing 1610. In yet other embodiments, to increase the area of the pilot control piston 1620, the pilot control cylinder 1625 is not used, and rather, the cavity and outer diameter of the pilot control piston 1620 are increased to fit the cavity of the spool bushing 1610. In such embodiments, added flexibility in setting the control sensitivity is gained by providing a way to, in effect, change A (the area of the pilot piston 1620). In some applications, the pilot control piston 1620 and/or the pilot control cylinder 1625 are made of 52100 or 440C steel, for example.

In one embodiment, the spool bushing 1610 has an overall length of about 4.5-5 inches. A central cavity of the spool bushing 1610 can be about 0.4-0.6 inches in diameter. The outer diameter of the spool bushing can range from about 0.7 at one of its ends to about 1.1 inches at its other end. One end of the spool bushing 1610 can be provided with a set of class 4 acme treads for mating corresponding threads of the feedback screw 1640. The set of acme threads can have a 0.75 inches nominal diameter, a 0.25 inches lead, 0.125 inches pitch. The spool bushing 1610 can be provided with a number of ports (see FIG. 20) connecting the outside and the inside of the spool bushing 1610. For certain applications, the ports have a typical diameter of about 0.125 inches. The valve spool 1630, in some embodiments, is about 2.0 inches long, has central cavity of about 0.25 inches in diameter, and has an outer diameter of about 0.5-0.7 inches. Preferably, the valve spool 1630 is adapted to fit in and cooperate with the spool bushing 1610. In one embodiment, the valve spool 1630 is made of, for example, 52100 or 440C steel. The spool bushing 1610 can be made of 440C steel, for example.

Figure 19:
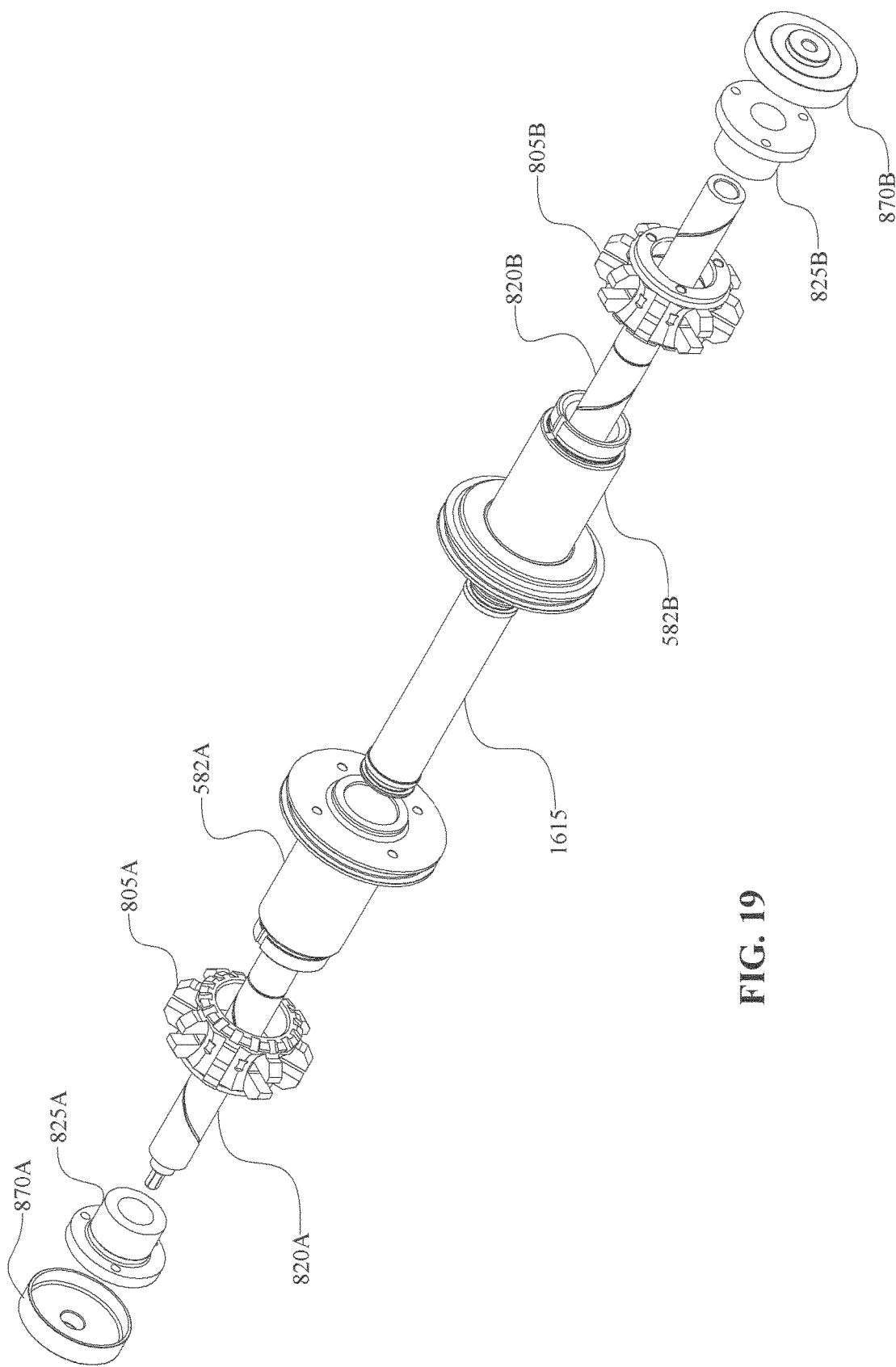
FIG. 19 is an exploded view of certain components of the ratio shifting mechanism of FIG. 16.

Referencing FIG. 19, to provide feedback to the control valve 1605, a control screw 820 operationally couples to the control valve 1605. More specifically, in one embodiment, the control screw 820 couples to the feedback screw 1640. The control screw 820 can be keyed, splined, or otherwise suitably coupled to the feedback screw 1640. In some embodiments, the control screw 820 is rigidly coupled rotationally, but axially unconstrained, relative to the feedback screw 1640. In this embodiment, the control screw 820 is composed of a left-handed thread screw 820A and a right-handed thread screw 820B that are coupled to each other by a pin (not shown). Thus, the control screw 820 can be configured to provide mechanical feedback to the control valve 1605. As is discussed below, in some embodiments the control screw 820 can be additionally configured to provide feedback for external measurement of the gamma angle 2395 (see the FIG. 23D-23F and accompanying text).

Referencing FIGS. 19-20 now, link screw end stops 870A, 870B are radially and axially constrained within the carrier 515, and are configured to interface with shoulders of the control screw 820 to provide positive axial stops for the control screw 820. In some embodiments, a thrust bearing 2065 is placed between the link screw end stop 870A and the input shaft 510. In other embodiments, a thrust washer 2060 can be used between the thrust bearing 2065 and the input shaft 510. The link screw end stop 870B is axially constrained by the carrier 515. In some embodiments, a thrust bearing or thrust washer (not shown) can be placed between the carrier 515 and the link screw end stop 870B. In the embodiment illustrated, the bearings 2070 are radially located by recesses in the carrier input cap 802 and carrier output cap 806. The link screw end stops 870A, 870B are in turn radially located by, or within, the bearings 2070. The link screw end stops provide radial support for the control screw 820. As shown in FIG. 20, the bearing 2070 mounts on the link screw end stops 870A and radially supports the carrier 515. In one embodiment, a center sleeve 1615 covers the central portion of the control screw 820 and functions as a sealing inner sleeve for forming part of the chamber 580.

In one embodiment, the control screw 820 couples to pivot pin hubs 805A, 805B via a control screw nuts 825A, 825B. Hence, the control screw 820 functions as synchronizing device or synchronizer in that the control screw 820 ensures that the planet axles 554 are at the same gamma angle 2395 for each of the planet arrays 522A and 522B.

In some embodiments, the control screw 820 has an overall length of about 19 inches. In one embodiment, the screws 820A, 820B have a lead of about 3 inches, wherein the screw 820A has a left hand thread and the screw 820B has a right hand thread. For certain applications, the nominal diameter of the control screw 820 can be about 1.0 inch. In one embodiment, the center sleeve 1615 has an overall length of about 6.5-7.0 inches. In some embodiments, the center sleeve 1615 has an outer diameter of about 1.5 inches and an inner diameter of about 1.0 inch. In one embodiment, the feedback screw 1640 has an overall length of about 0.8-0.9 inches, an acme thread having a nominal diameter of about 0.75 inches, and a hexagonally profiled bore of about 0.3 inches in diameter.

Referencing FIGS. 17A-17D and 20 additionally, to change the gamma angle 2395, pilot pressure is delivered via a port 2005 and a channel 1725 (partially shown in FIG. 17D) of the input shaft 510 to a pilot pressure chamber 2010, where the pilot pressure is applied to the pilot control piston 1620. As the pilot pressure applied to the pilot control piston 1620 increases, the pilot control piston 1620 moves the valve spool 1630 axially toward, and thereby deflects, the feedback spring 1635. Line pressure is provided from a line port 2015 and through a channel 1730 (partially shown in FIG. 17D) of the input shaft 510 into a port 2020 of the spool bushing 1610. As the valve spool 1630 deflects the feedback spring 1635 (thereby moving toward the right in the orientation of FIG. 20), control fluid can flow from the port 2020 to the port 2025. Control fluid then flows from the fluid port 2025 into channels 814A that feed the chamber 580A (see FIG. 16C). As the chamber 580A fills, the control pistons 582A, 582B move away from the center of the chamber 580.

Control fluid in the chamber 580B is vented via vent ports 1650 of the valve spool 1630 as the port 2030, connecting to channels 814B, comes in fluid communication with the vent ports 1650. For additional description of the venting of control fluid, see below the description of the input shaft 510 with reference to FIGS. 17A-17D. When pilot pressure in the pilot pressure chamber 2010 is decreased, the control spring 1635 actuates the valve spool 1630 to move toward the left and, thereby, to allow fluid communication between the fluid ports 2020 and 2030. Control fluid then flows into channels 814B and into chamber 580B, thereby causing the control pistons 582A, 582B to move toward the center of the chamber 580. Control fluid in the chamber 580A is then vented via channel 814A and ports 2025.

As noted above, increasing the pilot pressure results in control fluid filling the chamber 580A and emptying from the chamber 580B. As the chamber 580A fills, the control fluid in the chamber 580A pushes the control pistons 582 outwardly from the center of the chamber 580. Because the pivot pin hubs 805 couple to the control pistons 582, the pivot pin hubs 805 move axially away from the center of the chamber 580. That is, the pivot pin hub 805A moves toward the left, while simultaneously the pivot pin hub 805B moves toward the right ("left" and "right" here are as viewed on the plane of FIGS. 16C-16D). The axial movement of the pivot pin hubs 805 causes rotation of the pivot arms 552 about the pivot pins 815. It should be noted that the action of the pivot pin hubs 805 upon the pivot arms 552 also results in a rotation of the pivot arms 552 about the center of the planets 522.

Thus, the filling or emptying of the chambers 580A, 580B actuates the control pistons 582. The axial movement of the control pistons 582 produces an axial movement of the pivot pin hubs 805, which in turn produces a rotational movement of the pivot arms 552. Because the pivot arms 552 couple to the planet axles 554, as the pivot arms 552 rotate, the planet axles 554 are tilted, and thereby, the gamma angle 2395 is changed.

As previously mentioned, in one embodiment the pivot pin hubs 805 are rigidly connected to the control screw nuts 825, which are threaded to the control screw 820. Because the control screw 820 incorporates two screws 820A, 820B that are oppositely threaded and coupled by a pin (not shown), the control screw 820 works like a turnbuckle. Due to the opposing threads on the control screw 820, as the control pistons 582 move in opposite directions, the control screw 820 is driven in one constant rotation. The control screw 820 rotates but does not move axially. As the pivot pin hub 805A moves to the left, for example, the control screw nut 825A causes a rotation of the control screw 820A, which has left-handed threads. Since the control screw 820A is rotationally coupled to the feedback screw 1640, the control screw 820A causes the feedback screw 1640 to rotate also. Rotation of the feedback screw 1640 in the threads of the spool bushing 1610 causes the feedback screw 1640 to translate axially and, thereby, to react against the control spring 1635 and change the deflection of the control spring 1635. The valve spool 1630 is balanced by forces from the pressure on the load piston 1620 and the control spring 1635. When the force of the control spring 1635 is greater than the pilot pressure, the valve spool 1630 is then actuated by the control spring 1635. The ratio of the variator 310 is held steady when the valve spool 1630 is situated such that the valve spool 1630 closes the ports 2030 and 2025 (as is shown in FIG. 20), which prevents fluid communication between the port 2020 (line pressure) and either of the ports 2030 or 2025 for filling or venting the chambers 580A, 580B. The valve spool 1630 achieves its steady-ratio position by the force balance produced by the interaction between the valve load piston 1620 and the control spring 1635 through the valve spool 1630. (¶21) As the control pistons 582 move away from the center of the chamber 580, the deflection of the control spring 1635 changes until a balance is achieved between the forces of the control spring 1635 and of the pilot piston 1620 upon the valve spool 1630. In this manner, position control of the feedback screw 1640, and thereby of the gamma angle 2393, is achieved.

The following will describe certain behaviors of the variator 310 as the gamma angle 2395 is changed. For descriptive purposes, it is assumed that the input shaft 510 spins in a clockwise direction, wherein the observer is looking at the input shaft 510 on the side of the input shaft flange 1715 that makes contact with the carrier input cap 802. In the following discussion, all angular direction references are made with reference to the direction of the angular speed of the input shaft 510.

In the embodiment illustrated, the carrier 515 spins in the same direction as the input shaft 510 because the carrier 515 couples directly to the input shaft 510. Hence, since it has been assumed that the input shaft 510 spins clockwise, the carrier 515 also spins clockwise. The carrier 515 pushes on the bearings 920 coupled to the planet axles 554. Because the traction rings 525A, 525B are fixed rotationally, and since the planets 522 roll on the traction rings 525A, 525B and the idler 562, the planets 522 rotate counterclockwise about the axis 2390. In this embodiment, the rotation of the planets 522 about the axis 2390 is always in a direction opposite to the direction of rotation of the carrier 515. Additionally, the carrier 515 also causes the planets 522 to orbit clockwise about axis 2385. In this embodiment, the planets 522 always orbit in the same angular direction as the rotation of the carrier 515. While the orbiting speed of the planets 522 is "fixed" in the sense that it is determined by the rotational speed of the carrier 515, the rotational speed of the planets 522 about the axis 2390 can be varied by changing the gamma angle 2395.

With reference to FIG. 16D, for convenience of description, local coordinate systems 592A, 592B, 592C, and 592D (collectively coordinate systems 592) are defined as coordinate systems having the positive direction of the y-axis pointing away from the central, longitudinal axis of the variator 310 and the positive direction of the x-axis pointing toward the central portion of the variator 310 as represented by the chamber 580A. As used here, the "poles" of the planets 522 refer to the points on the surface of the planets 522 that are diametrically opposed and lie on the axis defined by the ends of the planet axles 554. The "equators", as used here, refer to the points on the surface of the planets 522 that lie on a plane passing through the center of the planets 522 and that is perpendicular to the axis defined by the ends of the planet axles 554.

Figure 16E:
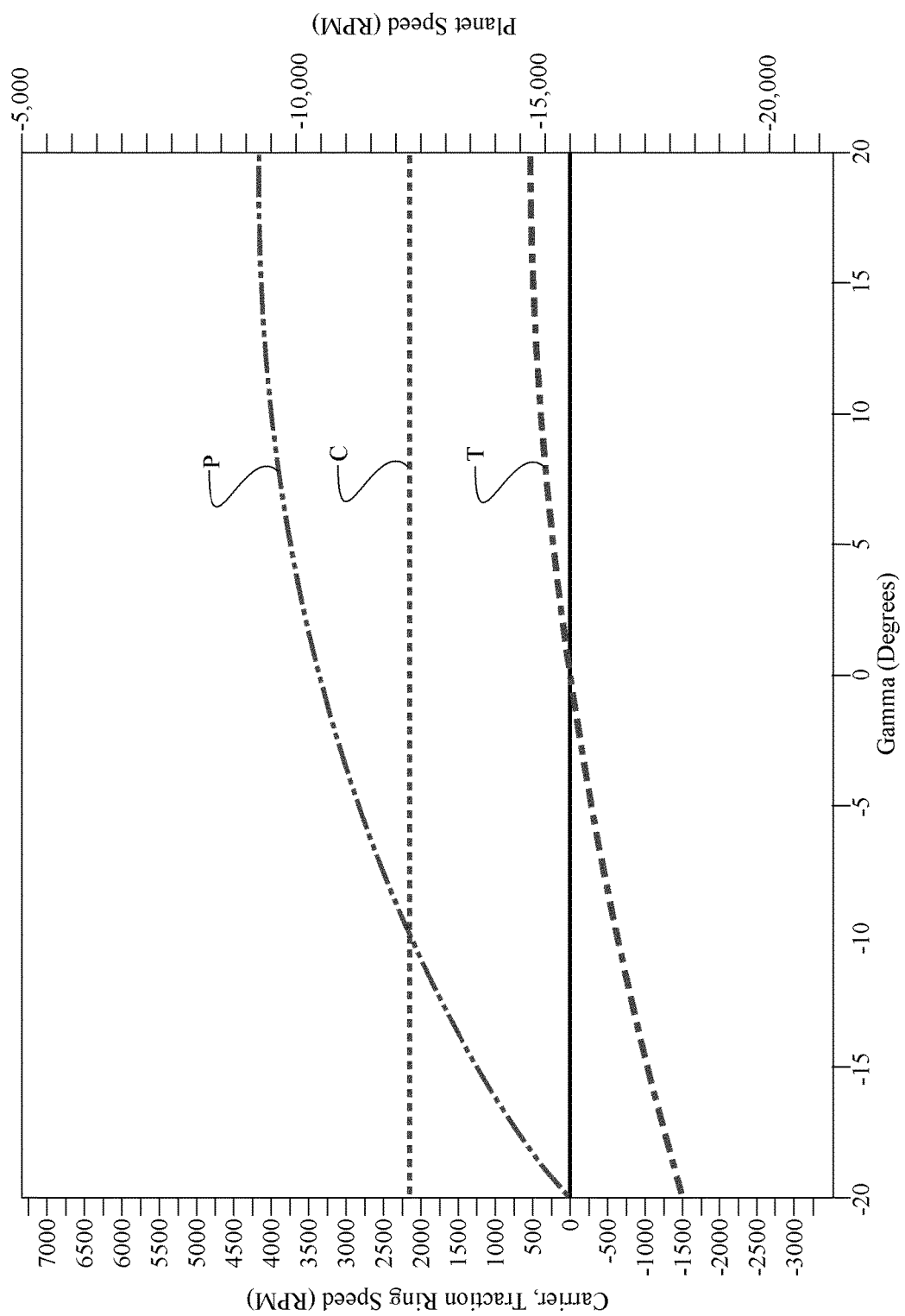
FIG. 16E is a graph showing speeds for certain components in one embodiment of the variator 310.
Figures 17C, 17D:
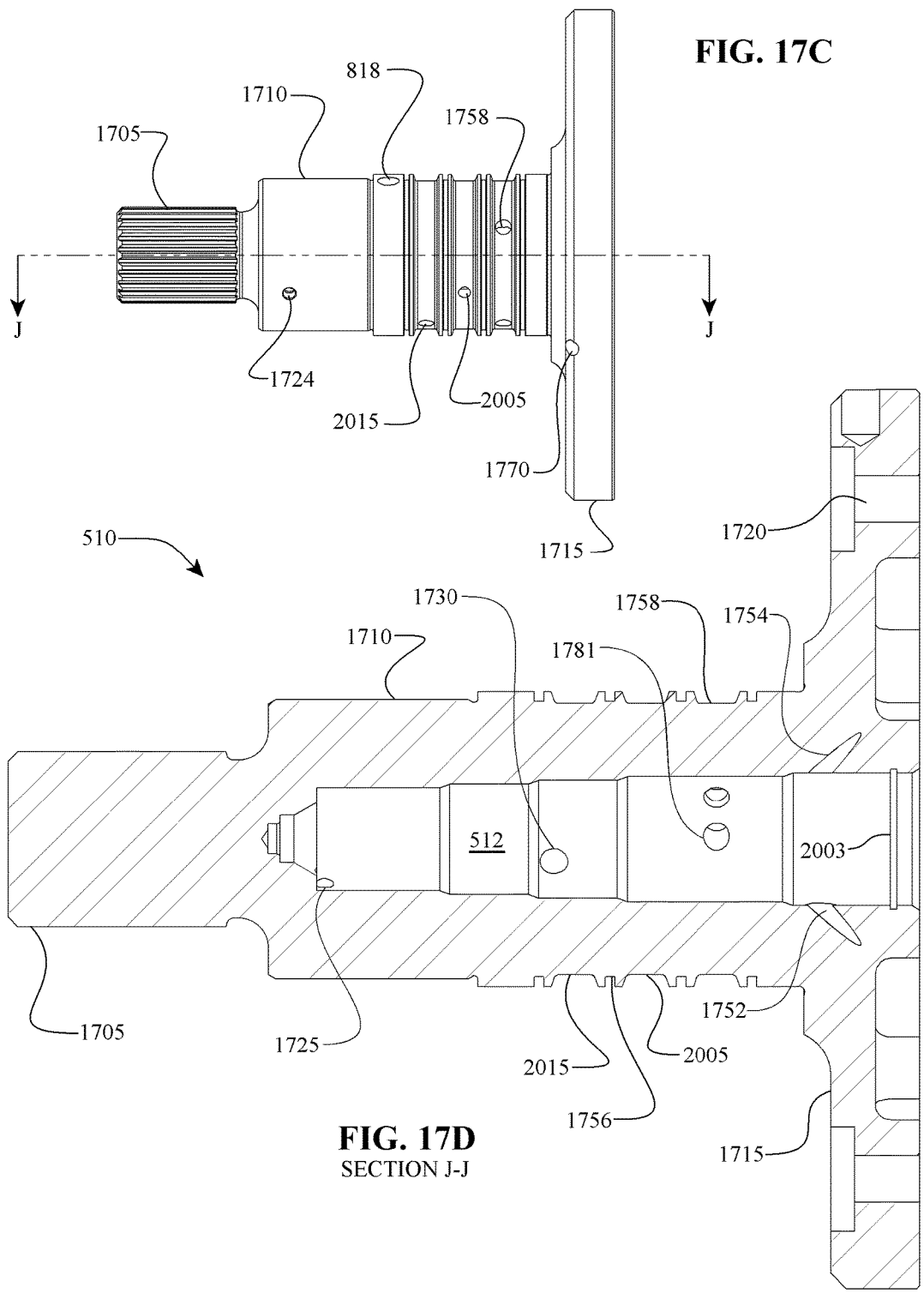
FIG. 17C is a top elevational view of the input shaft of FIG. 17A.
FIG. 17D is a cross-sectional view, along the line J-J, of the input shaft of FIG. 17C.
Figure 18H:
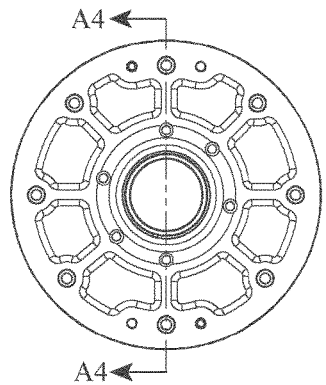
FIG. 18H is a front-side elevational view of the cover plate of FIG. 18F.
Figure 18G:
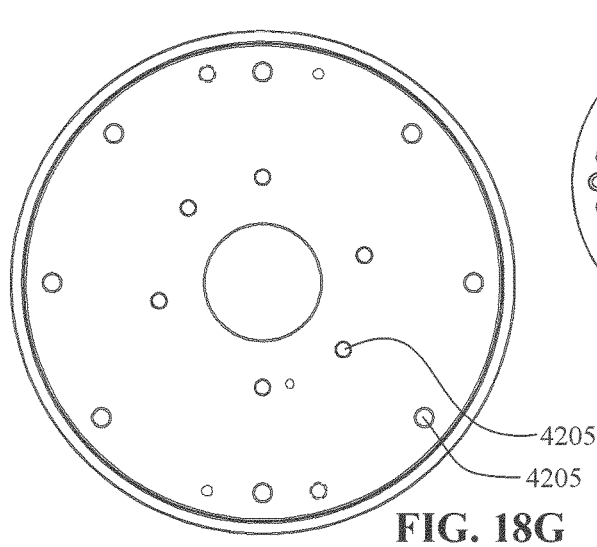
FIG. 18G is a back-side elevational view of the cover plate of FIG. 18F.
Figure 18F:
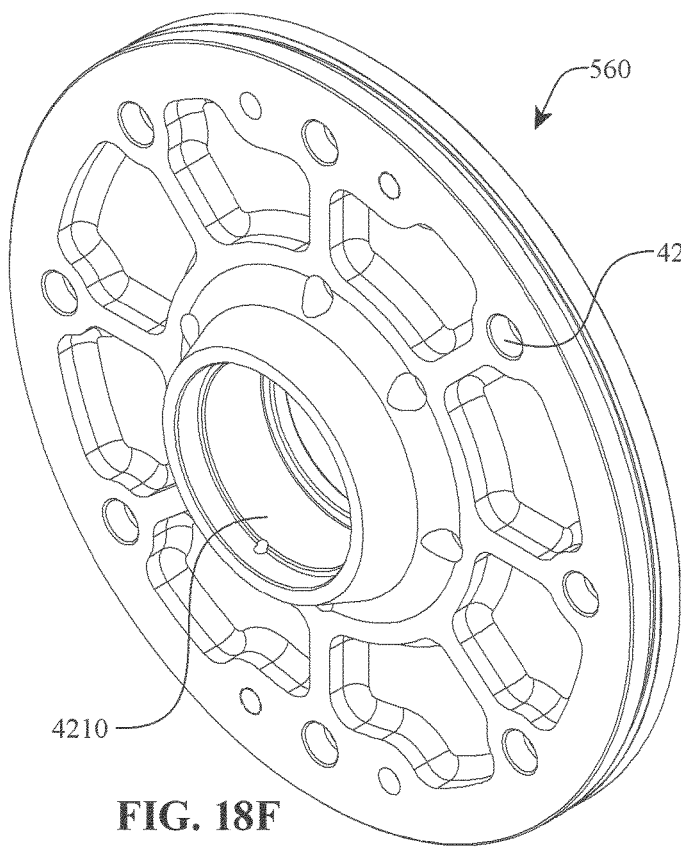
FIG. 18F is a perspective view of a cover plate that can be used with the variator of FIG. 5A.
Figure 18I:
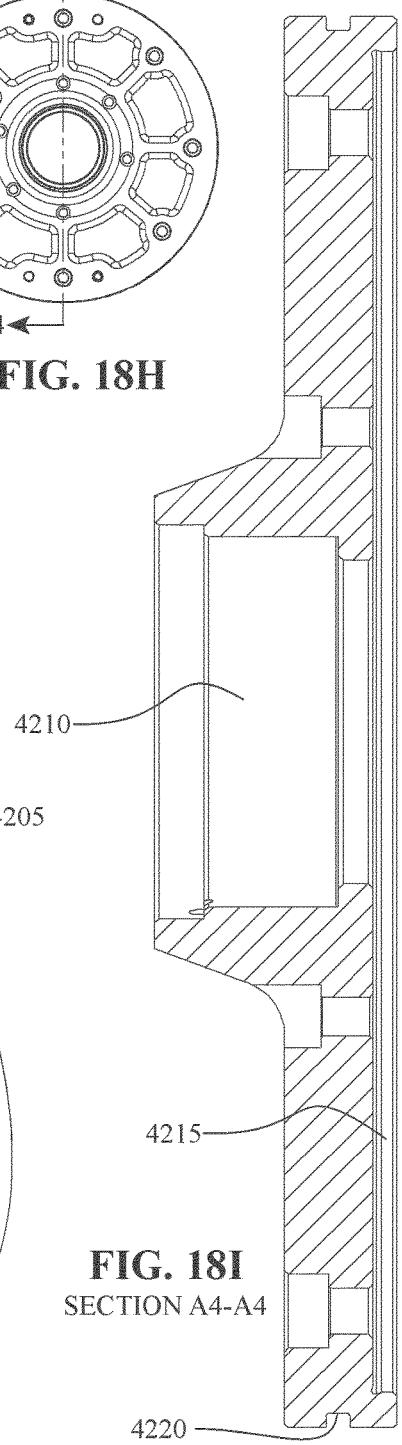
FIG. 18I is a cross-sectional view, along the line M-M, of the cover plate of FIG. 18H.

Referencing FIG. 16E additionally, the rotational speeds of certain components of one embodiment of a variator 310 are shown. The speed of the planets 522, the carrier 515, output traction rings 530, 533 are denoted respectively as P, C, and T. When the control pistons 582 are at their extreme position at the center of the chamber 580, the gamma angle 2395 is at its maximum positive value, and the speed P of the planets 522 is at its lowest counterclockwise value. At the maximum positive gamma angle 2395, the contact point is nearest to the poles, and the clockwise rotational speed T of the traction rings 530, 533 is at its maximum value. Conversely, when the control pistons 582A, 582B are at their extreme position furthest from the center of the chamber 580, the gamma angle 2395 is at its maximum negative value, and the speed P of the planets 522 is at its highest counterclockwise value. At the maximum negative gamma angle 2395, the contact point is nearest to the equators, and the counterclockwise rotational speed T of the traction rings 530, 533 is at its maximum value. When the gamma angle 2395 is equal to zero, the rotational and orbital speeds P of the planets 522 combine to produce a zero surface speed at the contact point. Hence, the speed T of the traction rings 530, 533 (and consequently the rotational speed of the drive flange 532) is also zero.

In this example, assuming an initial value of the gamma angle 2395 equal to zero, increasing pilot pressure at the valve 1605 causes the control pistons to move away from the center of the chamber 805A, which causes the pivot arms 552A, 552B to rotate about the planets 522 and thereby actuate the planet axles 554 in the direction of increasing negative gamma angle 2395. Consequently, the contact point moves toward the equators, the counterclockwise rotational speed of the planets 522 increases, and the counterclockwise speed of the traction rings 530, 533 increases. Hence, in this embodiment, since the speed of the drive flange 532 equals the speed of the traction rings 530, 533, increasing pilot pressure from the gamma angle 2395 equal to zero results in increasing the counterclockwise speed of the drive flange 532.

In reversing the process (that is, decreasing the pilot pressure when the gamma angle 2395 is equal to zero), the chamber 580B expands and the chamber 580A contracts. This causes the control pistons 582 and pivot pin hubs 805 to move toward the center of the chamber 580. Being actuated by the pivot pin hubs 805, the pivot arms 552A, 552B rotate about the planets 522 and thereby actuate the planet axles 554 in a direction of increasing positive gamma angle 2395. The contact point moves toward the poles, the counterclockwise speed of the planets 522 decreases, resulting in an increase in the clockwise speed of the traction rings 530, 533, which ultimately causes an increase in the clockwise speed of the drive flange 532. Hence, in this embodiment, decreasing pilot pressure at the valve 1605 results in increasing the clockwise speed of the drive flange 532.

The speed of the traction rings 530, 533, and consequently the speed of the drive flange 532, is a function of the surface speed of the planets 522 at the contact point. The planet axles 554 are operationally coupled to the control pistons 582 such that actuation of the control pistons 582 changes the angle gamma 2395, which results in changing the rotational speed of the planets 522. That is, the rotational speed of the planets 522 is a function of the angle gamma 2395. However, the surface speed is a function of both the rotational and orbital speeds of the planets 522. As the effect of the counterclockwise rotational speed of the planets 522 on the surface speed overcomes the effect of the clockwise orbital speed of the planets 522, or vice-versa, the direction of the speed of the traction rings 530, 533 reverses, which is in effect a reversal of the speed of the drive flange 532.

Because the surface speed of the planets 522 can vary smoothly over a certain speed range, the variator 310 provides continuously variable speed ratios. That is, certain embodiments of the variator 310 can be used to provide continuously variable transmissions. Additionally, since in certain embodiments the speed of the planets 522 is counterclockwise, and the speed of the carrier 515 is clockwise, the speed of the traction rings 530, 533 (and thereby the speed of the drive flange 532) can be varied from a certain value in a clockwise direction, reduced to zero, and increased to a certain value in a counterclockwise direction. Consequently, because certain embodiments of the variator 310 can have a zero-power state, said embodiments of the variator 310 can be infinitely variable units that can be, or can be implemented in, infinitely variable transmissions.

Referencing FIGS. 17A-17D now, one embodiment of the input shaft 510 is shown. The shaft 510 has a drive spline 1705 for coupling to a drive shaft, or other torque transmitting device, of a prime mover or power source. In one embodiment, the drive spline 1705 couples to a valve housing 1710 configured to receive and house a hydraulic control valve, such as valve 1605 for example. The valve housing 1710 couples to a manifold flange 1715 which, in the embodiment shown, is adapted to transmit torque to the carrier 515 and to allow passage of fluid into the channels 812, 814A, and 814B of the carrier 515. The manifold flange 1715 may be attached to the carrier 515 with bolts (not shown) disposed in bolt holes 1720. Drill holes 1724, 1726 facilitate fabrication of the channel 1725 (partially shown) that brings the pilot pressure fluid port 2005 into fluid communication with the chamber 2010 (see also FIG. 20). Drill holes 817, 1781 facilitate the making of the channels 814A for fluid communication between the valve 1605 and the chamber 580A, and drill holes 818, 819 facilitate the making of the channels 814B for fluid communication between the valve 1605 and the chambers 580B.

Recesses 1765 of the manifold flange 1715 are configured to, among other things, allow venting of hydraulic control fluid from the valve 1605 to the cavity of the variator housing 505. As explained above, during operation of the valve 1605, venting of hydraulic fluid from the chambers 580A or 580B is through the vent ports 1650 of the valve 1605. The vented fluid enters a cavity 1655 of the valve spool 1630 and flows toward the control spring 1635. The vented fluid then passes through channels 1752, 1754 (partially shown) of the input shaft 510 and enters the manifold flange 1715, traverses the recesses 1765, and exits the manifold flange 1715 via flange venting ports 1770. The vented fluid collects in the variator housing 505. An external pump (not shown) collects and recirculates the control fluid as line pressure to the manifold flange 1715.

In one embodiment, the valve housing 1710 has three fluid chambers bounded by seal grooves 1756. A first chamber includes a line pressure fluid port 2015 that communicates with a line pressure fluid channel 1730. A second chamber has a pilot pressure port 2005 that communicates with a pilot pressure fluid channel 1725. A third chamber has, among other things, several lubrication fluid ports 1758 that communication with lubrication fluid channels 1763. FIG. 20 shows additional details of the various fluid channels embedded in the valve housing 1710.

In one embodiment, the input shaft 510 has an overall length of about 7.5-8.0 inches, wherein the external length of the valve housing 1710 can be about 5-6 inches, and the length of the drive spline can be about 2-3 inches. In some embodiments, an outer diameter of the valve housing 1710 can be about 2-3 inches. In one embodiment, the manifold flange 1715 has an outer diameter of about 7-8 inches and a width of about 0.5-1.0 inches. For certain applications, the cavity 512 is formed of several sections varying in diameter from about 0.75 inches to about 1.25 inches; similarly, the lengths of the sections can vary from about 0.5 inches to about 2.0 inches. The various ports and channels formed in the input shaft 510 generally have a diameter of about 0.125 to 0.30 inches. In one embodiment, the input shaft 510 is made of, for example, SAE 8620 or SAE 1060 steel.

FIGS. 18A-18E depict one embodiment of a manifold 565 that can be used with the hydraulic system of FIGS. 16A-16D. The manifold 565 couples rigidly between the bell housing 531 and the cover plate 560. The manifold 565 functions in part as a manifold having a lubrication fluid port 1802 and lubrication fluid channels 1804. In one embodiment, the lubrication channels 1804 have four branches spaced angularly about 90 degrees apart relative to the center of the manifold 656. Drill holes 1880, which facilitate the forming of the lubrication channels 1804 in the body of the manifold 656, are suitably plugged during operation of the variator 310. The manifold 565 additionally includes a line pressure port 1806 and a pilot pressure port 1808 for delivery of hydraulic fluid to the hydraulic valve 1605. The ports 1806 and 1808 have associated hydraulic fluid channels 1810 and 1812, respectively. Drill holes 1882 and 1884, which are suitably plugged during operation of the variator 310, facilitate the forming of hydraulic fluid channels 1810 and 1812, respectively. In one embodiment, the line pressure channels 1810 have at least two branches.

In this embodiment, the manifold 565 has bolt holes 1814 to facilitate coupling of the manifold 565 to the cover 560. As illustrated in FIGS. 18A-18B, in this embodiment the manifold 565 has a portion of solid material in which the channels 1804, 1810, and 1812 are formed. The manifold 565 has a central bore 1818 for receiving and mounting to the input shaft 510. To reduce weight, in this embodiment material has been removed from the manifold 565 leaving recesses 1816.

In one embodiment, the outer diameter of the manifold 565 can be about 11.0-11.5 inches. For certain applications, the central bore 1818 has a diameter of about 2.0-3.0 inches, more preferably 2.25-2.75 inches, and most preferably about 2.5 inches. In the embodiment illustrated in FIGS. 18D-18E, the manifold 565 has a cross-sectional width of about 2.5 inches at its widest point. In some embodiments, the lubrication fluid port 1802, line pressure port 1806, and pilot pressure port 1808 have a diameter of about 0.7-0.9 inches. The diameter of the lubrication channels 1804, line pressure channels 1810, and pilot pressure channels 1812 can be about 0.2-0.3 inches.

FIGS. 18F-18I show one embodiment of a cover plate 560 having a number of bolt holes 4205 for coupling to the input manifold 565 and the bell housing 531. The cover plate 560 includes a central bore 4210 adapted for receiving a bearing element, such as a needle bearing (not shown). The cover plate 560 additionally has a counterbore 4215 configured to receive the input manifold flange 565. A groove 4220 is formed on the outer diameter of the cover plate 560 to receive a sealing element, such as an o-ring (not shown). In one embodiment, the cover plate 560 has an outer diameter of about 12 inches. The diameter of the counterbore 4215 can be about 11.2-11.5 inches. The central bore 4210 can have a diameter of about 3.0 inches.

A pivot pin hub 805 is illustrated in FIGS. 21A-21D. The pivot pin hub 805 is a generally cylindrical body having a central bore 2105 and several finger pairs 2110 located along the outer diameter of the cylindrical body. In the embodiment shown, each finger pair 2110 consists of two opposing fingers configured to receive the pivot pin block 810 (see FIG. 8). One end of the pivot pin hub 805 has a flat face 2115 with bolt holes 2120 for abutting against and facilitating the fastening of the pivot pin hub 805 to the control screw nut 825. The other end of the pivot pin hub 805 has flutes 2125 formed thereon for engaging tabs on a lock washer which rotationally couples the pivot pin hub 805 to the control piston 582. The bore 2105 is adapted to receive the control screw nut 825 and the control piston 582.

In one embodiment, the central bore 2105 can have a diameter of about 1.5-2 inches, wherein the diameter of the central bore 2105 is suitable selected to cooperate with the control screw nut 825 and/or the control piston 5832. In some embodiments, the finger pairs 2110 extend radially to a radius of about 1.5-2 inches from the center of the central bore 2105. For certain applications, the width of each finger in a finger pair 2110 is about 0.5-1.0 inches, and the spacing between the fingers of each finger pair 2110 is about 0.3-0.5 inches. In some embodiments, the pivot pin hub 805 is made of SAE 4140, or 4150, heat treated steel, for example.

As shown in the embodiment of FIGS. 22A-22C, a control piston 582 consists of a generally cylindrical body 2205 coupled to a flange 2210. A central bore 2215 passes through the cylindrical body 2205 and the flange 2210. On its outer periphery, the flange 2210 has a recess 2220 for receiving a seal (not shown). One end of the body 2205 is reduced in outer diameter and exhibits a groove 2225. The groove 2225 is configured to receive a lock washer tab (not shown) for rotationally locking the control piston 582 to the pivot pin hub 805. In one embodiment, the control piston 582 has an overall length of about 5 inches. The central bore 2215 can have a diameter of about 1.5 inches. The outer diameter of the control piston 582 at the outer periphery of the flange 2210 can be about 4.0-4.5 inches. The outer diameter at the surface of the cylindrical body 2205 can be about 2.0-2.5 inches, more preferably about 2.25 inches.

The disclosure this far has made several references to a lubrication system for the variator 310. To summarize in one place, in one embodiment, variator 310 can be provided with a lubrication system that includes a pump (not shown), the manifold 565, the input shaft 510, and the carrier 515. In some embodiments, the same type of fluid used for the control fluid is used for with the lubrication system. In one embodiment, the manifold 565 can be adapted to receive and distribute lubrication fluid, see FIGS. 18A-18E and accompanying text, for example. The input shaft 510 and the carrier 515 can be provided with ports and channels (for example ports 1758 and channels 812, shown in FIGS. 17B and 8C) to feed lubrication ports 885 and turrets 887 of the carrier 515. In this manner, lubrication fluid can be sprayed at or injected into the planet-pivot arm assemblies 579.

It has been observed that in certain embodiments of the variator 310, when the carrier 515 is configured to rotate about the longitudinal axis of the variator 310, the carrier 515 behaves as a centrifugal fluid pump and tends to circulate the lubrication fluid without the assistance of a separate lubrication fluid pump. It is theorized that this effect is due to an increase in pressure at the turrets 887, and other lubrication ports, from centrifugal force on the lubrication fluid. In an embodiment where a lubrication exit port is located at a larger radial diameter than the location of a lubrication inlet port, the pressure increase due to centrifugal forces is $P\_exit = P\_inlet + \rho * r * \omega^2$, where P_exit is the pressure at the exit port, P_inlet is the pressure at the inlet port, $\rho$ is the density of the fluid, r is the radial distance from the inlet port to the exit port, and $\omega$ is the rotation speed of the carrier 515. If the exit port is of a fixed orifice size and/or fluid restriction then an increase in P_exit will result in an increased flow through the exit port. The increased flow pulls more fluid through the system, and as long as the P_inlet is maintained constant, the system flow increases in some proportion to $\omega$. This centrifugal pumping action tends to circulate lubrication throughout the system without an external pump.

Figure 23C:
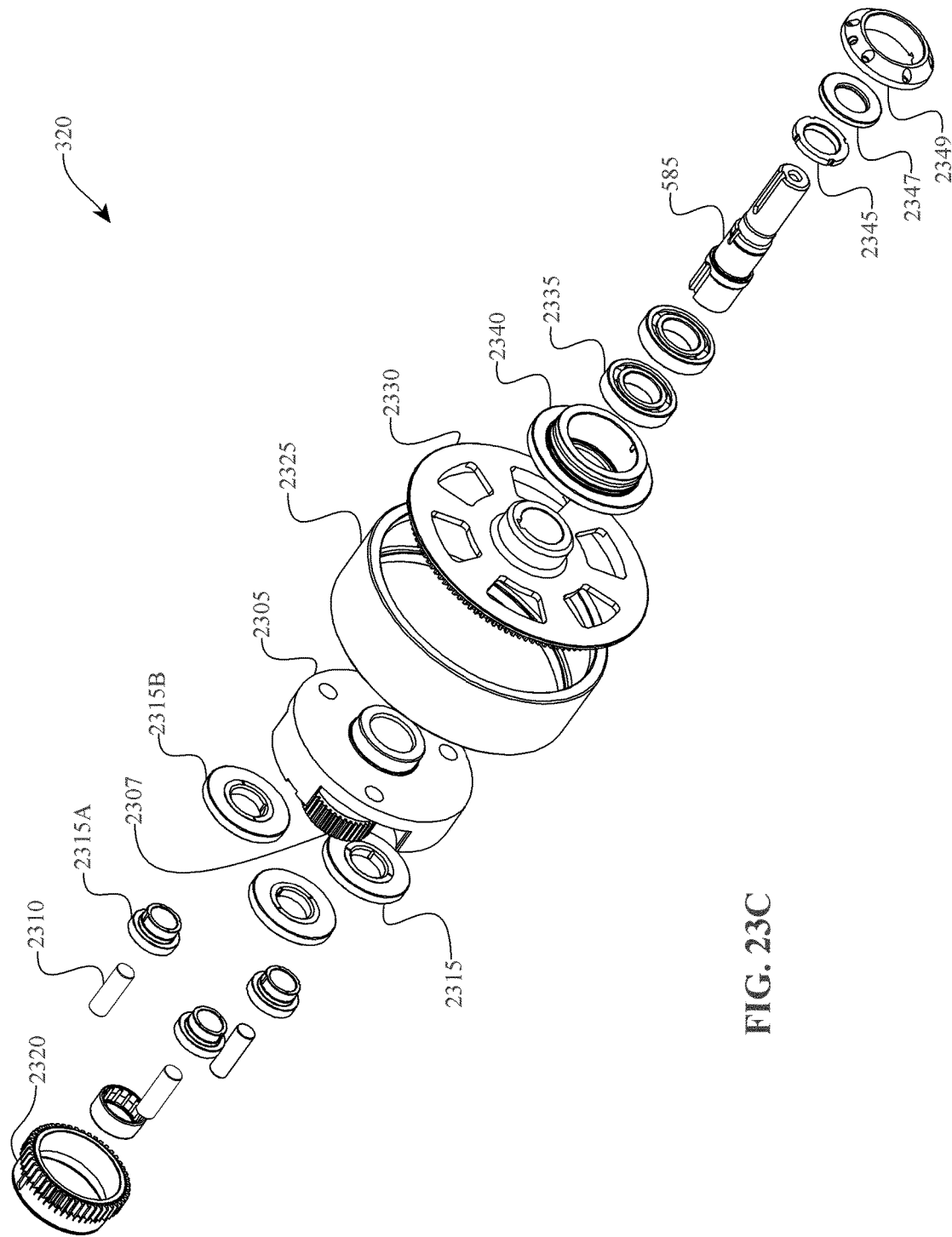
FIG. 23C is an exploded view of the gearset and shaft assembly of FIG. 23A.

In one embodiment, the output from the drive flange 532 and the carrier spline shaft 844 are summed by the gearset 320, which can include a compound planetary gearset. FIGS. 23A-23C depict one embodiment of a gearset 320 that can be coupled to the continuous variator 310. Generally, the gearset 320 can include a planetary gearset having a planet carrier 2305, planet shafts 2310, planet gears 2315, sun gear 2320, and a ring gear 2325. Certain common components typically found in planetary gearsets, such as bearings, washers, etc., are not shown. The sun gear 2320 operationally couples through a set of planet gears 2315 to a ring gear 2325. In the embodiment illustrated, the gearset 320 includes a driven plate 2330 that couples to the ring gear 2325. In certain embodiments, the driven plate 2330 couples to and transfers torque to an output shaft 585. To support the shaft 585 in the housing 590 (see FIG. 5A), bearings 2335 mount coaxially about the shaft 585 and are piloted by a bearing sleeve 2340 adapted to interface with the housing 590. To complete the enclosure, a bearing nut 2345, a seal 2347, and a seal cap 2349 can be provided.

In some embodiments, as in the embodiment shown in FIG. 5A for example, the traction ring 525B is operationally coupled via a torque reaction ring 525C to a grounded planet carrier 2305. In said embodiments, the planet carrier 2305 bolts to the variator housing 505, runs through the center of the drive flange 532, and reacts axial force at the torque reaction ring 525C without a cam or thrust bearing. In one embodiment, the drive flange 532 couples to the sun gear 2320. In this embodiment, there are fixed members that react axial force, and the drive flange 532 is configured to deliver output torque past the fixed members. The rotationally fixed planet carrier 2305 facilitates that task. The sun gear 2320 of the planetary gearset 320 mounts rigidly to the drive flange 532 via an interference fit, for example. While the sun gear 2320 and drive flange 32 are shown here as two separate parts, the sun gear 2320 and drive flange 532 can be a single part.

In one embodiment, the planet carrier 2305 is coupled to a splined extension 2307 that can have a spline pitch diameter of about 3.0-3.5 inches. As show in the embodiment of FIG. 23C, the splined extension 2307 can be integral with the planet carrier 2305. In some embodiments, the shaft diameter on the planet carrier 2305 for supporting the planet shafts 2310 is about 6.5-7.0 inches, and more preferably about 6.75 inches. The planet carrier 2305 can be made of, for example, 4140 heat treated steel.

Figure 23D:
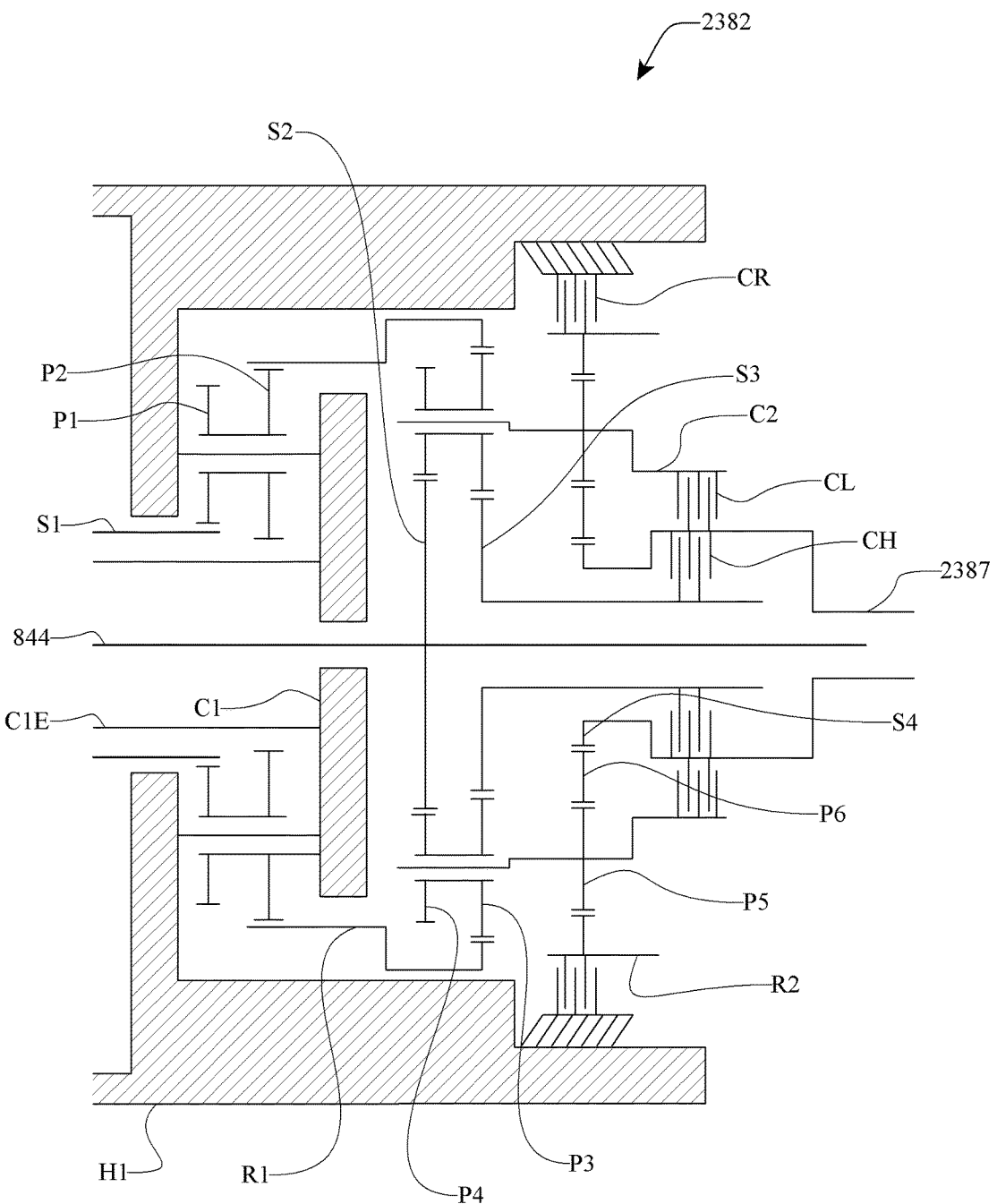
FIG. 23D is a schematic diagram of a gearset or range box that can be used with the variator of FIG. 5A.

Referring to FIG. 23D now, one embodiment of a gearbox 2382 that can be coupled to the variator 310 can include multiple planetary gearsets for providing a continuously or infinitely variable transmission having multiple ranges or modes. In the embodiment illustrated, the gearbox 2382 includes a sun gear S1 that can be coupled to the drive flange 532. The sun gear S1 couples to a coupled set of planet gears P1, P2 that are supported by a carrier C1, which is grounded to a housing H1. In one embodiment, an extension C1E of the carrier C1 is coupled to the reaction ring 525C (see FIG. 5A). The planet gear P2 couples to a ring gear R1. Hence, because the drive flange 532 drives the sun gear S1, which in turn drives P2 through P1, the ring gear R1 serves as a power input element from the variator 310.

The ring gear R1 is adapted to couple to a coupled set of planet gears P3, P4. A carrier C2 supports the planet gears P3, P4. The planet gear P4 couples to a sun gear S2, and the planet gear P3 couples to a sun gear S3. The shaft 844 (see FIG. 5A), or an extension thereof, can be coupled to the sun gear S2. The carrier C2 additionally supports planet gears P5 and P6. The planet gear P6 couples to a shaft 2387, which can provide a summed output derived from the input of the drive flange 532 and the input of the shaft 844. The carrier C2 also supports the planet gears P5 and P6, which couple to a ring gear R2.

Two clutches, a low range clutch CL and a high range clutch CH, selectively couple elements of the gearbox 2382 to the shaft 2387. The low range clutch CL is engageable to couple the carrier C2 to the shaft 2387 for a low speed forward range. The high range clutch CH is engageable to couple the sun gear S3 to the shaft 2387 for a high speed forward range. A reverse clutch CR, for providing a reverse mode, is engageable to couple the carrier C2 to the shaft 2387 via a sun gear S4 that couples to the ring gear R2 via the planet gears P5 and P6. Thus, in one embodiment, the variator 310 can be coupled to a gearbox 2382 to provide continuous speed variation at low and high speed ranges (two forward modes, two forward clutches), as well as a reverse mode.

Figure 23E:
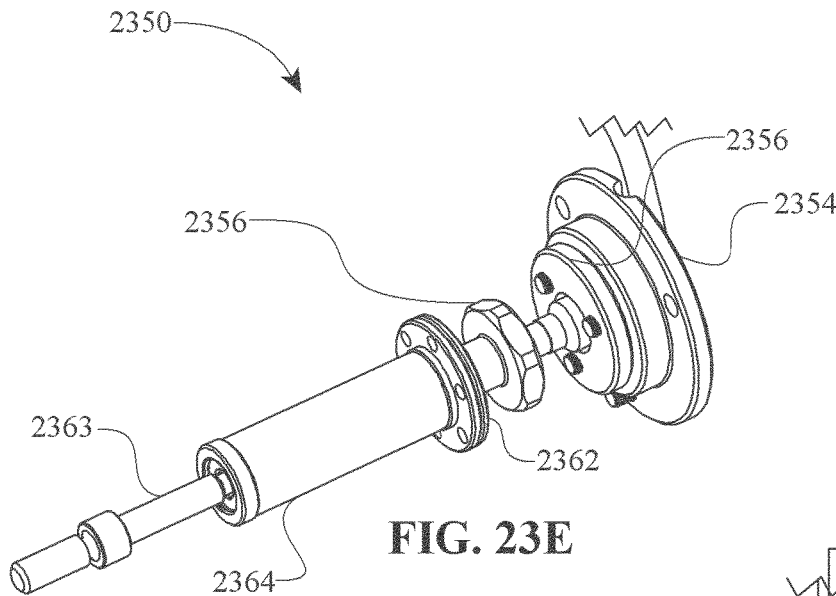
FIG. 23E is a perspective view of an assembly for measuring a tilt angle gamma of the planet axles of the variator of FIG. 5A.
Figure 23F:
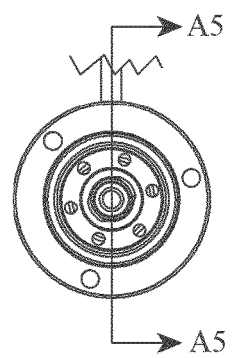
FIG. 23F is an elevational view the assembly of FIG. 23E.
Figure 23G:
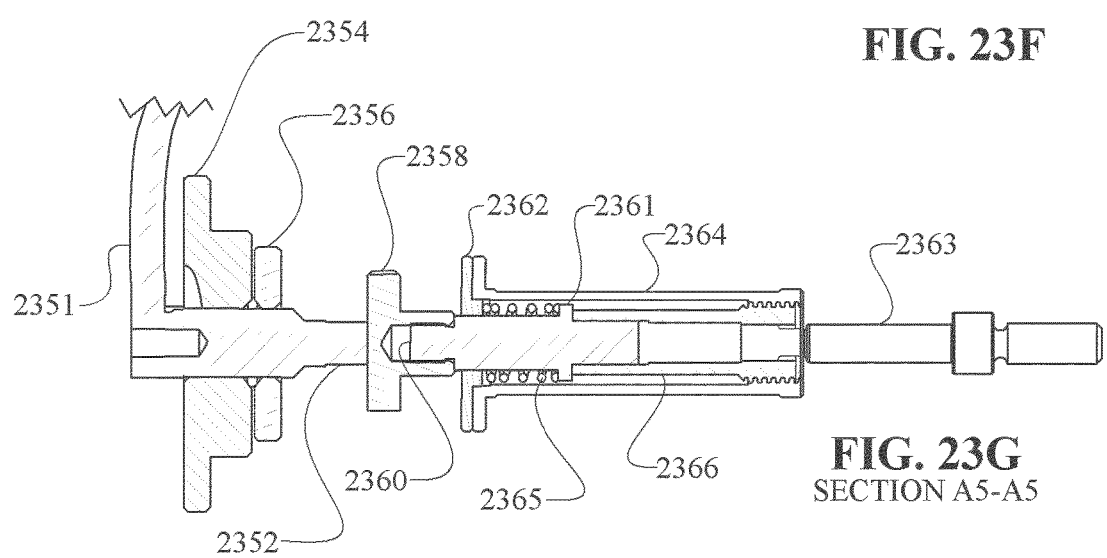
FIG. 23G is cross-sectional view, along the line A5-A5, of the assembly of FIG. 23F.

FIGS. 23D to 23F show a gamma angle test assembly 2350 ("gamma tester 2350") that can be used to provide an indication of the value of the gamma angle 2395 during testing or routine operation of the variator 310. The gamma tester 2350 measures the relative rotation of the control screw 820B with reference to the carrier 515. Since the rotation of the control screw 820 is kinematically coupled to the tilting of the planet axles 554, an indication of the amount of rotation of the control screw 820 provides a direct indication of the value of the gamma angle 2395. In the embodiment shown, the gamma tester 2350 includes a proximity probe 2352 supported by a mounting plate 2354, which is configured for coupling to, for example, the planet carrier 2305. A locking plate 2356 butts up against and is fastened to the mounting plate 2354. In some embodiments, the proximity probe 2352 could be a hall effect sensor, eddy current sensor, a non-contacting proximity sensor, or a contacting linear variable displacement transducer (LVDT). The proximity probe 2352 is placed at a suitable distance from a gamma sensor cap 2358, which covers one end of a gamma screw link 2360. In certain embodiments, a cable 2351 is coupled to the proximity probe 2352 for transmitting signals from proximity probe 2352 to a suitable signal receiver (not shown).

A gamma insert 2364 is generally a cylindrical tube that butts up against a gamma end cap 2362 on one end, and has threads on the other end for threading to a gamma screw 2366. In some embodiments, the gamma insert 2364 is fixed to the carrier 515. The bore of the gamma insert 2364 houses the gamma screw link 2360 and the gamma screw 2366, which threads inside the gamma insert 2364. A spring 2365, housed in the gamma insert 2364, is positioned coaxially about the gamma screw link 2360 and butting up against the gamma end cap 2362. A gamma hex link 2363 rigidly mounts to the control screw 820B and couples to the gamma screw 2366.

During operation, rotation of the control screw 820B causes the gamma screw 2366 to rotate and, thereby, move axially in the threads of the gamma insert 2364. As the gamma screw 2366 moves axially, the gamma screw 2366 drives the gamma screw link 2360, which has a flange 2361 that reacts against the gamma spring 2365. The spring 2365 provides preload to prevent backlash and to keep the gamma screw link 2360 against the gamma screw 2366. In one embodiment, the gamma end cap 2358 moves axially about 150 thousandths of an inch for a full range of shifting the planets 522 (for example, +/−30 degrees). The amount of displacement of the end cap 2358 is based on the lead of the gamma screw 2366 and other space considerations. A higher resolution can be achieved by providing for greater axial movement of the gamma end cap 2358 for a given range of the gamma angle 2395.

Figure 24A:
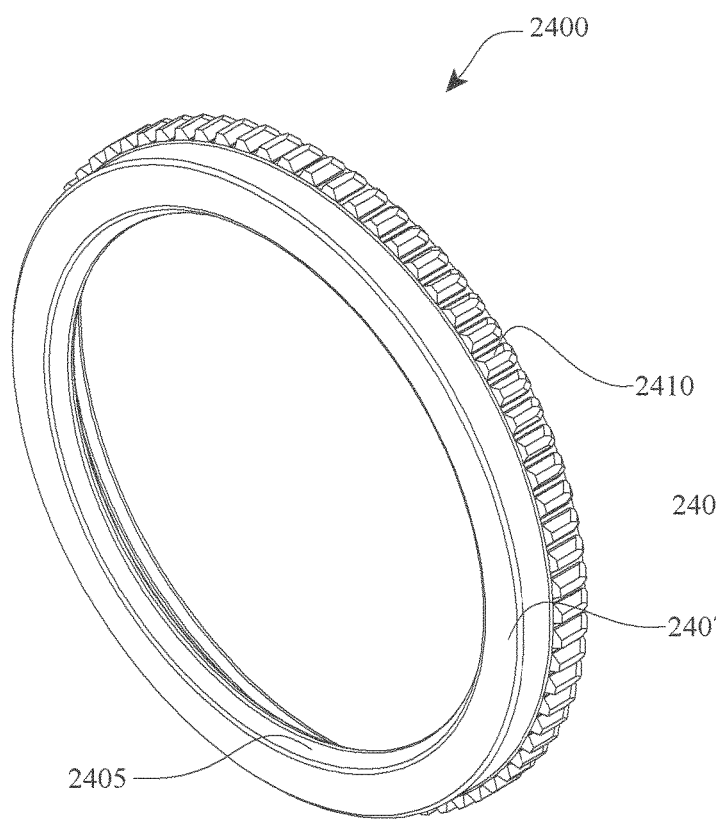
FIG. 24A is a perspective view of a traction ring that can be used with the variator of FIG. 5A.
Figure 24B:
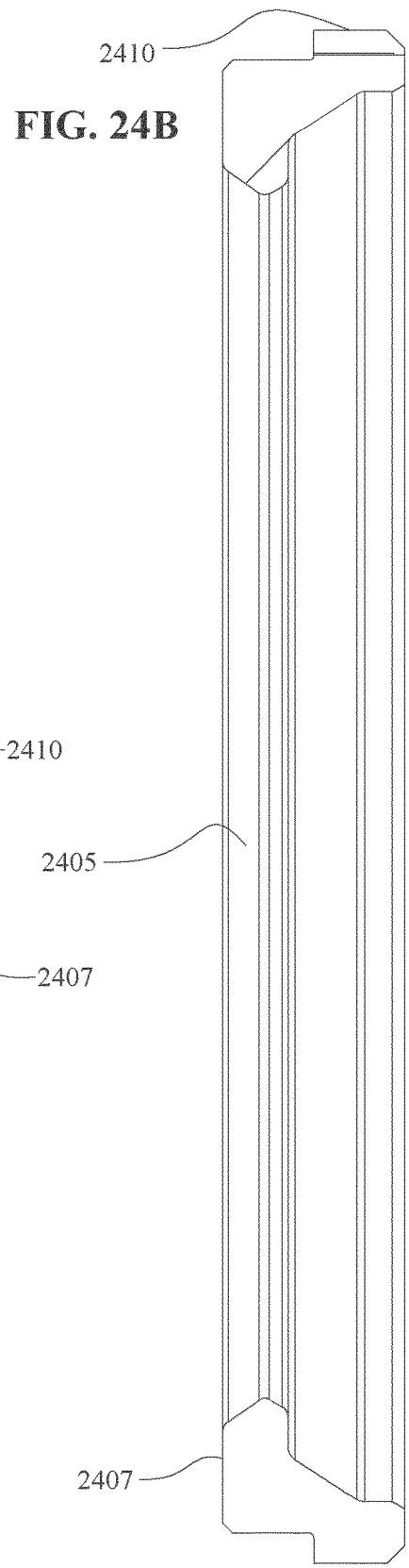
FIG. 24B is a cross-sectional view of the traction ring of FIG. 24A.

An embodiment of a traction ring 2400 is shown in FIGS. 24A-24B. The traction ring 2400 can be used as any of the traction rings 525A, 525B, 530, or 533. The traction ring 2400 is a generally annular ring having a traction surface 2405. The traction surface 2405 is preferably adapted for facilitating torque transfer via an elastohydrodynamic fluid layer entrained between the traction surface 2405 and a surface point of a planet 522. In the embodiment shown, the traction ring 2400 additionally has a set of splines 2410 on its outer diameter. In other embodiments, however, the traction ring 2400 may be adapted to couple to, for example, the drive flange 532 via a key.

In certain applications, the traction ring 2400 has an outer diameter that is approximately 12 to 13 inches, and an inner diameter that is between 9.5 and 10.5 inches. The thickness of the traction ring 2400 can be 1.0-1.5 inches. The traction surface 2405 can be angled, with respect to a straight face 2407 of the traction ring 2400, by about 10 to 70 degrees, preferably between 20 and 60 degrees, more preferably between 30 and 50 degrees, and most preferably about 35-45 degrees. In one embodiment, the traction ring 2400 is made of SAE 8630H or SAE 8640 steel, which can be case carburized and/or heat treated. Preferably, the traction surface 2405 has substantially no inclusions.

FIGS. 25A-25D show one embodiment of a drive flange 532 that can be used to transfer torque out of the variator 310. The drive flange 532 consists of an annular, cylindrical body 2505 having internal splines 2510 on one of its ends, and having a cap 2515 on its other end. The cap 2515 is generally a circular plate having a central bore 2520 adapted to couple to a shaft, gear, or other torque transfer element, such as the sun gear 2320 of the gearset 320. As shown, in some embodiments, the cylindrical body 2505 and the cap 2515 may be one integral part, rather than two separate parts coupled together. The drive flange 532 has a large torque capacity because of its large radius. Additionally, in some embodiments the drive flange 532 may have cutouts 2525 to reduce its weight. For speed pick-up, the drive flange 532 may additionally include perforations or orifices 2530.

In one embodiment, the outer diameter of the drive flange 532 is about 14-14.5 inches. In some embodiments, the pitch diameter of the splines 2510 is approximately 13-13.5 inches. For certain applications, the overall length of the drive flange 532 can be about 13 inches. The central bore 2520 can have a diameter of about 4-5 inches, wherein for some embodiments, the central bore 2520 is preferably adapted for suitably coupling the drive flange 532 to the sun gear 230 of the planetary gearset 320.

Figure 26B:
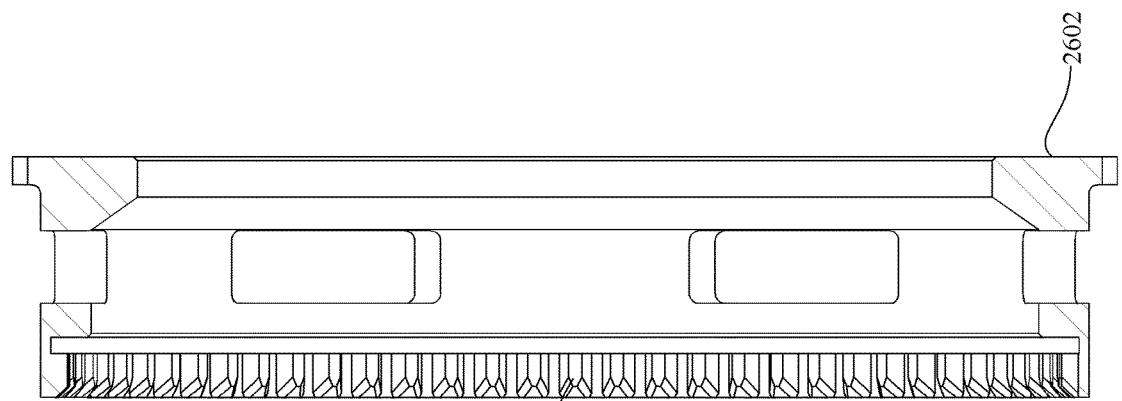
FIG. 26B is a cross-sectional view of the reaction flange FIG. 26A.
Figure 26A:
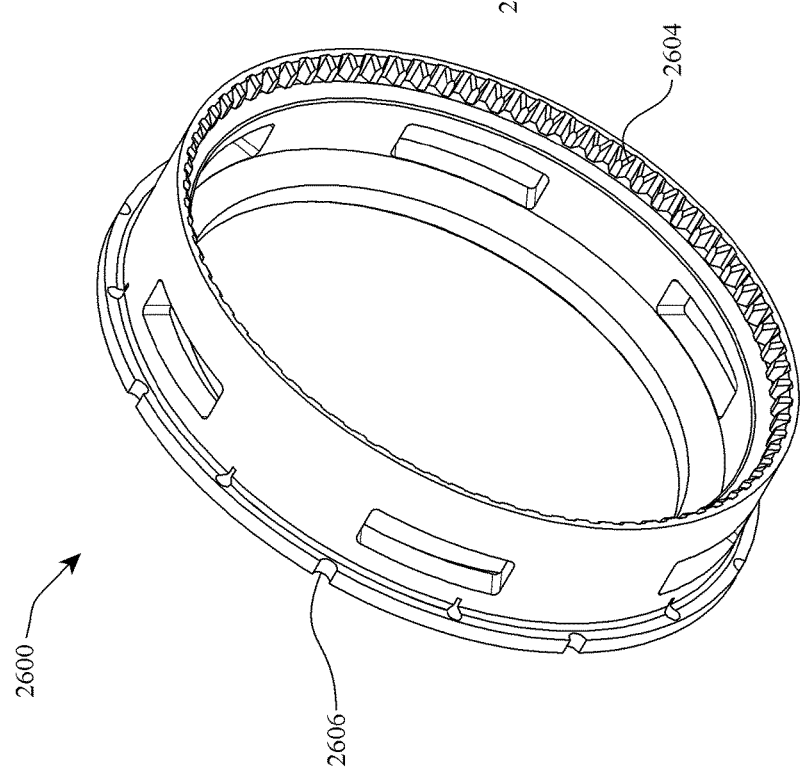
FIG. 26A is a perspective view of a reaction flange that can be used with the variator of FIG. 5A.

FIGS. 26A-26B show a reaction flange 2600 that can be used in some embodiments of the variator 310 to take the place of the cam flange 705, the roller retainer 710, and the cam base 715. In one embodiment, the reaction flange 2600 includes a surface 2602 that reacts axial force against the cam load piston 720. An internal spline 2604 of the reaction flange 2600 is suitably adapted to mate with corresponding splines of the traction ring 525A, for example. A group of recesses 2606 facilitates the use of dowels (not shown) to prevent rotation of the reaction flange 2600. Hence, the reaction flange 2600 is adapted to provide both reaction of axial forces and anti-rotation of the traction ring 525A.

In one embodiment, the reaction flange 2600 can have an outer diameter of about 13.5-14 inches. The pitch diameter of the internal spline 2604 can be about 12.5 inches. In some embodiments, the reaction flange 2600 can have a width of about 2.5-3.0 inches and a central bore with a diameter of about 10.5-11 inches. In one embodiment, the reaction flange 2600 can be made of 4140 heat treated steel, for example.

Figure 27B:
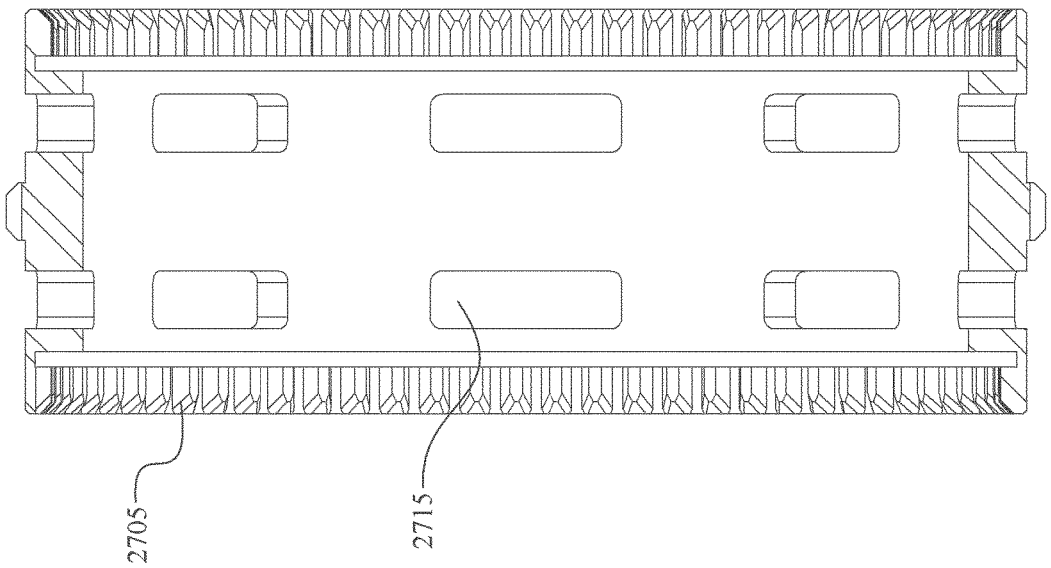
FIG. 27B is a cross-sectional view of the torque transfer assembly of FIG. 27A.
Figure 27A:
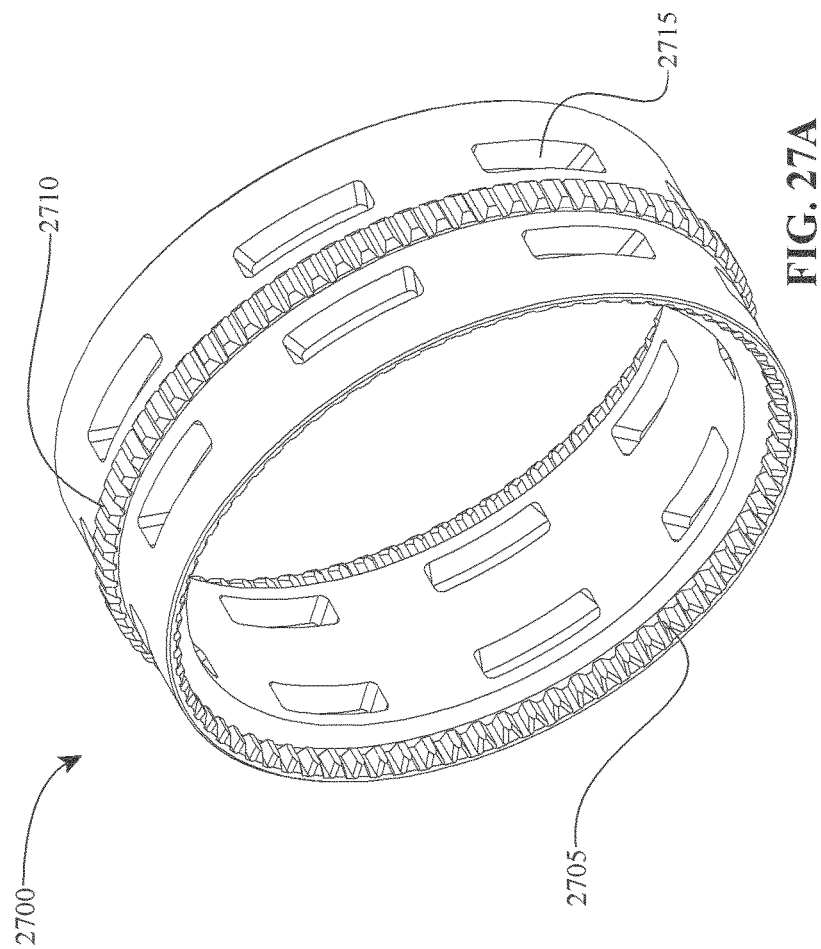
FIG. 27A is a perspective view of a torque transfer assembly that can be used with the variator of FIG. 5A.

FIGS. 27A-27B illustrate a torque transfer coupling 2700 that can be used with the variator 310 as an alternative to the center cam assembly 570. The coupling 2700 is generally an annular cylinder having internal splines 2705 near its ends. The coupling 2700 additionally has a set of external splines 2710 on its outer diameter in the vicinity of its middle section. The internal splines 2705 are adapted to engage the traction rings 533 and 530 of the variator 310. The external splines 2170 are configured to engage the drive flange 532. In the embodiment illustrated, the coupling 2700 may have one or more cutouts 2715 to reduce weight and to facilitate lubricant flow in the variator 310. In one embodiment, the external splines 2710 have a pitch diameter of about 13.-13.5 inches, and the internal splines 2705 have a diameter of about 12.5-13 inches. For certain applications, the width of the torque transfer coupling 2700 can be about 5-6 inches. In some embodiments, the torque transfer coupling can be made of 4140 heat treated steel.

A reaction flange 2800 is shown in FIGS. 28A-28B. The flange 2800 in this embodiment functions as, among other things, an anti-rotating, torque reaction element that prevents the traction ring 525B from rotating about the longitudinal axis of the variator 310. In the embodiment shown, the flange 2800 has a circular body 2805 with a set of internal splines 2810 at one end and a cover 2815 at the other end. The cover 2815 has a central bore 2820, which has a set of splines 2825. The splines 2810 are adapted to couple to a corresponding set of gear splines 2410 of the traction ring 525B. The splines 2825 engage a corresponding set of splines 2307 of the planet carrier 2305, which is in some embodiments rigidly attached to the variator housing 505. Material cutouts 2830 are provided to reduce the weight of the flange 2800, as well as to facilitate lubricant movement throughout the variator 310. In some embodiments, the reaction flange 2800 is provided with a number of lubrication channels (not shown) formed in the body 2805. In one embodiment, the reaction flange 2800 has an outer diameter of about 13 inches. In some embodiments, the pitch diameter of the splines 2810 is about 12.5, while the pitch diameter of the splines 2825 is about 3-3.5 inches. In one embodiment, the overall width of the reaction flange 2800 is about 4 inches. For certain applications, the reaction flange 2800 can be made of, for example, 4140 heat treated steel.

Figure 29A:
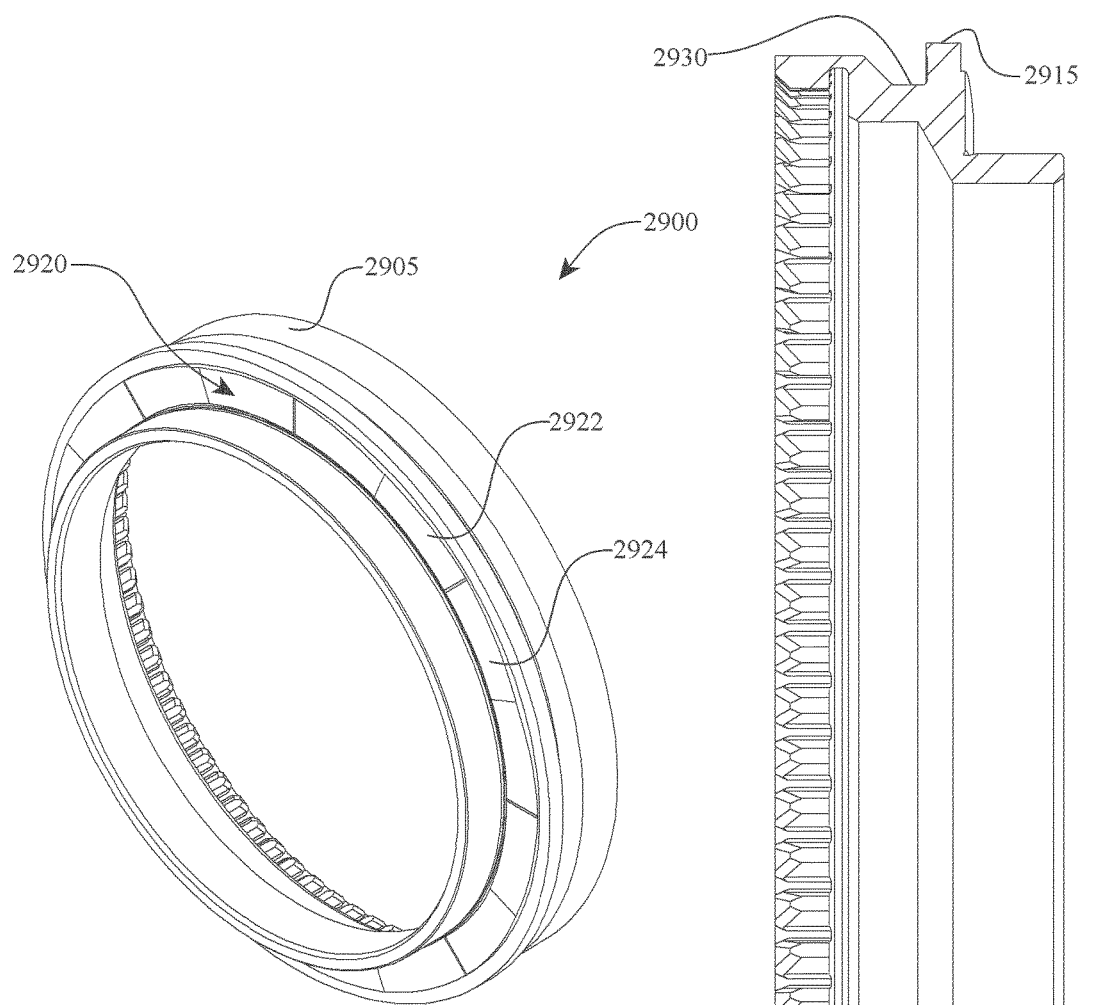
FIG. 29A is a perspective view of a cam flange that can be used with the variator shown in FIG. 5A.
Figure 29B:
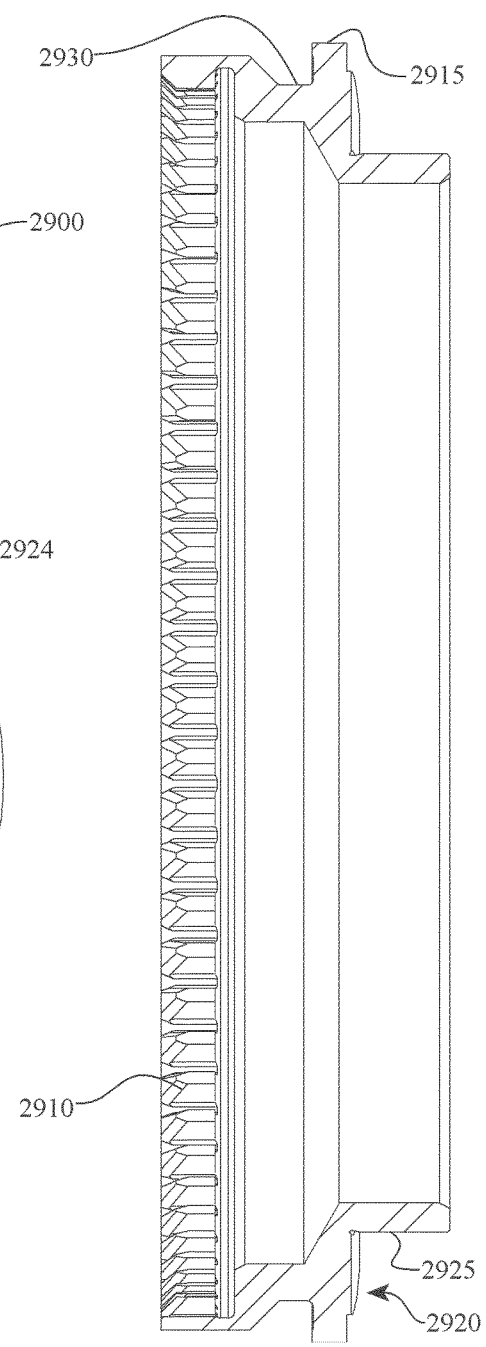
FIG. 29B is a cross-sectional view of the cam flange of FIG. 29B.

One embodiment of an input cam flange 2900 is shown in FIGS. 29A-29B. The input cam flange 2900 consists of a generally cylindrical and tubular body 2905 having a set of internal splines 2910. In some embodiments, the input cam flange 2900 has a flange 2915 that exhibits a group of cam ramps 2920. A neck 2925 of the input cam flange 2900 is configured to receive a rolling element retainer 710 and a cam base 715 (see FIG. 7A). Between the flange 2915 and the internal splines 2910, the input cam flange 2900 has a recessed portion 2930 adapted to react the unloader piston 725 (see FIG. 7A), which is configured to press against the flange feature 2915 on the side opposite to the cam ramps 2920.

In one embodiment, the diameter of the input cam flange 2900 at the flange 2915 is about 12.5-13.5 inches. The diameter of the internal splines 2910 can be about 11.5-12.5 inches. The outer diameter of the neck 2925 can be about 10.8-11.2 inches, and the inner diameter of the neck 2925 can be about 10.1-10.7 inches. The ramps 2920 can be a set of eight ramps 2922, 2924 arranged in an angular pattern about the center of the input cam flange 2900. In one embodiment, the ramps 2920 are suitably arranged and made to cooperate with the ramps 3002, 3003 of the cam base 710 (see FIGS. 30A-30D). For some applications, the ramps 2922, 2924 have a width of about 1.25-2.0 inches. In one embodiment, the lead of the ramps 2922, 2924 is about 1.1-1.5 inches, preferably 1.2-1.4 inches, and more preferably about 1.3 inches. The ramp 2922 has a counterclockwise helical ramp surface, while the ramp 2924 has a clockwise helical ramp surface. In one embodiment, the input cam flange 2900 can be made of metallic material such as, for example, 1065 steel. Preferably, the ramp surfaces of the ramps 2920 are flame or induction hardened to 58-62 HRC at about a 0.03 inches minimum effective case depth.

An embodiment of a cam base 710 is illustrated in FIGS. 30A-30D. The cam base 710 is generally an annular ring having a set of cam ramps 3005 on one of its sides. On the outer rim of the cam base 710 there are several recess 3010 adapted to receive torque reaction dowel pins (not shown), which react the torque in the cam base 710 to the variator housing 505 and keep the cam base 710 from rotating. The cam base 710 additionally has a group of bolt holes 3015 for coupling the cam base 710 to the bell housing 531 during assembly. Once the variator 310 is assembled, the cam base 710 is released from the bell housing 531 by removing the bolts. This allows the cam load piston 720 to actuate the cam base 710 in an axial direction. The bolt holes 3015 are then plugged with pipe plugs (not shown). On the side opposite to the cam ramps 3005, the cam base 710 exhibits a flat face 3020 that is adapted to butt up against the bell housing 531 and to engage a cam load piston 720 (see FIG. 7A).

In one embodiment, the cam base 710 has an outer diameter of about 13.7 inches, an inner diameter of about 11.0 inches, and a thickness of about 0.5-0.6 inches. Referencing FIG. 30B in particular, in embodiment the cam base 710 includes eight sets of ramps 3002, 3003 arranged in an angular pattern about the center of the cam base 710. The ramps 3002, 3003 have a width of about 1.25-2.0 inches. In one embodiment, the lead of the ramps 3002, 3003 is about 1.1-1.5 inches, preferably 1.2-1.4 inches, and more preferably about 1.3 inches. The ramp 3002 has a counterclockwise helical ramp surface, while the ramp 3003 has a clockwise helical ramp surface. In one embodiment, the cam base 710 can be made of metallic material such as, for example, 1065 steel. Preferably, the ramp surfaces of the ramps 3005 are flame or induction hardened to 58-62 HRC at about a 0.03 inches minimum effective case depth.

Figures 31A, 31B:
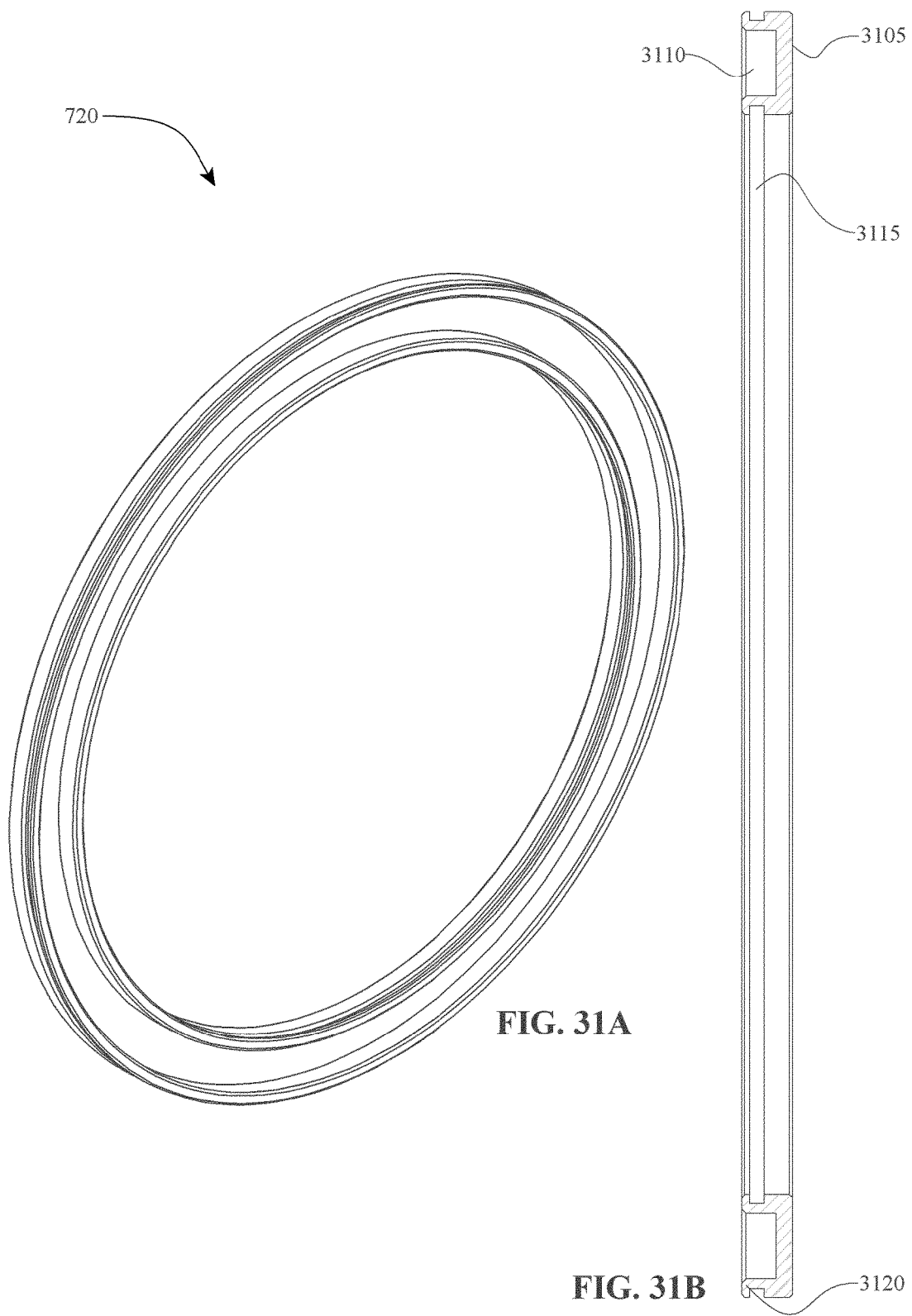
FIG. 31A is a perspective view of a cam load piston that can be used with the variator of FIG. 5A.
FIG. 31B is a cross-sectional view of the cam load piston of FIG. 31B.

FIGS. 31A-31B show an embodiment of a cam load piston 720, which is generally an annular flange having a flat face 3105 and a recessed portion 3110 on the opposite side of the flat face 3105. The recessed portion 3110 is configured to receive a group of compression springs 735 (see FIG. 7A). In the embodiment shown, the cam load piston 720 includes sealing ring grooves 3115 and 3120. The cam load piston 720 is adapted to fit in a recess 4104 of the bell housing 531, as shown in FIG. 7A.

In some embodiments, the cam load piston 720 can be configured to act as a sensor of axial force on the traction ring 525A through pressurization of the cam load piston 720 and sealing the fluid volume so that the bore 735 of the bell housing 531 becomes a zero leakage fluid reservoir. As the axial force on the load cam piston 720 increases the pressure on the piston cavity increases proportionally.

One embodiment of an unloader piston 725 is shown in FIGS. 32A-32C. The unloader piston 725 is generally an annular flange having a rim 3205 adapted to engage the input cam flange 2900. The unloader piston 725 additionally includes a second rim 3210, opposite the first rim 3205, configured to engage an unloader cylinder 730 (see FIG. 7A). As shown in FIG. 32D, the unloader piston 725 can be provided with seal grooves 3215 and 3220 to receive sealing rings (not shown). FIGS. 33A-33B depict one embodiment of an unloader cylinder 730, which is generally an annular, cylindrical body having a recess 3305 adapted to receive the rim 3210 of the unloader piston 725. A port 3310 of the unloader cylinder 730 can be provided to receive hydraulic fluid into the recess 3305.

Figures 34A, 34B:
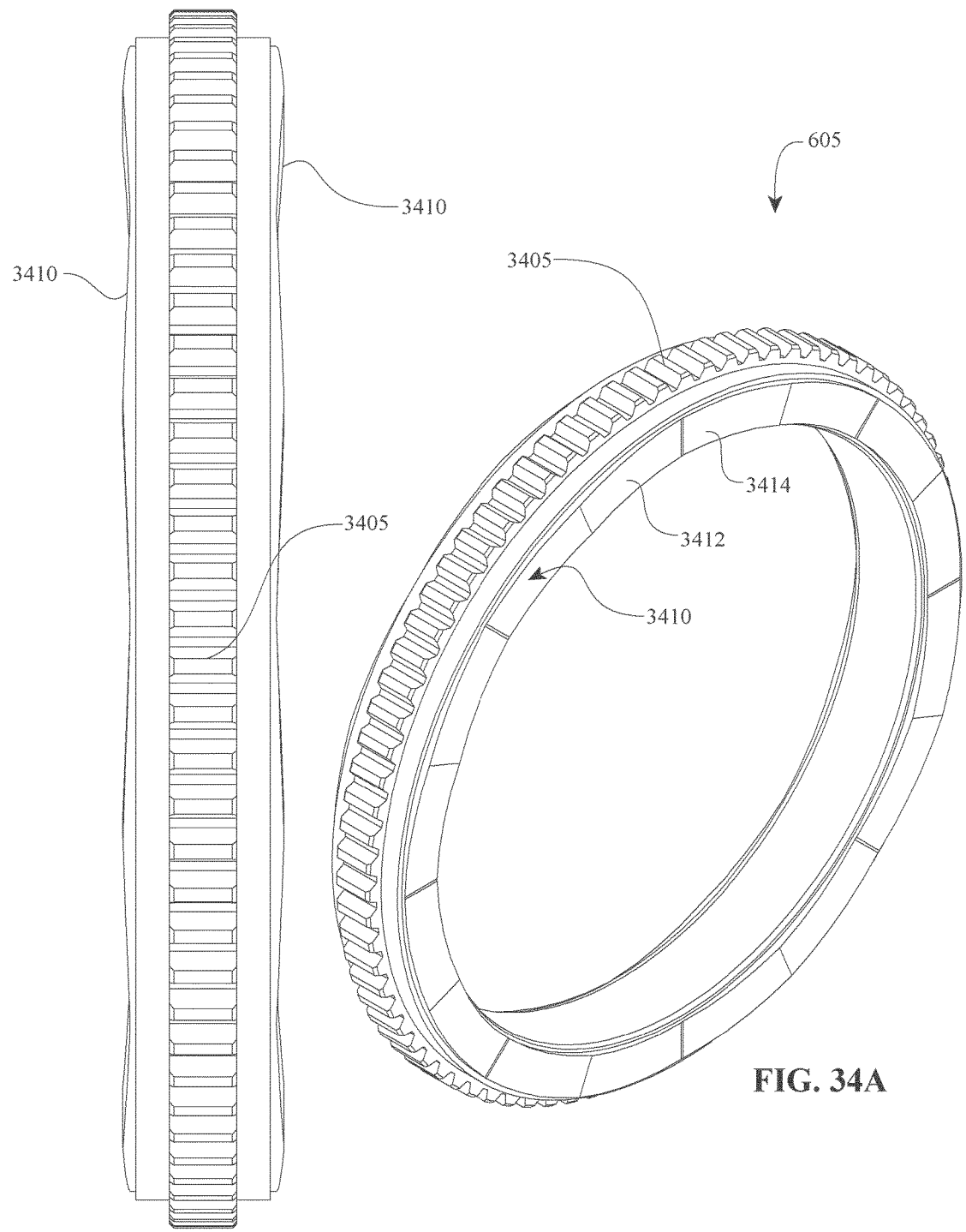
FIG. 34A is a perspective view of a center cam base that can be used with the variator of FIG. 5A.
FIG. 34B is a side elevational view of the cam base of FIG. 34A.

FIGS. 34A and 34B illustrate one embodiment of a center cam base 605, which is generally an annular cylindrical body having a set of external splines 3405 on its outer rim. The splines 3405 are adapted to engage corresponding splines 2510 of drive flange 532 (see FIG. 6A). Each side of the center cam base 605 has cam ramps 3410 configured to cooperate with rolling elements (not shown) and corresponding cam ramps on cam rings 610 and 615 (see FIG. 6A and accompanying discussion). In one embodiment, the center cam base 605 has an inner diameter of about 11 inches and an outer diameter of about 12.5-13 inches at the root of the splines 3405. In some embodiments, the pitch diameter of the splines 3405 is about 13.0-13.5 inches. The width of the center cam base 605 (not including the height of the ramps 3410) can be about 1.5-1.7 inches.

In embodiment, the center cam base 605 includes eight sets of ramps 3412, 3414 (on each side of the center cam base 605) arranged in an angular pattern about the center of the center cam base 605. The ramps 3412, 3414 have a width of about 1.25-2.0 inches. In one embodiment, the lead of the ramps 3412, 3414 is about 1.1-1.5 inches, preferably 1.2-1.4 inches, and more preferably about 1.3 inches. The ramp 3412 has a counterclockwise helical ramp surface, while the ramp 3414 has a clockwise helical ramp surface. In one embodiment, the center cam base 605 can be made of metallic material such as, for example, 1065 steel. Preferably, the ramp surfaces of the ramps 3005 are flame or induction hardened to 58-62 HRC at about a 0.03 inches minimum effective case depth.

One embodiment of the cam rings 610, 615 is shown in FIGS. 35A-35C. For convenience, the discussion below will refer only to the cam ring 610; however, the discussion can be equally applicable to the cam ring 615. The cam ring 610 is generally a flange having a set of internal splines 3505. In some embodiments, the cam ring 610 includes a cam neck 3510 and a cam shoulder 3515, which has a set of cam ramps 3520. In this embodiment, the cam ring 610 is provided with a key seat 3525 for receiving a key (not shown) that, among other things, fixes the rotation of the cam ring 610 to the synchronization ring 645 (see FIG. 6A). The cam ring 610 can include a clip ring groove 3527 for receiving a clip ring (not shown) that aid in constraining axially the synchronization ring 645.

In one embodiment, the largest outer diameter of the cam ring 610 is about 13 inches. The pitch diameter of the splines 3505 can be about 12.5 inches, for example. In some embodiments, the cam neck 3510 has an outer diameter of about 11 inches and an inner diameter of about 10.5 inches. In some embodiments, the cross-sectional width of the cam ring 610 is about 2-2.5 inches. Preferably, the cam ramps 3520 are made to cooperate with the ramps 3410 of the center cam base 605. In embodiment, the cam ring 610 includes eight sets of ramps 3522, 3524 arranged in an angular pattern about the center of the cam ring 610. The ramps 3522, 3524 have a width of about 1.25-2.0 inches. In one embodiment, the lead of the ramps 3522, 3524 is about 1.1-1.5 inches, preferably 1.2-1.4 inches, and more preferably about 1.3 inches. The ramp 3522 has a counterclockwise helical ramp surface, while the ramp 3524 has a clockwise helical ramp surface. In one embodiment, the cam ring 610 can be made of metallic material such as, for example, 1065 steel. Preferably, the ramp surfaces of the ramps 3005 are flame or induction hardened to 58-62 HRC at about a 0.03 inches minimum effective case depth.

Figures 36A, 36B:
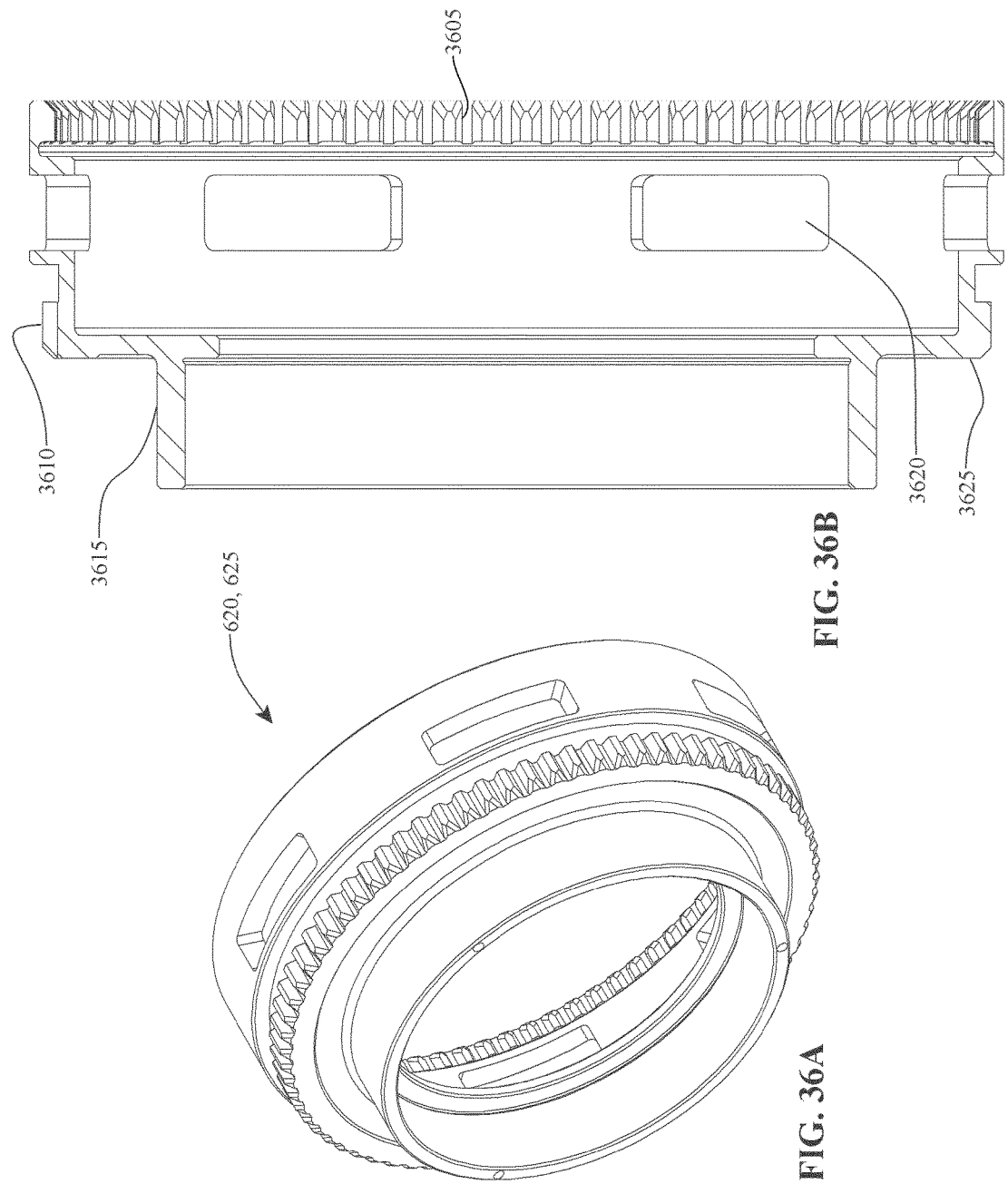
FIG. 36A is a perspective view of an output disc that can be used with the variator of FIG. 5A.
FIG. 36B is a cross-sectional view of the output disc of FIG. 36B.

FIGS. 36A-36B depict one embodiment of the output disc 620 (which can be the same as output disc 625). The output disc 620 is a generally annular, cylindrical body having a set of internal splines 3605 and a set of external splines 3610. In this embodiment, the internal splines 3605 are configured to engage a set of corresponding splines 2410 of the traction ring 2400 (see FIGS. 6A and 24A-24C). The external splines 3610 are adapted to engage the set of corresponding splines 3505 of the cam ring 610. The output disc 620 additionally has a flange extension 3615 for receiving the bearing 630, the carrier pilot ring 640, and the center bearing shim 642 (see FIG. 6A). A shoulder 3625 of the output disc 620 is adapted to abut against the cam ring 610 in order to transmit axial force. Cutouts 3620 can be made in the body of the output disc 620 in order to reduce its weight and facilitate lubricant flow.

In one embodiment, the output disc 620 can have an outer diameter of about 12.5-13.5 inches. The pitch diameter of the internal splines 3605 or the external splines 3610 can be about 12-13 inches. The overall length of the output disc 620 can be, in some embodiments, about 4.5-5.5 inches. For certain applications, the flange extension 3615 can have a length of about 1.5-3 inches and an internal diameter of about 7.5-8.5 inches. In one embodiment, the output disc 620 can be made of 4140 heat treated steel.

Figure 38B:
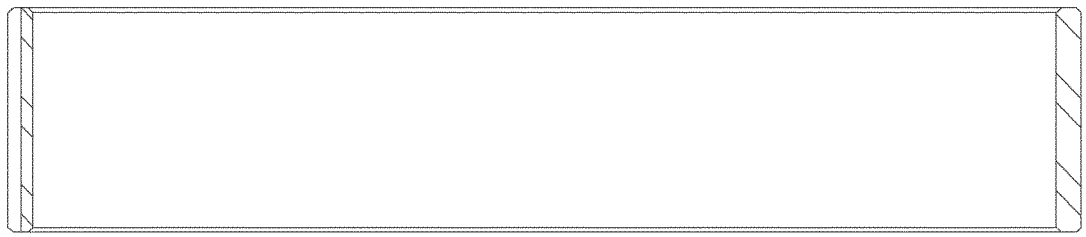
FIG. 38A is a perspective view of a synchronization ring that can be used with the variator of FIG. 5A.
Figure 38A:
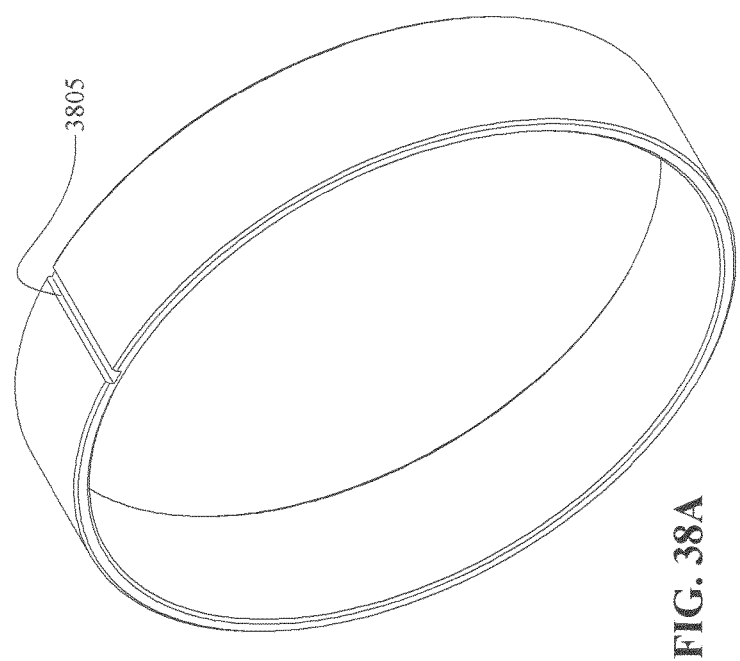

One embodiment of a carrier pilot ring 640 is shown in FIGS. 37A-37B. The carrier pilot ring 640 is a generally annular and cylindrical body having an internal groove 3705 for lubrication distribution. The pilot ring 640 additionally includes orifices 3710 for lubrication distribution. In one embodiment, the carrier pilot ring 640 has an outer diameter of about 6.5 inches and an inner diameter of about 6 inches. The cross-sectional thickness, which is shown in FIG. 37B, of the carrier pilot ring 640 can be about 0.6-0.8 inches. In one embodiment, the groove 3705 is about 0.1 inches, and the orifices 3710 are about 0.25 inches in diameter. FIGS. 38A-38B illustrate one embodiment of a synchronization ring 645, which is a generally annular, cylindrical body having a key seat 3805. In one embodiment, the synchronization ring 645 has an inner diameter of about 10 inches and an outer diameter of about 10.5 inches. In some embodiments, the length of the synchronization ring 645 can be about 2-2.5 inches. For some applications, the key seat 3805 can be about 0.25 inches wide and about 0.125 inches deep. In some embodiments, the synchronization ring can be made of a mild steel.

An embodiment of an idler assembly 3900 is shown in FIGS. 39A-39C. The idler assembly 3900 can include an idler 3905, which is a generally annular ring having a flange extension 3910 and shoulders 3915. The flange extension 3910 is adapted to provide a rolling surface for the planets 522. The shoulders 3915 are configured to support bearing elements 3920, which in the embodiment shown are typical radial ball bearings; however, in other embodiments, the bearing elements 3920 can be, for example, angular contact bearings. The bearing elements 3920 provide radial and axial support for idler 3905. In one embodiment, the idler 3905 has an inner diameter of about 4.0 inches. In some embodiments, the diameter of the shoulders 3915 can be about 4.5 inches. The diameter of the idler 3905 at the flange extension 3910 can be about 5.25-5.75 inches, for certain applications. The idler 3905 can be made of, for example, a metallic material such as 8620 steel. In one embodiment, the idler 3905 is case carburized to a case depth of about 0.60 inches at a minimum of HRC 60 at the surface. The bearing elements 3920 can be, for example, Kaydon KD045AH6 bearings.

FIGS. 40A-40E show one embodiment of a variator housing 505 that can be used with the variator 310. The variator housing 505 is a generally cylindrical container 4005 that couples to a skirt 4010, which couples to an oil pan (not shown) via any suitable fastening method including bolts, welds, adhesive, etc. In other embodiments, however, the container 4005 can have shapes other than cylindrical. For example, the container 4005 can be a rectangular box. The skirt 4010 and the oil pan form an oil reservoir or tank from which a pump (not shown) can recover fluid to provide line pressure to the valve 1605, as previously discussed. In one embodiment, the skirt 4010 includes a pick-up port 4020 for fluid communication with the pump. Additionally, the skirt 4010 can be provided with a number of accessory ports 4025, some of which can be used to receive thermocouples, for example. In certain embodiments, the skirt 4010 or, generally the variator housing 505, can include one or more utility ports 4030 for accessing various components or process of an auxiliary gearbox, such as gearbox 320 or gearbox 2382. In one embodiment, the skirt 4010 is provided with a port 4035 for a fluid level sight glass.

The container 4005 may have a number of cutouts 4015 that can be covered with, for example, Plexiglass™ windows to allow observation of the components housed in the container 4005. In one embodiment, the container 4005 includes an unloader piston port 4040 adapted to deliver fluid to the unloader piston 725 (see FIG. 7A and accompanying text). The container 4005 can be also provided with a number of instrumentation or access ports 4045. For example, in one embodiment, one of the access ports 4045 can be used for receiving and housing a speed sensor. To provide lubrication for certain components of the auxiliary gearbox 320, 2382, the container 4005 can have one or more lubrication ports 4050. A number of auxiliary lubrication ports 4055 can be provided in the container 4005 for supplying additional lubrication to the planets 522. To facilitate handling of the variator housing 505, including any components assembled therein, the container 4005 can include one or more connecting holes 4060 adapted to couple to a suitable lifting or manipulating tool or machine. Preferably, the connecting holes 4060 are properly positioned in the container 4005 to provide a pivot point around the center of gravity of the variator housing 505 and/or the variator 310. The container 4005 can have dowel pin holes 4065 for receiving alignment dowels (not shown) that facilitate location and assembly of the variator housing 505 with the bell housing 531 and/or the gearbox 320, 2382. In some embodiments, the container 4005 can be provided with a recess 4091 adapted to receive, support, and axially constrain certain components of the variator 310; for example, in one embodiment, the recess 4091 is adapted to axially constrain the unloader cylinder 730 (see FIG. 7A, for example).

In some embodiments, the container 4005 can be provided with an end plate 4063 having bores 4070 for receiving and supporting the planet shafts 2310 of the gearbox 320 (see FIG. 23C), for example. The plate 4063 can also be provided with a number of carrier bolt holes 4075 for receiving bolts that fasten the planet carrier 2305 to the container 4005. The plate 4063 has a central bore 4085 adapted to allow passage of, and interfacing between, certain components of the variator 310 (for example, the drive flange 532) and other certain components of the gearbox 320, 2382 (for example, the sun gear 2320). To facilitate location and assembly, the plate 4063 can have one or more dowel pin holes 4080 for receiving dowel pins (not shown). The plate 4063, in some embodiments, can be provided with a seal groove 4095 for receiving an o-ring (not shown) that provides a seal between the variator housing 505 and the housing 590 of the gearset 320, for example. The variator housing 505 can be provided with a lubrication port 4090 to allow lubrication to drain from the gearset housing 590 back to the variator housing 505 so that the housing 590 does not fill up excessively with lubricant. In one embodiment, the variator housing includes one or more lubrication ports 4087 to transport lubrication from the variator housing 505 to the gearset housing 590 for lubricating clutches and gears thereof.

In one embodiment, the variator housing 505 has an overall length of about 21-22 inches and an overall height or outer diameter of about 16.5-17.5 inches. The cylindrical container 4005 can have an outer diameter of about 15.5-16.5 inches and an inner diameter of about 14.5-15.5 inches. In one embodiment, the skirt 4010 generally encloses a volume having dimensions of about 14×13×6 inches. For certain applications, the variator housing 505 can be made of, for example, mild steel.

One embodiment of a bell housing 531 adapted to couple to the variator housing 505 is depicted in FIGS. 41A-41E. The bell housing 531 is a generally cylindrical body 4101 having a central passage 4103. Referencing FIG. 7A additionally, in one embodiment, the bell housing 531 is adapted to receive and support certain components of the variator 310. The bell housing 531 includes a recess 4104 adapted to receive the cam load piston 720. The bell housing 531 can additionally include a number of bores 755 that house and support the compression springs 735. A recess 4107 of the bell housing 531 can be made to receive and support the cam base 715, the roller retainer 710, and/or the cam flange 705. A recess 4108 of the bell housing 531 can be suitably adapted to receive and support the cover plate 560 and the manifold 565 (see FIG. 5A, for example). A number of dowel pin holes 4118 can be provided in the bell housing 531 for receiving dowel pins (not shown) that locate and provide an anti-rotation feature for the cam base 715 (see FIG. 7B). In order to facilitate assembly of the cam base 715 in the bell housing 531, when the cam load piston 720 and/or compression springs 720 are used, the bell housing 531 can include a number of bolt holes 4126 for receiving bolts (not shown) that retain the cam base 715 in place during the assembly of certain components of the input cam assembly 575.

For certain applications, the bell housing 531 can be provided with a number of ports for fluid communication with the manifold 565. In one embodiment, the bell housing 531 includes a lubrication port 4112 adapted to deliver lubrication fluid to the manifold 565. The bell housing 531 can be provided with a cam load piston pressure port 4114 for delivering fluid pressure to the cam load piston 720. A pilot pressure port 4122 can be included in the bell housing 531 to deliver fluid pressure to the manifold 565 for actuating the pilot control piston 1620 (see FIG. 20 and accompanying text). In some embodiments, the bell housing 531 can be provided with a line pressure port 4124 that delivers fluid pressure to the manifold 565 for feeding the hydraulic control valve 1605, which ultimately uses the line pressure fluid to actuate the control pistons 582. To facilitate locating and assembly of the bell housing 531 with the variator housing 505 and/or an engine housing (not shown), the bell housing 531 can be provided with dowel pin holes 4102, 4110, respectively. In some embodiments, it might be desirable to provide the bell housing 531 with a recess 4106 for receiving and/or supporting a starter motor (not shown).

In one embodiment, the bell housing 531 has an overall outer diameter of about 17 inches and a length of about 8.5 inches. The recess 4107 has a diameter of about 14 inches and a length of about 2 inches. The recess 4104 has an outer diameter of about 12.5 inches, an inner diameter of about 10.5 inches, and a depth of about 0.75-1.0 inches. The recess 4108 can have a diameter of about 12 inches and a depth of about 1.5-2.0 inches. In some embodiments, the central passage 4103 has a diameter of about 9 inches. In one embodiment, the bores 755 have a diameter of about 0.6 inches and a depth of about 0.6-1.0 inches. In one embodiment, the bell housing 531 can be made of, for example, ductile iron 80-55-06.

The embodiments described herein are examples provided to meet the descriptive requirements of the law and to provide examples. These examples are only embodiments that may be employed by any party and they are not intended to be limiting in any manner.

What we claim is:

1. A continuously variable transmission (CVT), comprising:
   an input shaft coupled to a power source;
   a first variator and a second variator coupled to the input shaft, wherein each of the first variator and the second variator comprises
      an array of planets angularly positioned about a longitudinal axis of each variator, each planet rotatable about a planet axle, wherein tilting of the array of planets produces a ratio shift in the respective variator,
      a first traction ring and a second traction ring in contact with the array of planets, and
      an idler located radially inward of, and in contact with, the array of planets;
   a differential mechanism positioned between the first variator and the second variator; and
   an output shaft for coupling to a power load.

2. The CVT of claim 1, wherein the differential mechanism is configured to allow the first variator to rotate at a different ratio than the second variator.

3. The CVT of claim 1, further comprising a center cam assembly positioned between the first variator and the second variator, the center cam assembly comprising:
   first and second torque transfer rings;
   first and second cam rings interposed between the first and second torque transfer rings;
   first and second cam roller retainers interposed between the first and second cam rings;
   a center cam base interposed between the first and second cam roller retainers; and
   a synchronization ring interposed concentrically between the first and second cam rings and the first and second torque transfer rings, wherein the synchronization ring inhibits relative rotation between the first and second cam rings.

4. The CVT of claim 1, further comprising a center assembly comprising:
   a centering coupling riding on a carrier;
   a center output transfer element coupled to the first traction ring and the second traction ring via a first load cam and a second load cam; and
   a drive output element coupled to the center output transfer element.

5. The CVT of claim 4, wherein the centering coupling comprises a set of splines for coupling the centering coupling to the first traction ring and the second traction ring.

6. The CVT of claim 5, wherein the center output transfer element comprises a set of splines for coupling the center output transfer element to the drive output element.

7. The CVT of claim 1, further comprising an input cam assembly configured as an axial force generation system.

8. The CVT of claim 7, wherein the axial force generation system comprises a hydraulic axial force generation system and a cam-based axial force generation system.

9. The CVT of claim 8, wherein the hydraulic axial force generation system comprises a cam load piston configured to apply an axial force to one of the first traction ring and the second traction ring.

10. The CVT of claim 8, wherein the cam-based axial force generation system is configured to provide an axial force that exceeds a maximum required operational axial force, and wherein the hydraulic axial force generation system is configured to apply a desired axial force.

11. The CVT of claim 10, wherein the hydraulic axial force generation system is configured to reduce an axial force.

12. The CVT of claim 11, wherein the hydraulic axial force generation system comprises an unloader piston configured to reduce an axial force applied to one of the first traction ring and the second traction ring.

13. The CVT of claim 1, wherein one traction ring for each of the first variator and the second variator is fixed rotationally.

14. The CVT of claim 13, wherein the first traction ring is fixed rotationally.

* * * * *